US012639242B1

(12) United States Patent
Menon et al.

(10) Patent No.: US 12,639,242 B1
(45) Date of Patent: May 26, 2026

(54) CHAINED DIRECT MEMORY ACCESSES FROM A DATAFLOW GRAPH RUNNING ACROSS MULTIPLE COARSE-GRAINED RECONFIGURABLE PROCESSORS

(71) Applicant: SambaNova Systems, Inc., Palo Alto, CA (US)

(72) Inventors: Amitabh Menon, Palo Alto, CA (US); Arnav Goel, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 19/372,870

(22) Filed: Oct. 29, 2025

Related U.S. Application Data

(60) Provisional application No. 63/766,549, filed on Mar. 4, 2025.

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC .............................. G06F 13/28; G06F 2213/28
See application file for complete search history.

(56) References Cited

U.S. PATENT DOCUMENTS

| | | | | |
|---|---|---|---|---|
| 12,210,468 | B2 * | 1/2025 | Goel ................. | G06F 13/1642 |
| 12,450,167 | B1 * | 10/2025 | Menon .................... | G06N 3/02 |

| | | | | |
|---|---|---|---|---|
| 2009/0113169 | A1 * | 4/2009 | Yang ........................ | G06F 7/57 712/15 |
| 2012/0265964 | A1 * | 10/2012 | Murata ............... | G06F 15/7821 712/E9.002 |
| 2014/0359255 | A1 * | 12/2014 | Vorbach .............. | G06F 15/8023 712/11 |
| 2023/0205585 | A1 * | 6/2023 | Chatterjee ............. | G06F 9/5016 718/104 |
| 2023/0237012 | A1 * | 7/2023 | Dykema ................. | G06F 8/443 712/15 |
| 2023/0297527 | A1 * | 9/2023 | Turlik .................... | G06F 13/28 710/22 |
| 2023/0385103 | A1 * | 11/2023 | Zheng .................... | G06F 9/541 |

* cited by examiner

*Primary Examiner* — Nimesh G Patel
(74) *Attorney, Agent, or Firm* — FP; Sikander M. Khan

(57) ABSTRACT

This application provides an example system and an example method for chaining DMA transfers from a dataflow graph running across multiple CGRPs. One example first CGRP comprises a first set of coarse-grained reconfigurable units (CGRUs) including a first CGRU, a first external network, a second external network, a first external memory interface (EMI), and first external network shim (Eshim). The first Eshim to receive over the first external network a first transfer (TX) frame of a DMA transfer comprising first frame data from a second CGRP, initiate a memory write of the first frame data to a first memory. The first Eshim to receive a first completion message that indicates the memory write has completed, and to trigger a second DMA transfer of a second TX frame comprising a first subset of the first frame data to a third CGRP utilizing the second external network.

20 Claims, 16 Drawing Sheets

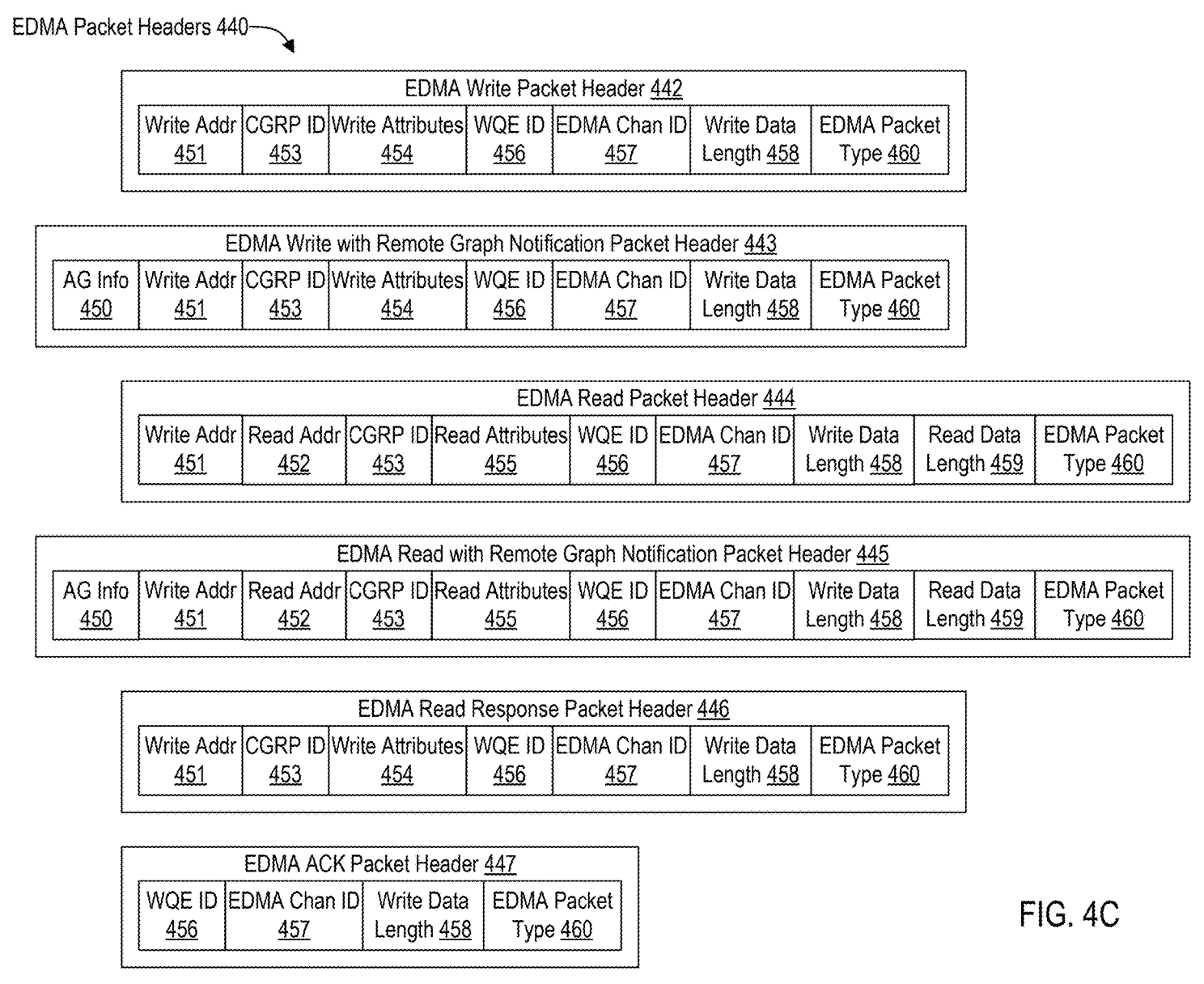

EDMA Packet Headers 440

EDMA Write Packet Header 442

| Write Addr 451 | CGRP ID 453 | Write Attributes 454 | WQE ID 456 | EDMA Chan ID 457 | Write Data Length 458 | EDMA Packet Type 460 |
|---|---|---|---|---|---|---|

EDMA Write with Remote Graph Notification Packet Header 443

| AG Info 450 | Write Addr 451 | CGRP ID 453 | Write Attributes 454 | WQE ID 456 | EDMA Chan ID 457 | Write Data Length 458 | EDMA Packet Type 460 |
|---|---|---|---|---|---|---|---|

EDMA Read Packet Header 444

| Write Addr 451 | Read Addr 452 | CGRP ID 453 | Read Attributes 455 | WQE ID 456 | EDMA Chan ID 457 | Write Data Length 458 | Read Data Length 459 | EDMA Packet Type 460 |
|---|---|---|---|---|---|---|---|---|

EDMA Read with Remote Graph Notification Packet Header 445

| AG Info 450 | Write Addr 451 | Read Addr 452 | CGRP ID 453 | Read Attributes 455 | WQE ID 456 | EDMA Chan ID 457 | Write Data Length 458 | Read Data Length 459 | EDMA Packet Type 460 |
|---|---|---|---|---|---|---|---|---|---|

EDMA Read Response Packet Header 446

| Write Addr 451 | CGRP ID 453 | Write Attributes 454 | WQE ID 456 | EDMA Chan ID 457 | Write Data Length 458 | EDMA Packet Type 460 |
|---|---|---|---|---|---|---|

EDMA ACK Packet Header 447

| WQE ID 456 | EDMA Chan ID 457 | Write Data Length 458 | EDMA Packet Type 460 |
|---|---|---|---|

FIG. 4C

600
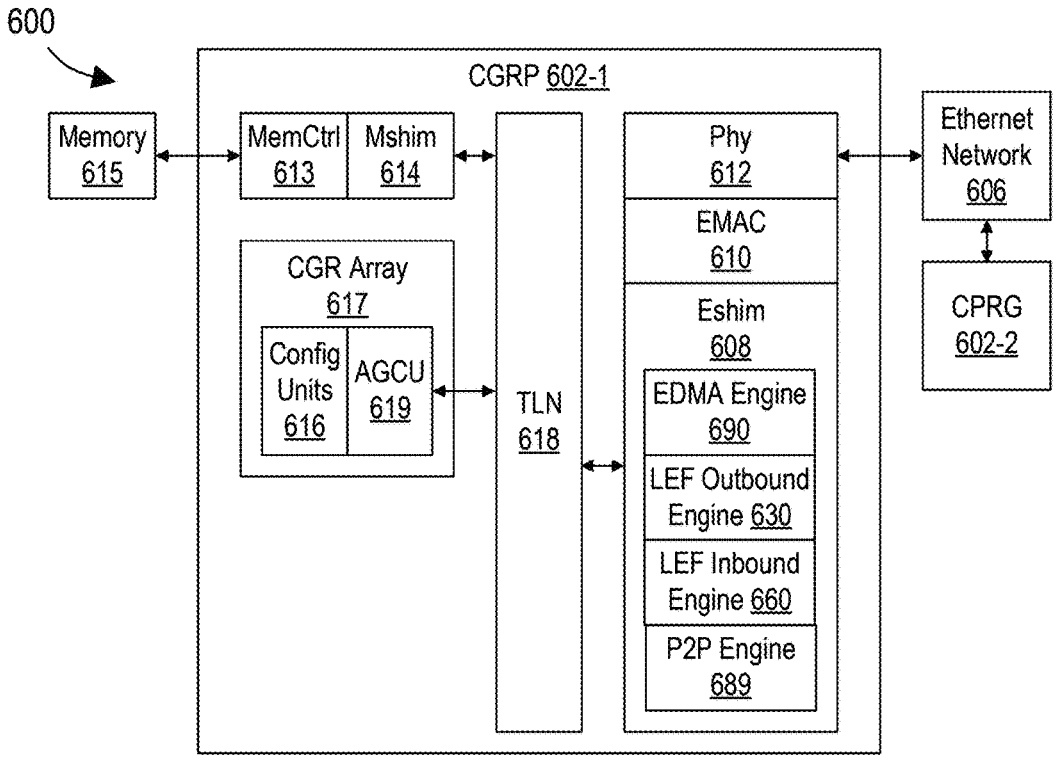
FIG. 6A
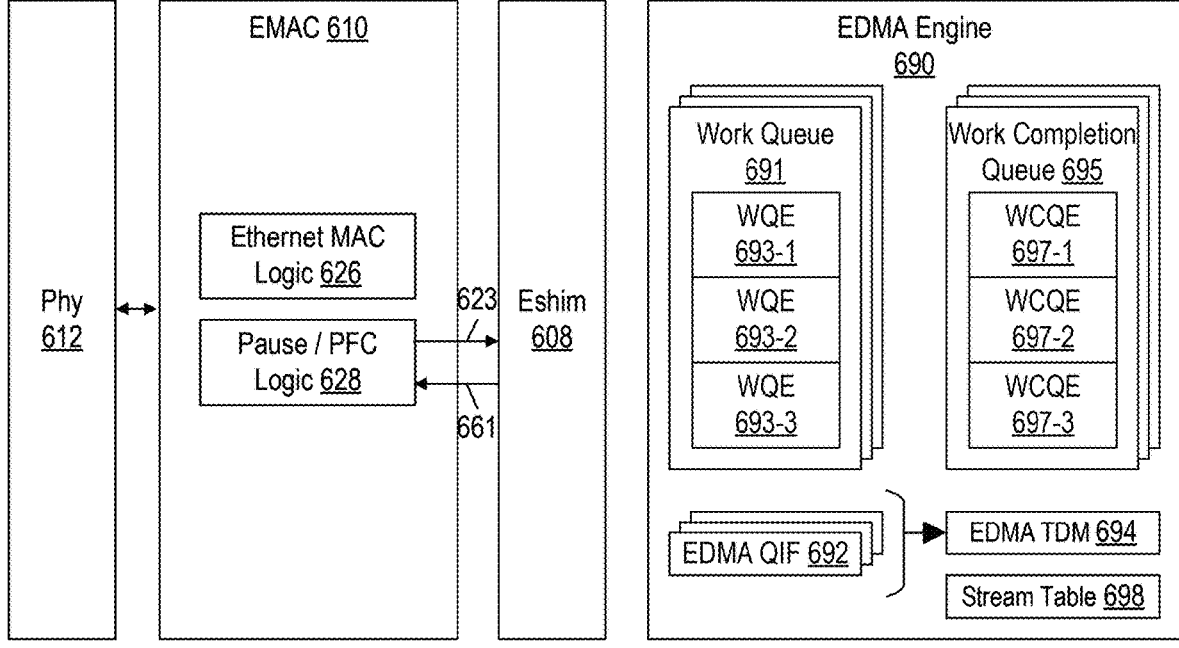
FIG. 6B                      FIG. 6C

800

802

Receiving, by an Eshim of a CGRP, a first message over a TLN of the CGRP from a CGR array

804

Reading, by the Eshim, a current WQE of a first WQ of a set of WQs based on a physical WQ ID and a WQ start operation of the first message

806

Initiating, by the Eshim, a data transfer utilizing both the TLN and an ENI based on the current WQE

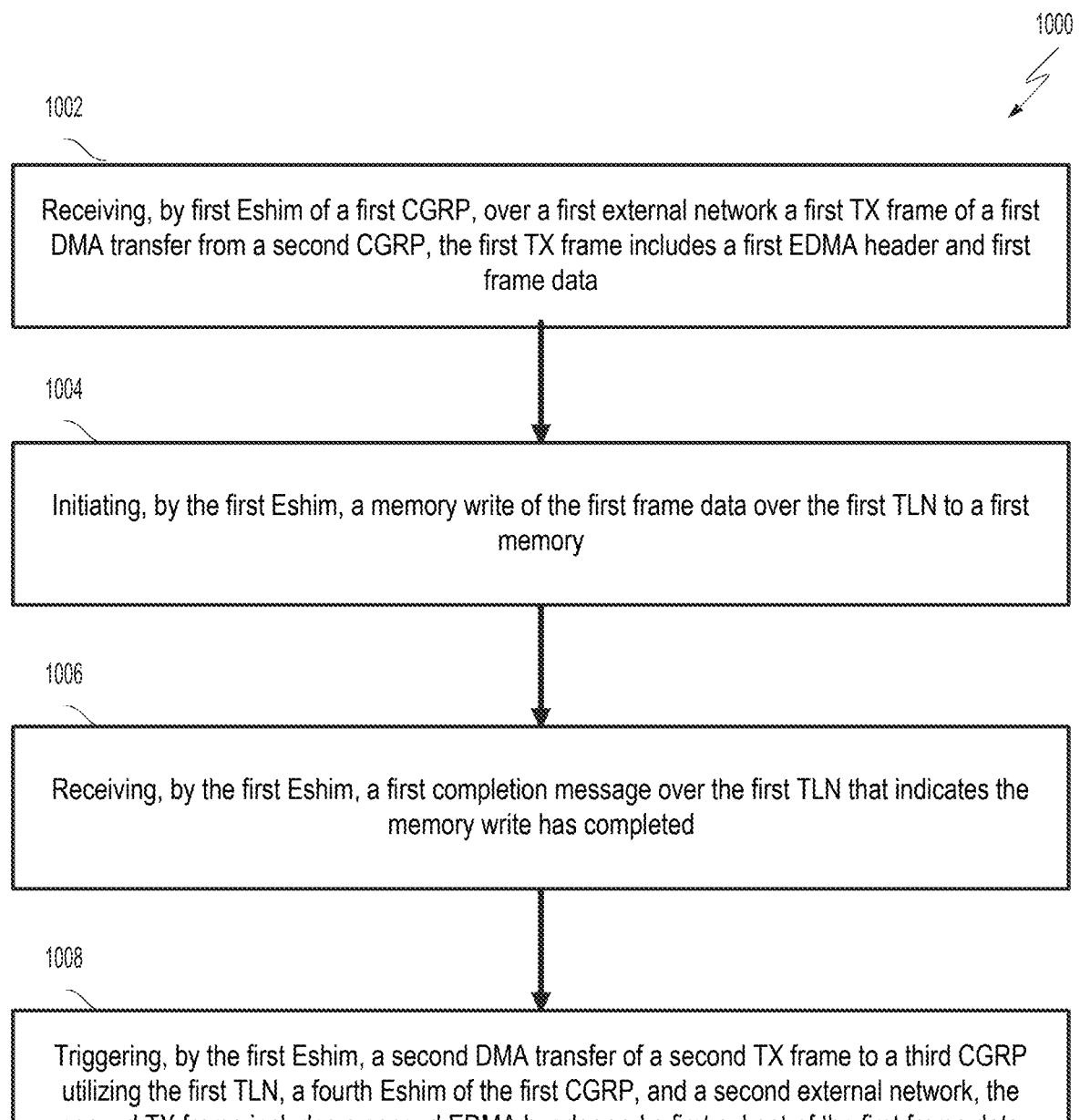

1000

1002

Receiving, by first Eshim of a first CGRP, over a first external network a first TX frame of a first DMA transfer from a second CGRP, the first TX frame includes a first EDMA header and first frame data

1004

Initiating, by the first Eshim, a memory write of the first frame data over the first TLN to a first memory

1006

Receiving, by the first Eshim, a first completion message over the first TLN that indicates the memory write has completed

1008

Triggering, by the first Eshim, a second DMA transfer of a second TX frame to a third CGRP utilizing the first TLN, a fourth Eshim of the first CGRP, and a second external network, the second TX frame includes a second EDMA header and a first subset of the first frame data

CHAINED DIRECT MEMORY ACCESSES FROM A DATAFLOW GRAPH RUNNING ACROSS MULTIPLE COARSE-GRAINED RECONFIGURABLE PROCESSORS

CROSS-REFERENCE TO RELATED APPLICATIONS

This application claims priority to U.S. Provisional Patent Application No. 63/766,549, entitled "Initiate Direct Memory Access From A Dataflow Graph Running Across Multiple Coarse-Grained Reconfigurable Processors Using Message Based Triggers", filed on Mar. 4, 2025, which is incorporated by reference in its entirety.

This application is related to the following patent applications, and each application is incorporated by reference in its entirety:

U.S. patent application Ser. No. 18/218,562, published as US 2024/0020261, entitled "Peer-To-Peer Route Through In A Reconfigurable Computing System," filed on Jul. 5, 2023;

U.S. patent application Ser. No. 18/383,718, published as US 2024/0073129, entitled "Peer-To-Peer communication between Reconfigurable Dataflow Units," filed Oct. 25, 2023;

U.S. Provisional Patent Application No. 63/390,484, entitled "Peer-To-Peer Route Through In A Reconfigurable Computing System," filed on Jul. 19, 2022;

U.S. Provisional Patent Application No. 63/405,240, entitled "Peer-To-Peer Route Through In A Reconfigurable Computing System," filed on Sep. 9, 2022;

U.S. Provisional Application 63/389,767, entitled "Peer-to-Peer Communication between Reconfigurable Dataflow Units," filed on Jul. 15, 2022;

U.S. patent application Ser. No. 16/239,252, now U.S. Pat. No. 10,698,853, entitled "Virtualization of a Reconfigurable Data Processor," filed Jan. 3, 2019;

U.S. Provisional Patent Application No. 63/349,733, entitled "Head Of Line Blocking Mitigation In A Reconfigurable Data Processor," filed on Jun. 6, 2022;

U.S. patent application Ser. No. 18/107,613, published as US 2023/0251839, entitled "Head Of Line Blocking Mitigation In A Reconfigurable Data Processor," filed on Feb. 9, 2023;

U.S. patent application Ser. No. 18/107,690, published as US 2023/0251993, entitled "Two-Level Arbitration in a Reconfigurable Processor," filed on Feb. 9, 2023;

This application is related to the following publications, and each publication is incorporated by reference in its entirety:

Prabhakar et al., "Plasticine: A Reconfigurable Architecture for Parallel Patterns," *ISCA* '17, Jun. 24-28, 2017, Toronto, ON, Canada; and Koeplinger et al., "Spatial: A Language and Compiler for Application Accelerators," *Proceedings of the 39th ACM SIGPLAN Conference on Programming Language Design and Implementation* (PLDI), Proceedings of the 43rd International Symposium on Computer Architecture, 2018.

BACKGROUND

The present subject matter relates to communication between integrated circuits, more specifically, to inter-die communication between elements that respectively communicate on their own intra-die network.

Reconfigurable processors, including field programmable gate arrays (FPGAs), can be configured to implement a variety of functions more efficiently or faster than might be achieved using a general-purpose processor executing a computer program. So called Coarse-Grained Reconfigurable Architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads.

BRIEF DESCRIPTION OF DRAWINGS

The technology disclosed is described with reference to the drawings, in which:

FIG. 4C illustrates example EDMA packet headers, according to an implementation of the present disclosure.

FIG. 6A is a simplified block diagram illustrating an example CGRA system for initiating direct memory access from a dataflow graph running across multiple CGRPs using message based triggers, according to an implementation of the present disclosure.

FIG. 6B is a block diagram showing more detail of an Ethernet media access controller (EMAC) of the CGRA system of FIG. 6A, according to an implementation of the present disclosure.

FIG. 6C is a block diagram showing more detail of EDMA engine 690 of the CGRA system of FIG. 6A, according to an implementation of the present disclosure.

FIG. 10 is a flowchart illustrating an example of a computer-implemented method for chaining DMA transfers from a dataflow graph running across multiple CGRPs, according to an implementation of the present disclosure.

Like reference numbers and designations in the various drawings indicate like elements.

DETAILED DESCRIPTION

Figure 1:
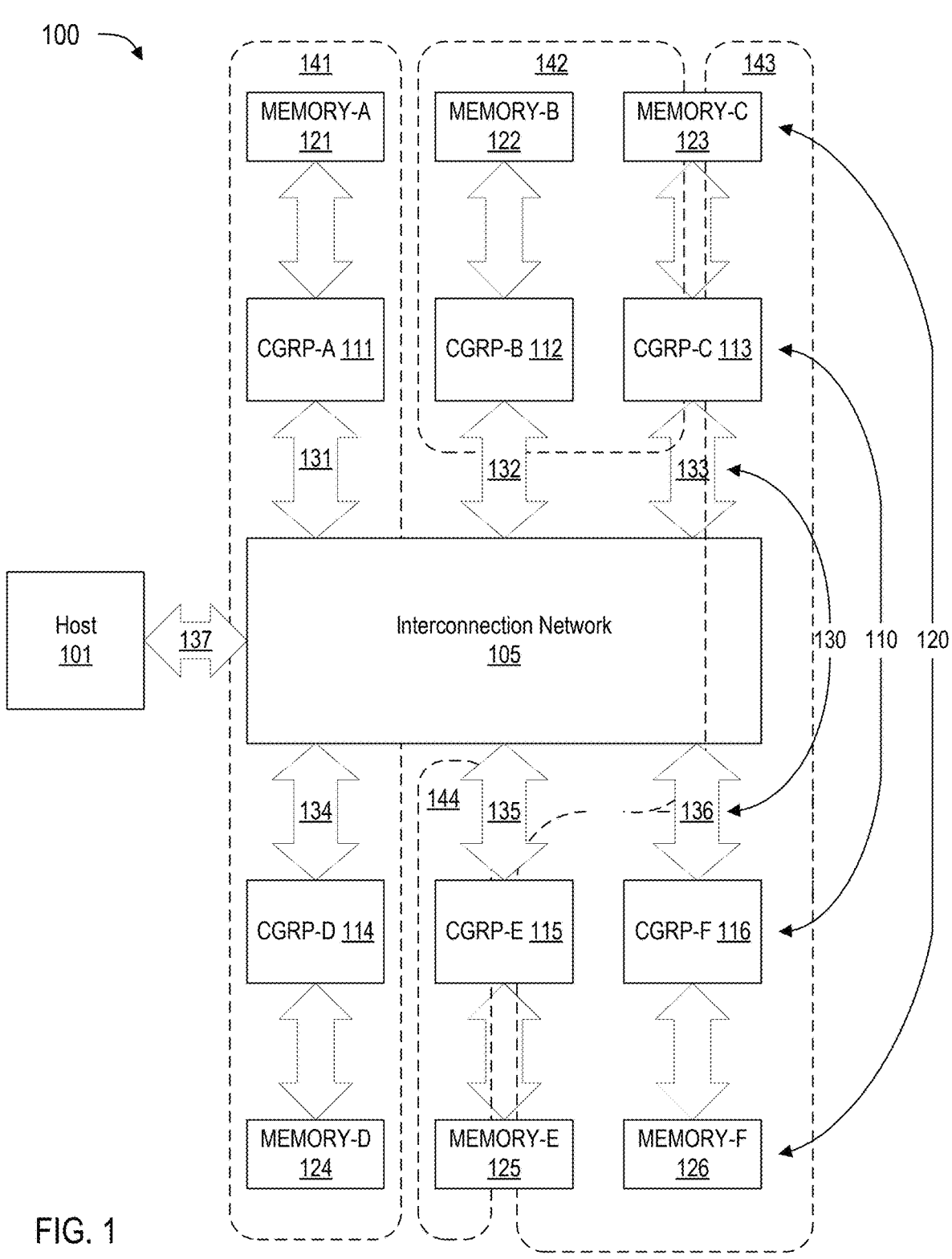
FIG. 1 is a block diagram illustrating an example coarse-grained reconfigurable (CGR) architecture (CGRA) system for chaining DMA transfers from a dataflow graph running across multiple CGRPs, according to an implementation of the present disclosure.

The present disclosure describes a coarse-grained reconfigurable architecture (CGRA) system for chaining direct memory accesses (DMAs) from a dataflow graph running across multiple coarse-grained reconfigurable processors (CGRPs).

In one implementation, a first coarse-grained reconfigurable processor (CGRP) includes a first set of coarse-grained reconfigurable units (CGRUs) including a first CGRU, a first top-level network (TLN) coupled to each CGRU of the first set of CGRUs, a first set of external interfaces including a first external network interface (ENI) for communication over a first external network, a second ENI for communication over a second external network, and a first external memory interface (EMI), and a first external network shim (Eshim) including a first external direct memory access (EDMA) engine. A first transfer (TX) frame of a first direct memory access (DMA) transfer is received, by the first Eshim, over the first external network from a second CGRP. The first TX frame includes a first EDMA header and first frame data. A memory write of the first frame data is initiated, by the first Eshim, over the first TLN to a first memory. A first completion message is received, by the first Eshim, over the first TLN that indicates the memory write has completed. A second DMA transfer of a second TX frame is triggered, by the first Eshim, to a third CGRP utilizing the first TLN, a fourth Eshim of the first CGRP, and the second external network. The second TX frame comprises a second EDMA header and a first subset of the first frame data.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages.

First, the ability to chain DMAs across multiple CGRUs allows the sequencing of dependent or related transfers between CGRUs executing distributed graphs. This can be used to control concurrent traffic load on the network and/or satisfy functional dependencies between DMA transfers.

Second, chained DMAs across CGRUs enable store and forward extensions of the DMA transfer across overlapping clusters of CGRUs where intermediate CGRUs that chain the DMA transfers are restricted to address within the containing cluster due to stream count or other addressing limitations. Trees of transfers can be constructed to scale further than single DMA transfers can reach.

Third, with appropriate WQE programming this ability to chain DMAs can be used to express constituent data movement of collective operations in neural network training and inference without host software involvement.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

The following detailed description describes technology and techniques for chaining DMAs from a dataflow graph running across multiple CGRPs, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A CGRA system for chaining direct memory accesses from a dataflow graph running across multiple coarse-grained reconfigurable processors is disclosed herein. The CGRA system may comprise multiple CGRPs, where nodes of a dataflow graph can be split across the multiple CGRPs. Communication between the CGRPs may be achieved using EDMA transactions which are implemented as a layer on the top of the Ethernet link layer and transferred over the Ethernet fabric by encapsulating the EDMA transactions in the Ethernet frame payload. In some implementations, the EDMA transactions over Ethernet may be implemented using user datagram protocol (UDP) packets. Units on the internal intra-die networks in the CGRP include specific functionality to support EDMA transactions.

Communication between CGRPs may include communication between a CGRP and a another CGRP, communication between the other CGRP and a yet another CGRP, communication between a node of a dataflow graph mapped onto a CGRP and another node of the dataflow graph mapped onto another CGRP, and communication between the other node of a dataflow graph mapped onto the other CGRP and yet another node of the dataflow graph mapped onto yet another CGRP. For example, a first Eshim of a first CGRP may send a first TX frame of a first DMA transfer to a second CGRP based on a first work queue entry (WQE) in the first CGRP. A second Eshim of the second CGRP may receive the first TX frame including a first EDMA header and first frame data. The second Eshim may initiate a memory write of the first frame data to a second memory coupled to the second CGRP. The second Eshim may receive a completion message indicating that the memory write has completed. The second Eshim may trigger a second DMA transfer of a second TX frame to a third CGRP based on a second WQE in the second CGRP. The second frame may include a second EDMA header and a first subset of the first frame data.

Initiate Direct Memory Access from a Dataflow Graph Running Across Multiple Coarse-Grained Reconfigurable Processors Using Message Based Triggers FIG. 1 is a block diagram illustrating an example CGRA system 100 for initiating direct memory access from a dataflow graph running across multiple CGRPs using message based triggers, according to an implementation of the present disclosure, wherein various implementations disclosed herein may be deployed. As illustrated, the CGRA system 100 includes a host 101, a number of CGRPs 110 (111-116), an interconnection network 105 and communication links 130 (131-137) that connect the host 101 and the CGRPs 110 to the interconnection network 105. The illustrated host 101 may be, or include, a computer such as further described with reference to FIG. 11. Host 101 runs runtime processes, as further referenced herein, and may also be used to run computer programs, such as a compiler. In some implementations, the compiler may run on a computer that is similar to the computer described with reference to FIG. 11, but separate from host 101. The CGRA system 100 may also include memories 120 respectively coupled to the CGRPs 110 including memory-A 121 coupled to CGRP-A 111, memory-B 122 coupled to CGRP-B 112, memory-C 123 coupled to CGRP-C 113, memory-D 124 coupled to CGRP-D 114, memory-E 125 coupled to CGRP-E 115, and memory-F 126 coupled to CGRP-F 116. The memories 120 can be any type of memory, including dynamic data rate (DDR) dynamic random-access memory (DRAM), high-bandwidth memory (HBM), static memory, or flash memory.

The communication links 130 can be any type of communication link, parallel or serial, electrical or optical, but in some implementations, each may be one or more physical Ethernet links. The Ethernet links may be compliant with any version of the Ethernet specification. The interconnection network 120 may have any type of topology depending on the system design and particular implementation. In some implementations, the interconnection network 120 may be implemented as direct links between pairs of devices where each device is one of CGRP 111-116 or host 101. For example, the host may have 6 individual links that respectively directly connect to the 6 CGRPs 111-116 and each CGRP may, in addition to its link connecting to the host 101, have a link to each of the other CGRPs 111-116. In that implementation, CGRP-A 111 has a first link connecting directly to the host 101, a second link connecting directly to CGRP-B 112, a third link connecting directly to CGRP-C 113, a fourth link connecting directly to CGRP-D 114, a fifth link connecting directly to CGRP-E 115, and a sixth link connecting directly to CGRP-F 116; so link 131 may include 6 individual links. In other implementations, the interconnection network 120 may include a bus structure, a switching fabric, or one or more switches and/or routers that are able to route a transaction from an first CGRP 110 or host 101 to a second CGRP 110 or host 101.

Each of the CGRPs 110 may include a grid of compute units and memory units interconnected with an internal switching array fabric such as those detailed elsewhere in this specification. The CGRPs 110 can be configured by downloading configuration files from the host 101 to configure the CGRPs 110 to execute one or more graphs 140 that define dataflow computations, and can implement any type of functionality including, but not limited to neural networks. The communication links 130 and the interconnect network 105 provide a high degree of connectivity that can increase the communication bandwidth between the CGRPs 110 and enable the CGRPs 110 to cooperatively process large volumes of data via the dataflow operations specified in the execution graphs 141-144.

A set of graphs 141-144 can be assigned to the CGRA system 100 for execution. The graphs 141-144 are overlaid on the block diagram of the CGRA system 100 showing how they may be assigned to the CGRPs 110. In the example shown, graph 141 is assigned to CGRP-A 111 and CGRP-D 114, graph2 142 is assigned to CGRP-B 112 and sections of CGRP-C 113, graph3 143 is assigned to sections of CGRP-C 113, CGRP-F 116, and sections of CGRP-E 115, while graph4 144 is assigned to sections of CGRP-E 115. While the set of graphs 141-144 is statically depicted, one of skill in the art will appreciate that the execution graphs are likely not synchronous (i.e., of the same duration) and that the partitioning within a CGR computing environment will likely be dynamic as execution graphs are completed and replaced.

As can be understood from FIG. 1, nodes of a graph may be distributed across multiple CGRPs. Nodes of a graph within a CGRP may communicate using internal communication paths of the CGRP, but communication between nodes of a single graph in different CGRPs may use Ethernet direct memory access (EDMA) or peer-to-peer (P2P) communication over the links 130 and interconnection network 105.

FIG. 1 shows example graph 141 spread across multiple CGRPs with CGRP-A 111 configured to execute a first node of the graph 141, and another CGRP-D 114 configured to execute a second node of the same graph 141. The first node of graph 141 may send data to the second node of graph 141. For the purposes of this disclosure, in a typical system, a connected processor of host 101, such as processor 1120 further described with reference to FIG. 11, may be used to move the data from the first node to the second node. In contrast to a typical system, a CGRA system for initiating direct memory access from a dataflow graph running across multiple CGRPs using message based triggers is disclosed herein, which allows CGRP-A 111 to send the data from the first node directly to CGRP-D 114. The control for the data transfer does not have to involve the host 101.

As mentioned above, the host 101 may configure the CGRPs 110 by downloading configuration bit files to the CGRPs 110. This may be accomplished by sending the configuration bit files over the communication links 130 and interconnection network 105. The configuration bit files can include information to configure individual units within the CGRPs 110 (which are described in more detail below) as well as the internal communication paths between those units. The configuration bit files may be static for the duration of execution of a graph and configure a portion of one of CGRPs 111-116 (or the entire CGRP) to execute one or more nodes of an execution graph 141-144. Although the detailed description is focused on initiating direct memory access from a dataflow graph running across multiple CGRPs using message based triggers, other functionality is envisioned to be covered by the described subject matter. Discussion of initiating direct memory access from a dataflow graph running across multiple CGRPs using message based triggers is not intended to limit the detailed description to initiating direct memory access from a dataflow graph running across multiple CGRPs using message based triggers or to limit the detailed description in any way.

Figure 2:
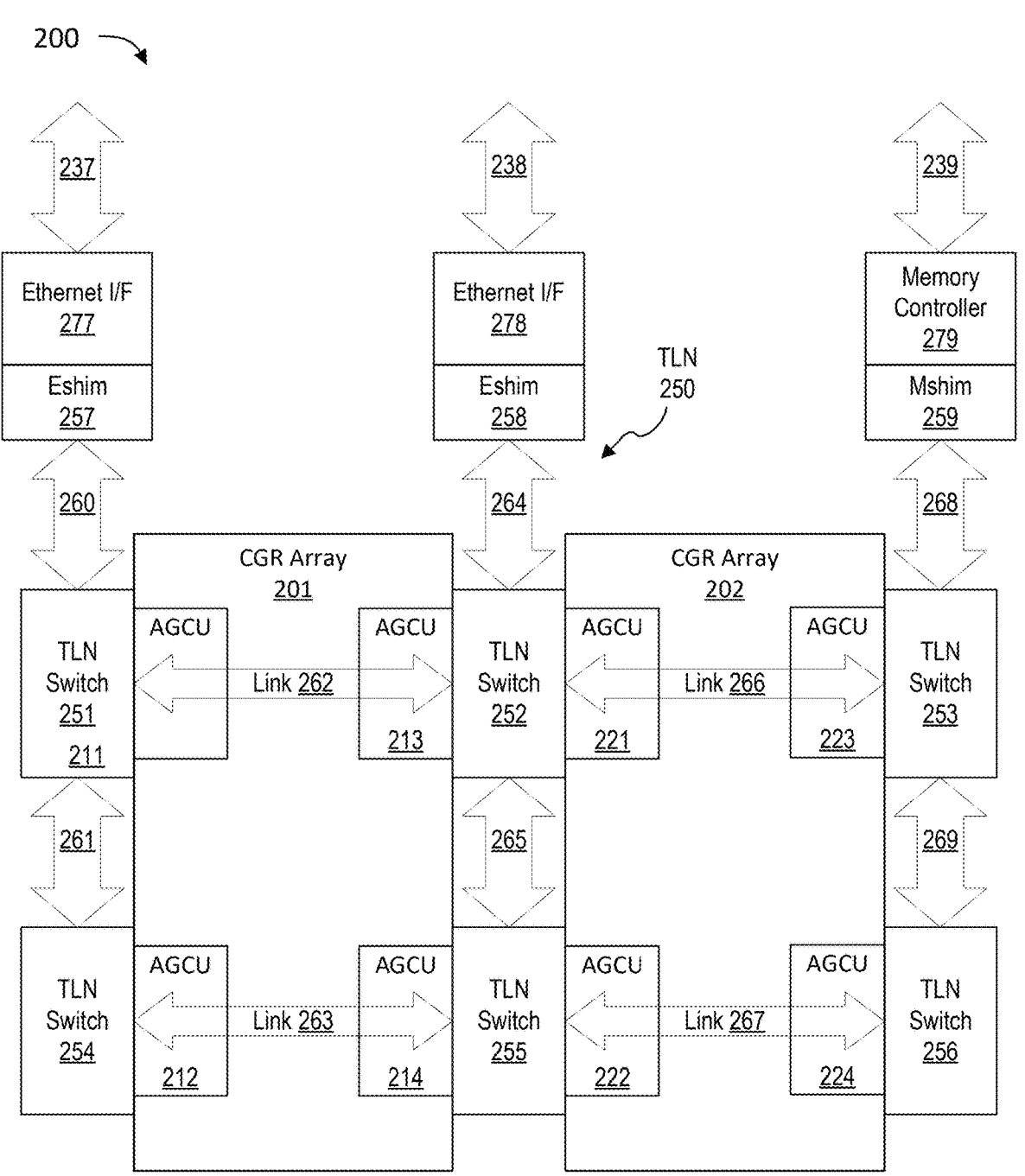
FIG. 2 is a simplified block diagram illustrating an example CGRP having a CGRA, according to an implementation of the present disclosure.

FIG. 2 is a simplified block diagram of an example of a CGRP 200 having a CGRA, according to an implementation of the present disclosure, which may be used as CGRP 111-116 in the CGRA system 100 of FIG. 1. In this example, the CGRP 200 has 2 CGR arrays (CGR array 201, CGR array 202), although other implementations can have any number of CGR arrays, including a single CGR array. Each CGR array 201, 202 (which is shown in more detail in FIG. 3) comprises an array of configurable units connected by an array-level network (ALN) in this example. Each of the two CGR arrays 201 and 202 has one or more address generation and coalescing units (AGCUs) 211-214, 221-224. The AGCUs are nodes on both a top-level network (TLN) 250 and on ALNs within their respective CGR arrays 201, 202 and include resources for routing data among nodes on the TLN 250 and nodes on the ALN in each CGR array 201, 202.

The CGR arrays 201-202 are coupled to TLN 250 that includes TLN switches 251-256 and links 260-269 that allow for communication between elements of CGR array 201, elements of CGR array 202, and shims to other functions of the CGRP 200 including Ethernet shims (Eshims) 257, 258 and a memory shim (Mshim) 259. The Mshim 259 can support any type of memory including dynamic data rate (DDR) dynamic random-access memory (DRAM), high-bandwidth memory (HBM), static memory, or flash memory.

Other functions of the CGRP 200 may connect to the TLN 250 in different implementations, such as additional shims to additional and or different input/output (I/O) interfaces and memory controllers, and other chip logic such as control/status registers (CSRs), configuration controllers, or other functions. Data travel in packets between the devices (including TLN switches 251-256) on the links 260-269 of the TLN 250. For example, TLN switches 251 and 252 are connected by a link 262, TLN switches 251 and Eshim 257 are connected by a link 260, TLN switches 251 and 254 are connected by a link 261, and TLN switch 253 and Mshim 259 are connected by a link 268.

The TLN 250 is a packet-switched mesh network with four independent networks operating in parallel; a request network, a data network, a response network, and a credit network. While FIG. 2 shows a specific set of switches and links, various implementations may have different numbers and arrangements of switches and links. All 4 networks (request, data, response, and credit) follow the same protocol. The only difference between the four networks is the size and format of their payload packets. A TLN transaction consists of 4 parts, a valid signal, a header, a packet, and a credit signal. To initiate a transaction, a TLN agent (the driver) can assert the valid signal and drive the header on the link connected to a receiver. The header consists of the node ID of the source and destination. Note that source and destination refer to the endpoints of the overall transaction, not the ID of an intermediate agent such as a switch. In the following cycle, the agent will drive the packet. The credit signal is driven by the receiver back to the driver when it has dequeued the transaction from its internal queues. TLN agents have input queues to buffer incoming transactions. Hop credits are assigned to drivers based on the sizes of those queues. A driver cannot initiate a transaction (i.e. assert the valid signal) unless it has credits available.

There are two types of credits used to manage traffic on TLN 250. The first, as mentioned above, are hop credits. These are credits used to manage the flow of transactions between adjacent points on the network. The other type of credits are referred to as end-to-end credits. To prevent persistent backpressure on the TLN 250, communication on the TLN 250 is controlled by end-to-end credits. The end-to-end credits create a contract between a transaction source and an endpoint to which it sends the transaction. An exception to this is a destination that processes inbound traffic immediately with no dependencies. In that case, the number of end-to-end credits can be considered infinite, and no explicit credits are required. The number of end-to-end credits is generally determined by the size of input queues in the destination units. Agents will generally have to perform both a hop credit check to the connected switch and an end-to-end credit check to the final destination. The transaction can only take place if a credit is available to both. Note that the TLN components (e.g. TLN switches) do not directly participate in or have any knowledge of end-to-end credits. These are agreements between the connected agents and not a function of the network itself.

As was previously mentioned, the TLN 250 is a packet-switched mesh network using an array of TLN switches for communication between agents. Any routing strategy can be used on the TLN 250, depending on the implementation, but some implementations may arrange the various components of the TLN 250 in a grid and use a row, column addressing scheme for the various components. Such implementations may then route a packet first vertically to the designated row, and then horizontally to the designated destination. Other implementations may use other network topologies and/or routing strategies for the TLN 250.

Eshims 257, 258 provide an interface between the TLN 250 and Ethernet Interfaces 277, 278 which connect to external communication links 237, 238 which may form part of communication links 130 as shown in FIG. 1. While two Eshims 257, 258 with Ethernet interfaces 277, 278 and associated Ethernet links 237, 238 are shown, implementations can have any number of Eshims and associated Ethernet interfaces and links. A Mshim 259 provides an interface to a memory controller 279, which has a memory interface 239 and can connect to memory such as the memory 120 of FIG. 1. While only one Mshim 259 is shown, implementations can have any number of Mshims and associated memory controllers and memory interfaces. Different implementations may include memory controllers for varied types of memory, such as a DDR DRAM memory controller, a flash memory controller, a static memory controller, and/or a high-bandwidth memory (HBM) controller. The interfaces 257-259 include resources for routing data among nodes on the top-level network (TLN) 250 and external devices, such as high-capacity memory, host processors, other CGRA processors, FPGA devices and so on, that are connected to the interfaces 257-259 through external links 237-239.

As explained earlier, in the system shown in FIG. 1 each CGRP can include an array of configurable units that is disposed in a configurable interconnect (ALN), and the configuration file defines a dataflow graph including functions in the configurable units and links between the functions in the configurable interconnect. In this manner, the configurable units function as sources or sinks of data used by other configurable units providing functional nodes of the graph. Such systems can use external data processing resources not implemented using the configurable array and interconnect, including memory and a processor executing a runtime program, as sources or sinks of data used in the graph.

Furthermore, such systems may include communication resources which can be arranged in a mesh-like network known as a TLN 250. The communication resources may facilitate communication between the configurable interconnect of the ALN and the external data processing resources (memory and host). In one implementation, the CGR arrays, CGR array 201 and CGR array 202, in the CGRP 200 (which represents a configuration of CGRPs A-G) are connected to the host 101 via the top-level network (TLN) 250 including links 260-269 shown in FIG. 2.

More details about the TLN and the on-chip arrangement of the CGRP 200, the ALN, and the TLN and communication among those are described in a related U.S. provisional patent application 63/349,733, entitled "Head Of Line Blocking Mitigation In A Reconfigurable Data Processor," which has been incorporated by reference into this disclosure.

Figure 3:
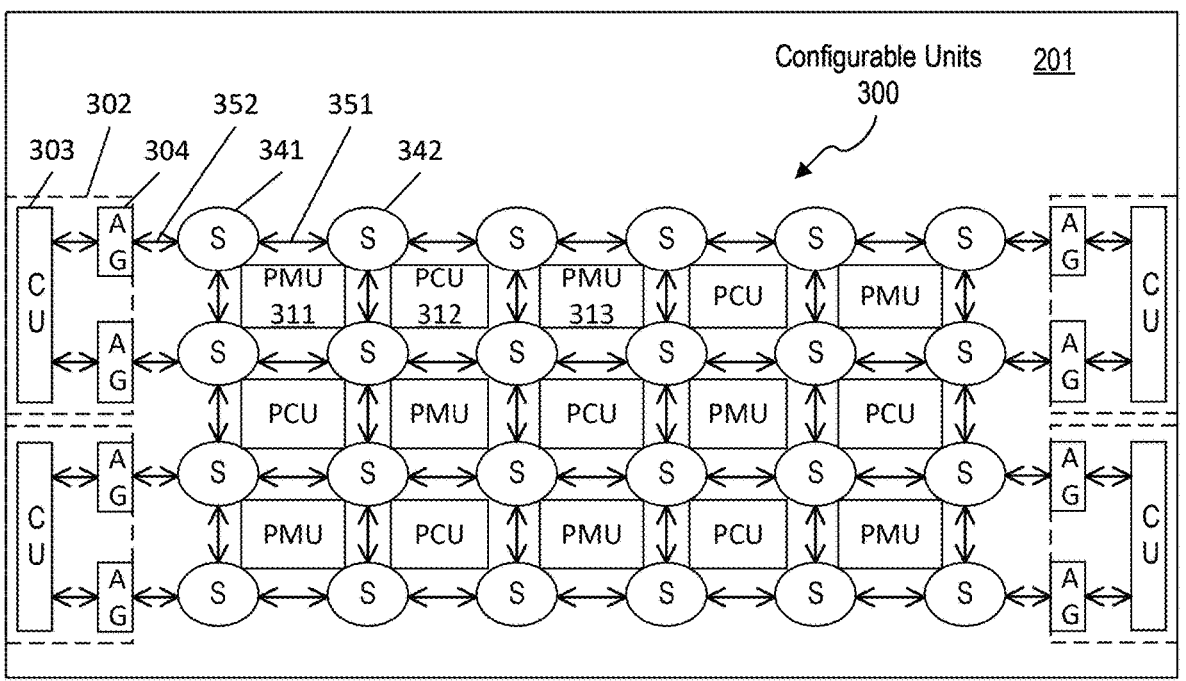
FIG. 3 is a simplified block diagram illustrating an example CGR array of an CGRP, according to an implementation of the present disclosure.

FIG. 3 is a simplified diagram of CGR array 201 (which may be identical to CGR array 202) of FIG. 2, where the configurable units 300 in the array 201 are nodes on the array-level network. In this example, the configurable units 300 include a plurality of types of configurable units. The types of configurable units in this example include Pattern Compute Units (PCU) such as PCU 312, Pattern Memory Units (PMU) such as PMUs 311, 313, switch units (S) such as Switches 341, 342, and Address Generation and Coalescing Units (AGCU) such as AGCU 302. An AGCU can include one or more address generators (AG) such as AG 304 and a shared coalescing unit (CU) such as CU 303. Other implementations may include other types of configurable units such as other types of compute units, other types of memory units, and/or fused compute and memory units (FCMUs). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which has been incorporated by reference into this disclosure.

Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units by a configuration load/unload controller in an AGCU 302 based on the contents of the bit file to allow all the components to execute a program (i.e., a graph). Program Load may also load data into a PMU memory.

The array-level network includes links interconnecting configurable units 300 in the array 201. The links in the array-level network include one or more and, in this case three kinds of physical buses: a chunk-level vector bus (e.g. 64 bytes of data), a word-level scalar bus (e.g. 32 bits of data), and a multiple bit-level control bus. For instance, interconnect 351 between switches 341 and 342 includes a vector bus interconnect with vector bus width of 128 bits, a scalar bus interconnect with a scalar bus width of 32 bits, and a control bus interconnect.

The three kinds of physical buses differ in the granularity of data being transferred. In one implementation, the vector bus can carry a chunk that includes 64-Bytes (=512 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The header is transmitted on a header bus to each configurable unit in the array of configurable units.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include (as non-limiting examples):

A bit to indicate if the chunk is scratchpad memory or configuration store data.

Bits that form a chunk number.

Bits that indicate a column identifier.

Bits that indicate a row identifier.

Bits that indicate a component identifier.

The array-level network may route the data of the vector bus and/or scalar bus using two-dimension order routing using either a horizontal first or vertical first routing strategy. The vector bus and/or scalar bus may allow for other types of routing strategies, including using routing tables in switches to provide a more flexible routing strategy in some implementations.

During execution of a machine after configuration, data can be sent via one or more-unit switches and one or more links between the unit switches to the configurable units using the vector bus and vector interface(s) of the one or more switch units on the array-level network.

The configurable units can access off-chip memory through Mshim 259 and memory controller 279 (see FIG. 2) by routing a request through an AGCU. An AGCU contains a reconfigurable scalar data path to generate requests for the off-chip memory. The AGCU contains FIFOs (first-in-first-out buffers for organizing data) to buffer outgoing commands, data, and incoming responses from the off-chip memory.

The address generators (AGs) in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

An AGCU has a set of virtual address generators (VAGs) that can be programmed to communicate with a particular configurable unit in the array 300, such as a PMU 311. Each VAG can also be programmed to generate a particular address pattern and includes several other features, which are described later in this disclosure. In at least one implementation, each AGCU includes 16 VAGs. In some implementations, the address generation units (e.g. AG 304) may each be a VAG.

As shown in FIG. 1, there are cases where a source CGRP may want to perform read or write direct memory access (DMA) operations to transfer data between a source memory coupled to the source CGRP and a destination memory coupled to a destination CGRP. An Eshim lossless protocol provides a way to accomplish this communication. The Eshim lossless protocol provides lossless network connectivity for dataflow applications over Ethernet in the event of data loss over a layer 2 (L2) network. The Eshim implements lossless connectivity on a per-stream basis, where a stream is a connection between a source CGRP Eshim and a destination CGRP Eshim. Each stream may carry Ethernet DMA (EDMA) transactions, which are encapsulated in Ethernet frames. EDMA traffic includes user space DMA operations to move data between a source CGRP memory and either a destination CGRP memory or a host memory.

There are other cases where a configurable unit on one CGRP may want to send or receive data controlled by another CGRP. A peer-to-peer (P2P) protocol provides several primitives that can be used to accomplish this, including a remote write, a remote read request, a remote read completion, a stream write, a stream clear-to-send (SCTS), and/or an RSync Barrier, which is a special primitive that is not encapsulated in a P2P header. The P2P primitives can be used to create more complex transactions that utilize one or more P2P primitive operations. The P2P complex transactions may include a remote store, a remote scatter write, a remote read, a remote gather read, a stream write to a remote PMU, a stream write to remote DRAM, a host write, a host read, and/or a barrier operation. Similar to EDMA transactions, each stream may also carry P2P transactions, which are encapsulated in Ethernet frames. Ethernet P2P traffic includes P2P primitive operations and P2P complex transactions to move data between a configurable unit on a source CGRP and either a destination configurable unit on a destination CGRP or a destination CGRP memory coupled to the destination CGRP. The P2P protocol, primitives, and complex transactions are described in a related U.S. patent application Ser. No. 18/218,562, published as US 2024/0020261, entitled "Peer-To-Peer Route Through In A Reconfigurable Computing System," and U.S. patent application Ser. No. 18/383,718, published as US 2024/0073129, entitled "Peer-To-Peer communication between Reconfigurable Dataflow Units," both of which have been incorporated by reference into this disclosure.

FIGS. 4A, 4B, 4C, 4D, and 4E are block diagrams illustrating an example CGRA system performing an example EDMA write operation, an example EDMA transfer descriptor memory (EDMA TDM), example EDMA packet headers, an example Ethernet frame, and an example CGRA system performing an example EDMA read request and completion operation.

Figures 4A, 4B:
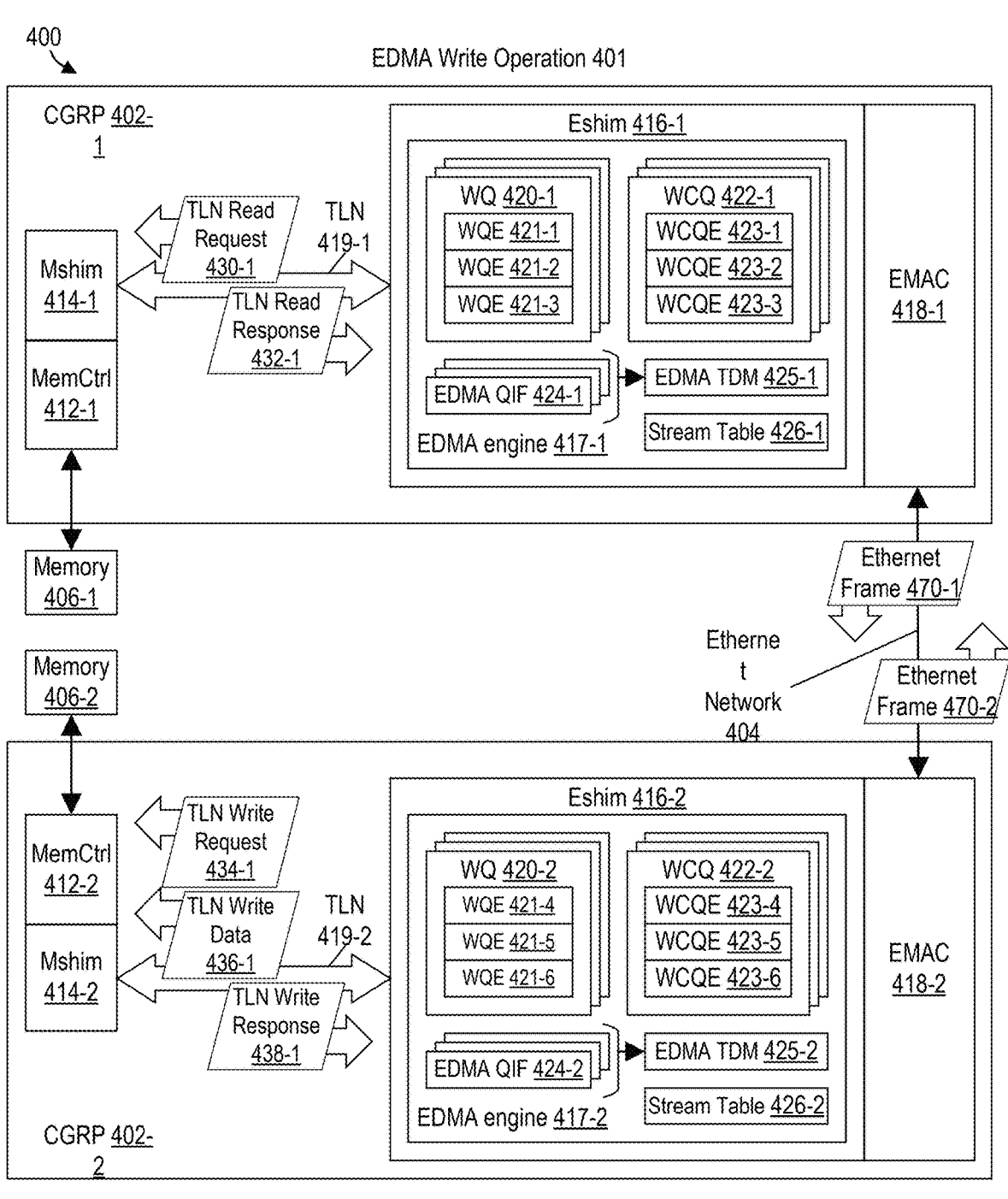
FIG. 4A illustrates an example CGRA system performing an Ethernet direct memory access (EDMA) write operation using an Eshim lossless protocol, according to an implementation of the present disclosure.
FIG. 4B illustrates an example of an EDMA transfer descriptor memory (EDMA TDM) including a transfer descriptor queue (TQ) comprising transfer descriptor queue entries (TQEs), according to an implementation of the present disclosure.

FIG. 4A illustrates an example CGRA system 400 performing an EDMA write operation 401 using an Eshim lossless protocol. In the example EDMA write operation 401, the CGRP 402-1 and the memory 406-1 are the source CGRP and memory, respectively, and the CGRP 402-2 and the memory 406-2 are the destination CGRP and memory, respectively. An EDMA write operation allows the source CGRP 402-1 to perform an EDMA data transfer from the source memory 406-1 to the destination memory 406-2 coupled to the destination CGRP 402-2 over the Ethernet network 404.

The memories 406-1 and 406-2 can each be a memory, such as memory-A 121 and memory-B 122, respectively, previously described with reference to FIG. 1. Different implementations may use various types of memory, such as, but not limited to, DDR DRAM, and/or High Bandwidth Memory (HBM).

As illustrated, the CGRA system 400 includes, but is not limited to, CGRPs 402 including CGRPs 402-1 and 402-2, memories 406 including memories 406-1 and 406-2, and an Ethernet network 404. Each illustrated CGRP 402 includes a memory controller 412, an Mshim 414, an Eshim 416, an Ethernet media access controller (EMAC) 418, and a TLN 419. As shown, each Eshim 416 includes an EDMA engine 417, and each EDMA engine 417 includes one or more configurable work queues (WQs) 420, one or more configurable work completion queues (WCQs) 422, one or more EDMA queue interfaces (EDMA QIFs) 424, an EDMA transfer descriptor memory (TDM) 425, and a stream table 426. As shown, each WQ 420 includes one or more work queue entries (WQEs) 421 and each WCQ 422 includes one or more work completion queue entries (WCQEs) 423, where WQ 420-1 includes WQEs 421-1, 421-2, and 421-3, WQ 420-2 includes WQEs 421-4, 421-5, and 421-6, WCQ 422-1 includes WCQEs 423-1, 423-2, and 423-3, and WCQ 422-2 includes WCQEs 423-4, 423-5, and 423-6. Other implementations may have different organizations of circuitry within each CGRP 402, each Eshim 416, and each EDMA engine 417.

In FIG. 4A, the WQs 420 and the WCQs 422 are shown in a memory in the corresponding EDMA engine 417. In other implementations, the WQs 421 and the WCQs 422 may be in another memory in the corresponding CGRP 402, a local memory 406 couple to the corresponding CGRP 402, or in host memory in the host such as host 101, previously described with reference to FIG. 1.

Each illustrated CGRP 402, memory controller 412, Mshim 414, Eshim 416, EMAC 418, and TLN 419, may be structurally and functionally similar to the corresponding CGRP 200, memory controller 279, Mshim 259, Eshim 257 or 258, Ethernet I/Fs 277 or 278, and TLN 250, respectively, previously described with reference to FIG. 2.

Each Eshim 416 may perform various functions, including serving as an EDMA engine 417 to transfer data between corresponding local and remote memories 406. Each Eshim 416 may use its corresponding EMAC 418 to transmit and receive Ethernet frames between multiple CGRPs 402 over the Ethernet network 404. An Ethernet frame is a data link layer protocol data unit and uses the underlying physical layer transport mechanisms. To do this, each Eshim 416 may support different types of Ethernet frames including, but not limited to, layer 2 (L2) frames, user datagram protocol (UDP) frames, internet protocol (IP)/UDP frames, virtual Extensible LAN (VxLAN) frames, multiprotocol label switching (MPLS) frames, and other types of Ethernet frames.

An EDMA transfer operation may transfer up to a programmable maximum EDMA transfer size, for example, up to 4 GB. An Ethernet frame transfer operation may transfer up to a programmable maximum Ethernet frame payload size of the Ethernet frame, for example, up to 2 KB. As the maximum EDMA transfer size and the maximum Ethernet frame payload size are both programmable, they may be programmed to other values as appropriate.

Each EDMA engine 417 may be a multi-channel DMA engine that provides DMA functionality over Ethernet such as Ethernet network 404 to a dataflow graph executing on multiple CGRPs 402. Each one of the EDMA channels (not shown in FIG. 4A) of an EDMA engine 417 may process its corresponding WQ 420 of the set of WQs 420 concurrently with each of the other EDMA channels processing their corresponding WQ 420, where each EDMA channel may correspond to one WQ 420. In one implementation, each EDMA engine 417 may include 8 EDMA channels, in other implementations each EDMA engine 417 may comprise 1, 2, 4, or another appropriate number of EDMA channels. Each EDMA channel can be configured with different priorities to control the proportion of the Ethernet bandwidth allocated to each flow.

Each WQ 420 contains one or more WQEs 421, where each WQE 421 specifies the details of one EDMA transfer. The WQs 420, the WQEs 421, the WCQs 422, and the WCQEs 423 are configurable and are all programmed by runtime software.

A WQ 420 can either be in an active state where it is processing the WQEs 421 queued in it or in a paused state where WQE processing is suspended. A WQ 420 in a paused state can be in one of the different types of pause states including an initialization pause, an event pause, a jump pause, and an empty pause. In the initialization pause, the WQ 420 is programmed and enabled but not yet triggered to start operation. In the event pause, the WQ 420 is paused because it processed a WQE 421 that suspended its operation with a non-zero pause count. In the jump pause, the WQ 420 is paused because it processed a WQE 421 that suspended its operation with a jump wait attribute. And, in the empty pause, the WQ 420 is paused because it ran out of WQEs 421 to process i.e., the WQ 420 is empty.

Processing of a WQ 420 can be triggered by the dataflow graph executing on a CGRP 402 using EDMA message based triggers or by the runtime software. The WQEs 421 in each WQ 420 are processed when either the WQ 420 is woken up from a pause state, or a hardware or a software trigger occurs. A software trigger occurs when runtime software writes to a doorbell register, which may be used to exit an initialization pause or an empty pause state. A hardware trigger can be used to exit an initialization state, an event state, or jump pause state. A hardware trigger can be sent from the dataflow graph executing on a CGRP 402 as a message based trigger TLN transaction from an AGCU (not shown in FIG. 4A) of the CGRP 402, or an Eshim 416 of the CGRP 402. A hardware trigger can also be sent from another Eshim 416 as a WQE completion notification in the form of a message based trigger TLN transaction. A hardware trigger can further be sent from the same Eshim 416 as a WQE completion notification when the notify local field in the WQE 421 is set to target the current Eshim 416. In this case, there is no message based trigger TLN transaction. Instead, WCQE logic of the WCQ 422 sends an internal signal to the WQ 420 specified in the WCQE 423, which may be the same WQ 420 that contains the completing WQE 421.

As WQEs 421 complete EDMA transfers, WCQEs 423 are appended to the WCQ 422. If a WQE 421 is programmed to do so, this completion event can be notified to the dataflow graph running on the CGR Arrays of the CGRP 402 (not shown in FIG. 4A) or to another EDMA engine 417 of the CGRP 402. The WCQE 423 is then accompanied with a HW completion notification as a message based trigger TLN transaction to a WQ 420 in another Eshim 416 of the CGRP 402 or a VAG (not shown in FIG. 4A), such as VAG0 521-1 described with reference to FIG. 5, on the CGRP 402. The VAG may convert the message based TLN transaction to a control token on the array level network coupled to one CGR array of the CGRP 402. In this way, EDMA transfer operations in different WQs 420 across Eshims 416 and computation in a CGR array in the CGRP 402 can be chained. Chained EDMA transfers will be described in further detail later in the detailed description.

An extension of this behavior is also supported across CGRPs 402 for EDMA write inline transactions described in WQEs 421 of the WQs 420 that require a remote completion. In this case, the EDMA engine 417 at a remote CGRP 402 generates a HW completion notification as a message based TLN transaction to a VAG that is specified in the WQE 421 and communicated to the remote Eshim 416 of the remote CGRP 402 through one of the appropriate EDMA packet headers 440, subsequently described with reference to FIG. 4C.

The progress and size of software triggered WQs 420 may be dynamic and managed by runtime software. In contrast, the HW triggered WQs 420 may be programmed to a fixed size with no runtime software modification during execution.

Once triggered, the WQEs 421 in a WQ 420 are processed in a pipelined fashion until the WQ 420 enters one of the pause state previously described. When a WQ 420 is in an empty pause state, the WQ 420 may resume processing when a software trigger is received and after the runtime software adds WQEs 421 to the WQ 420 and updates its tail pointer.

When a WQ 420 is in an event pause state, the WQ 420 may resume processing of WQEs 421 when a pause count number of hardware triggers are received. The EDMA engine 417 may maintain a counter corresponding to the WQ 420 to count these hardware triggers. The counter counts hardware triggers as they are received, even if the WQ 420 is active and processing WQEs 421. Once the WQE 421 containing the pause count is processed, the counter value is compared each cycle with the pause count. When the counter value is greater than or equal to the pause count, the counter is reset and the WQ 420 resumes operation. When the counter value is less than the pause count, the WQ 420 suspends operation, and the counter continues counting hardware triggers as they are received.

As previously described, EDMA transfer operations are specified as WQEs 421 in a WQ 420 and are processed by an EDMA engine 417. Each WQ 420 has corresponding head and tail pointers maintained by the EDMA engine 417. The EDMA engine 417 reads the WQE 421 from the head pointer location.

Each WQE 421 may include a pause count, which contains the number of hardware trigger events (EDMA message based triggers) that this WQ 420 should be paused for after this WQE 421 is processed. A pause count value of zero means that there should be no pause.

Each WQE 421 may also include notify remote information comprising a remote target notification attribute which may be set to indicate whether a remote target is to be notified of a WQE 421 completion event, a remote target type which indicates whether the remote target is a WQ 420 in an Eshim 416 or a VAG, and a corresponding remote target identifier. When the remote target type indicates the remote target is a WQ 420 in an Eshim 416, the corresponding remote target identifier identifies the WQ 420 to be notified and the Eshim 416 that includes the WQ 420 to be notified. The Eshim 416 including the WQ 420 to be notified may be programmed to be one Eshim 416 of a set of one or more Eshims 416 of the CGRP 402 and the WQ 420 to be notified may be programmed to be one WQ 420 of a set of one or more WQs 420 in the one Eshim 416. For example, the set of one or more Eshims 416 may include one, two, four, eight, ten or another number of different Eshims 416. Similarly, the set of one or more WQs 420 may include one, two, four, eight, or another number of WQs 420. When the remote target type indicates that the remote target is a VAG, the corresponding remote target identifier identifies a virtual CGR array of the remote CGRP 402, which is translated to a physical CGR array, an AGCU identification that identifies an AGCU within the virtual CGR array, and a VAG identification that identifies the VAG in the AGCU.

Each WQE 421 may further include a WQE identifier that is a unique identifier for each WQE 421 that may be used to reference metadata in software for this WQE 421, and an EDMA transfer type, which may be programmed to be an EDMA write transfer, an EDMA write inline transfer, an EDMA read transfer, or an EDMA RAW transfer.

Each WQE 421 may also include a set of attributes, where the set of attributes may include: an enable jump offset attribute for an outgoing EDMA based message trigger; a remote completion queue entry (RCQE) requested attribute; an EDMA ACK requested before a work completion queue entry (WCQE) attribute; an EDMA ACK requested (or read data for an EDMA read) before the WQ may progress past this WQE (exit barrier) attribute; a disable WCQE generation attribute; an end of stream attribute, where the associated stream can be deallocated from the stream table at the end of successful transmission of the last packet for this transfer operation; a generate WQE hardware completion notification(s) attribute, which may be programmed to indicate that: no target is to be notified; a local target specified in the notify local information of this WQE 421 is to be notified; a remote target specified in the notify remote information of this WQE 421 (for EDMA write and EDMA write inline transfer operations) is to be notified; or both local (for all transfer types) and remote targets (for EDMA write and EDMA write inline transfer operations) specified in the notify local information and the notify remote information, respectively; and a jump wait attribute which may indicate that a jump pause state is to be entered and this WQ 420 is to be suspended until a hardware trigger using an EDMA message based trigger with the jump offset enabled is received.

Each WQE 421 may also include the length of bytes in the EDMA transfer operation. The maximum length of bytes to be transferred in an EDMA transfer may be 4 GB or another appropriate maximum length.

Each WQE may also include notify local information comprising a local target notification that may indicate whether a local target is to be notified of a WQE completion event, a local target type that may indicate whether the local target is a WQ 420 in an Eshim 416 or a VAG, and a corresponding local target identifier. When the local target type indicates that the local target is a WQ 420 in an Eshim 416, the corresponding local target ID identifies the Eshim 416 and the WQ 420 to be notified. When the local target type indicates the local target is a VAG, the corresponding local target ID identifies a virtual CGR array of the local CGRP 402, which is translated to a physical CGR array, an AGCU ID that identifies an AGCU within the virtual CGR array, and a VAG ID that identifies the VAG in the AGCU.

Each WQE 421 may also include a write address, where the write address is in the memory 406 coupled to the CGRP 402 for EDMA write and EDMA write inline transfer operations, and the write address is in local memory 406 coupled to the CGRP 402 for EDMA read transfer operations.

Each WQE 421 may also include a read address, where the read address is in the local memory 406 coupled to the CGRP 402 for EDMA write, EDMA RAW, and EDMA write inline transfer operations, and the read address is in remote memory 406 coupled to the CGRP 402 for EDMA read transfer operations.

Each EDMA engine 417 supports various EDMA transfer operations including at least an EDMA write operation described by one WQE 421 and an EDMA read operation described by another WQE 421. Each WQE 421 describes a corresponding EDMA transfer operation. To process one EDMA transfer operation, the CGRP 402 performs a sequence of steps that convert a WQE 421 into Ethernet frames 470 and responses. The WQE 421 is converted into a set of transfer descriptor queue entries (TQEs) 428 of a transfer descriptor queue (TQ) 427. The EDMA engine 417 generates EDMA packet header metadata 477 for each of the corresponding TQEs 428 based on the transfer type of the EDMA transfer operation. The TQEs 428 and the corresponding EDMA packet header metadata 477 describe the Ethernet frame payload 472 for Ethernet frames 470 that constitute the EDMA transfer operation. Each TQE 428 corresponds to and contains the metadata for one Ethernet frame 470 and the corresponding EDMA packet header metadata 477 corresponds to and contains one EDMA packet header 440 and is included in the Ethernet frame payload 477 for the one Ethernet frame 470 to be transmitted through the Eshim 416 and EMAC 418 over the Ethernet network 404. The TQs 427, TQEs 428, and the EDMA TDM 425, the EDMA packet headers 440, and the Ethernet frames 470 and EDMA packet header metadata 477 are subsequently described in further detail with reference to FIGS. 4B, 4C, and 4D, respectively.

During an example EDMA write operation 401 of the CGRA system 400, the EDMA QIF 424-1 of the EDMA engine 417-1 reads the current WQE 421-1 using the EDMA channel and head pointer location associated with the WQ 420-1. The EDMA QIF 424-1 determines that the WQE 421-1 describes an EDMA write transfer based on its EDMA transfer type being set to an EDMA write transfer. The EDMA QIF 424-1 converts the WQE 421-1 to a set of TQEs 428 in a TQ 427 in the EDMA TDM 425. The number of TQEs 428 in the set is determined based on the length of the EDMA transfer in the WQE 421-1 and the maximum size of an Ethernet frame payload 472, where each TQE 428 corresponds to one Ethernet frame 470.

The EDMA QIF 424-1 sets the TQE payload data length, the TQE read address, and the TQE remote write address of each TQE 428 based on the length of the EDMA transfer, the read address, the write address specified in the current WQE 421-1, the maximum size of the Ethernet frame payload 472, and the total length of the TQE payload data length of each of the previous TQEs 428 generated. For example, the EDMA QIF 424-1 may set initial values of a remaining length of the EDMA transfer, a current read address, and a current write address to the length of the EDMA transfer, the read address, and the write address specified in the current WQE 421-1. The EDMA QIF 424-1 may set the TQE payload data length, the TQE read address, and the TQE write address of each of the TQEs 428 to the minimum of the remaining length of the EDMA transfer and the maximum Ethernet frame payload size, the current read address, and the current write address, respectively. Each TQE 428 is generated one at a time and in order from the first TQE 428-1 to the last TQE 428-3, as shown in FIG. 4A. Prior to generating the next TQE 428, the EDMA QIF 424-1 may subtract the payload data length of the current TQE 428 from the remaining length of the EDMA transfer, and add the payload data length of the current TQE 428 to the current read and write addresses.

The EDMA QIF 424-1 may set the EDMA WQ ID, the WQE ID, the inline Ethernet frame payload attribute, and the EDMA packet type of each TQE 428 of the TQ 427 based on the WQ ID of this WQ 420-1, the WQE ID of this WQE 421, whether the EDMA transfer type of this WQE 421 is an EDMA write inline transfer or another type of transfer, and the EDMA transfer type of the current WQE 421-1, respectively.

Similarly, for the last TQE 428-3 of the WQ 420-1, the EDMA QIF 424-1 may set the attributes of the last TQE 428-3 including the EDMA ACK is requested before WCQE generation, the EDMA ACK is requested before WQ can progress beyond the current WQE, the remote completion requested, the end of the associated stream, and the enable remote notification to each corresponding attribute in the associated WQE 421-1, respectively.

The EDMA engine 417-1 of the Eshim 416-1 sends a TLN read request 430-1 to the Mshim 414-1 over the TLN 419-1 to retrieve data at the TQE read address for the TQE payload data length specified in the corresponding TQE 428. The Mshim 414-1 receives the TLN read request 430-1 and provides the memory read information including the TQE read address and the TQE payload data length to the memory controller 412-1 to initiate the memory read. The memory controller 412-1 performs the memory read to transfer the data from the memory 406-1 to the Mshim 414-1. Once the memory controller 412-1 completes the memory read, the Mshim 414-1 sends, over the TLN 419-1, a TLN read response 432-1.

The EDMA engine 417-1 receives the TLN read response 432-1 including the TQE read address, the TQE payload data length, and the data read from the memory 406-1. The EDMA engine 417-1 generates an EDMA write packet header 442 for the current TQE 428, where the write address 451 of this EDMA write packet header 442 is set to the remote address specified in the current TQE 428, the CGRP ID 453 is set to the ID of this CGRP 402-1, the write attributes 454 are set to the corresponding attributes of the current TQE 428, the WQE ID 456 is set to the WQE ID specified in the current TQE 428, the EDMA channel ID 457 is set to the ID of this EDMA channel of the EDMA engine 417-1, and the write data length 458 and the EDMA packet type 460 are set to the TQE payload data length and the EDMA transfer type specified in the current TQE 428. The EDMA engine 417-1 stores the data read from the memory 406-1 of the TLN read response 432-1 and the EDMA write packet header 442 at an address in a TX data buffer in the Eshim 416-1, where the address in the TX data buffer is associated with the current TQE 428 in the EDMA TDM 425.

The Eshim 416-1 generates an Ethernet frame 470-1 including an Ethernet header 471-1 and an Ethernet frame payload 472-1 comprising a lossless Ethernet Frame (LEF)

header 473-1, LEF metadata 474-1, data 475-1, and FCS/CRC 476-1. When the transfer is an EDMA type transfer, the Eshim 416-1 adds EDMA packet header metadata 477-1 to the Ethernet frame payload 472-1. The Eshim 416-1 sets the contents of the LEF header 473-1 and LEF metadata 474-1 based on the frame ID of this Ethernet frame 470-1, the corresponding content of the EDMA write packet header 442, the ID of each of the CGRPs 402-1 and 402-2, and the ID of the Eshim 416-2 of CGRP 402-2. The Eshim 416-1 adds the data and the EDMA write packet header 442 stored in the TX data buffer to data 475-1 and the EDMA packet header metadata 477-1 of the Ethernet frame payload 472-1, respectively.

The Eshim 416-1 may transmit, using the EMAC 418-1, the Ethernet frame 470-1 over the Ethernet network 404 to the CGRP 402-2.

The EMAC 418-2 of the CGRP 402-2 may receive the Ethernet frame 470-1 based on the MAC address in the Ethernet Header 471-1 matching the MAC address of the EMAC 418-2. The EMAC 418-2 provides the Ethernet frame 470-1 to the Eshim 416-2. The Eshim 416-2 de-frames the Ethernet frame 470-1 and generates a TLN write request 434-1 and TLN write data 436-1 based on the EDMA packet header metadata 477-1 and the data 475-1 in the Ethernet frame 470-1. The Eshim 416-2 sends the TLN write request 434-1 and TLN write data 436-1 to the Mshim 414-2 over the TLN 419-2 to perform a memory write of the TLN write data 436-1 to the memory 406-2.

The Mshim 414-2 receives the TLN write request 434-1 and provides memory write information including the write address 451-1, the write data length 458-1, and the TLN write data 436-1 to the memory controller 412-2 to initiate the memory write. The memory controller 412-2 performs the memory write to transfer the TLN write data 436-1 to the write address 451-1 in the memory 406-2. Once the memory controller 412-2 completes the memory write, the Mshim 414-2 sends, over the TLN 419-2, a TLN write response 438-1 to the Eshim 416-2 indicating that the memory write has been completed.

In one or more implementations, the EDMA operation may be a scatter/gather EDMA operation and instead of providing one memory address and the data length of the data to be accessed, a pair of a memory addresses and corresponding data lengths at the memory addresses provided for each piece of data in the scatter/gather EDMA operation.

In one or more implementations, the Eshim 416 may also implement a lossless Ethernet protocol that may provide lossless network connectivity for dataflow applications over the Ethernet network 404 when the Eshim 416 detects Ethernet frame drops over a Layer 2 Ethernet network.

Referring back to FIG. 4A, during operation in this example, the Eshim 416-1 of the CGRP 402-1 may add the LEF header 473-1 to each Ethernet frame 470-1 to be transmitted to the CGRP 402-2. In addition, the EDMA traffic may be saved in a replay buffer as a possible replay source in the event of dropped traffic. Each buffered EDMA packet may be tracked using the stream number 487-1 and the packet sequence number (PSN) 486-1.

At the Eshim 416-2 of the CGRP 402-2, the PSN 486-1 of the received Ethernet frame 470-1 may be checked against the next expected PSN 486 for the stream designated by the stream number 487-1 to see if there is a match. If there is a match, traffic continues to propagate normally and a return Ethernet frame 470-2 with an ACK packet type 485-2 is sent to the CGRP 402-1 with the PSN 486-2 and stream number 487-2 of the successfully received incoming Ethernet frame 470-1. If there is a mismatch, the CGRP 402-2 may send the response Ethernet frame 470-2 back to the CGRP 402-1 with a NACK packet type 485-2 to indicate it is missing an Ethernet frame 470 in the sequence. The CGRP 402-2 may also drop all incoming Ethernet frames 470 that don't match the next expected PSN 486.

Back at the Eshim 416-1 of the CGRP 402-1, if the NACK is received, replay processing commences. Any new EDMA packets from that stream are stalled. The PSN 486-2 and the stream number 487-2 delivered from the NACK frame are used to index into the replay buffer. The CGRP 402-1 resends all traffic in the corresponding replay buffer from the PSN 486-2 from the NACK frame up to the current PSN 486-1 being processed in the transmit pipeline. Once all replay is completed, new EDMA traffic can resume.

At the CGRP 402-1, the stream number 487-1 may be used to determine which replay buffer location the data transferred from the memory 406-1 to the Eshim 416-1 associated with the TLN read request 430-1 is copied into. At the CGRP 402-2, the stream number 487-1 along with the MAC address of the initiating Eshim 416-1 on the CGRP 402-1 may be used to determine checks against correct PSN 486 sequencing for that Stream.

Referring to FIG. 4B, an illustrated EDMA TDM 425 includes a TQ 427 comprising TQEs 428-1, 428-2, and 428-3. As illustrated, each TQE 428 may include an inline Ethernet frame payload attribute that indicates whether the Ethernet frame payload associated with this TQE 428 is inline or not (no TLN read request is needed for an inline Ethernet frame payload), an EDMA WQ and channel iden-tifier (EDMA WQ ID) that identifies the WQ and the EDMA channel associated with this TQE 428, and an EDMA packet type, which may be set to indicate whether the packet type is an EDMA write packet, an EDMA ACK packet, an EDMA read packet, an EDMA read response packet, or an EDMA RAW packet.

Each TQE 428 may also include a set of attributes, where the set of attributes may include: an attribute that may indicate whether an EDMA ACK is requested or not (0 for EDMA RAW); an attribute that indicates whether this TQE 428 is the last Ethernet frame of a WQE (set to 1 for EDMA RAW); an attribute that indicates whether this TQE 428 is a remote completion or not (only for EDMA write inline WQEs); an attribute that indicates whether this TQE 428 is the end of the associated stream, where the associated stream can be deallocated from the stream table at the end of the successful transmission of the last Ethernet frame for this transfer operation when the TQE 428 is the end of the stream; an attribute that indicates whether a remote notifi-cation to notify a remote VAG is enabled or not; and an attribute that indicates whether a read from memory over the TLN is to be performed or not for this TQE 428.

Each TQE 428 may further include a TQE read address of the TLN request, tags for TLN requests making up the Ethernet frame payload, a TQE payload data length (i.e., the payload data size), a WQE identifier (WQE ID) from the EDMA WQE, address generation information which may be a virtual CGRP identifier (VCGRP ID) for a virtual address or a physical stream ID for a physical address, and a remote device address at a remote CGRP.

Referring to FIG. 4C, illustrates examples of EDMA packet headers 440 including an EDMA write packet header 442, an EDMA write with remote graph notification packet header 443, an EDMA read packet header 444, an EDMA read with remote graph notification packet header 445, an EDMA read response packet header 446, and an EDMA ACK packet header 447.

The illustrated EDMA write packet header 442 includes a write address 451, a CGRP identifier (ID) 453, write attri-butes 454, a WQE ID 456, an EDMA channel ID 457, a write data length 458, and an EDMA packet type 460. The write address 451 may be an address in memory 406 where the data is to be written. The CGRP ID 453 may be the ID of the CGRP 402 that is coupled to the memory 406. The write attributes 454 may include an attribute that indicates whether an EDMA ACK is requested, an attribute that indicates whether this EDMA packet is the last frame of the associated WQE, an attribute that indicates whether a remote completion is requested, and an attribute that indicates whether a remote VAG is to be notified. The EDMA packet type 460 may be an EDMA write, an EDMA read response, an EDMA write with remote graph notification, an EDMA read, or an EDMA ACK packet type. In this example, the EDMA packet type is a EDMA write packet.

As illustrated, the EDMA write with remote graph noti-fication packet header 443 includes address generator (AG) information 450 and the information in the EDMA write packet header 442, previously described. The AG informa-tion 450 may identify the recipient of a message based trigger to be sent, where the recipient may be a VAG (not shown in FIG. 4A or 4E) or an Eshim 416 such as Eshim 416-1 or 416-2, previously described with reference to FIGS. 4A and 4E, respectively.

As shown, the EDMA read packet header 444 comprises a read address 452, read attributes 455, a read data length 459, and the information in the EDMA write packet header 442, previously described, except for the write attributes 454. The read address 452 may be an address in memory 406 where the read data is to be read from. The read attributes 455 may include an attribute that indicates whether a WQ progress barrier is to be released, or a write completion notification is to be generated, and an attribute that indicates whether this EDMA packet is the last frame of the associated WQE. The read data length 459 may be the length of the read data that is to be read.

The illustrated EDMA read with remote graph notification packet header 445 includes the AG information 450, previ-ously described, and the information in the EDMA read packet header 444.

As shown, the EDMA read response packet header 446 includes the information in the EDMA write packet header 442, previously described.

The illustrated EDMA ACK packet header 447 includes the WQE ID 456, the EDMA channel ID 457, the write data length 458, and the EDMA packet type 460, previously described.

Figure 4D:
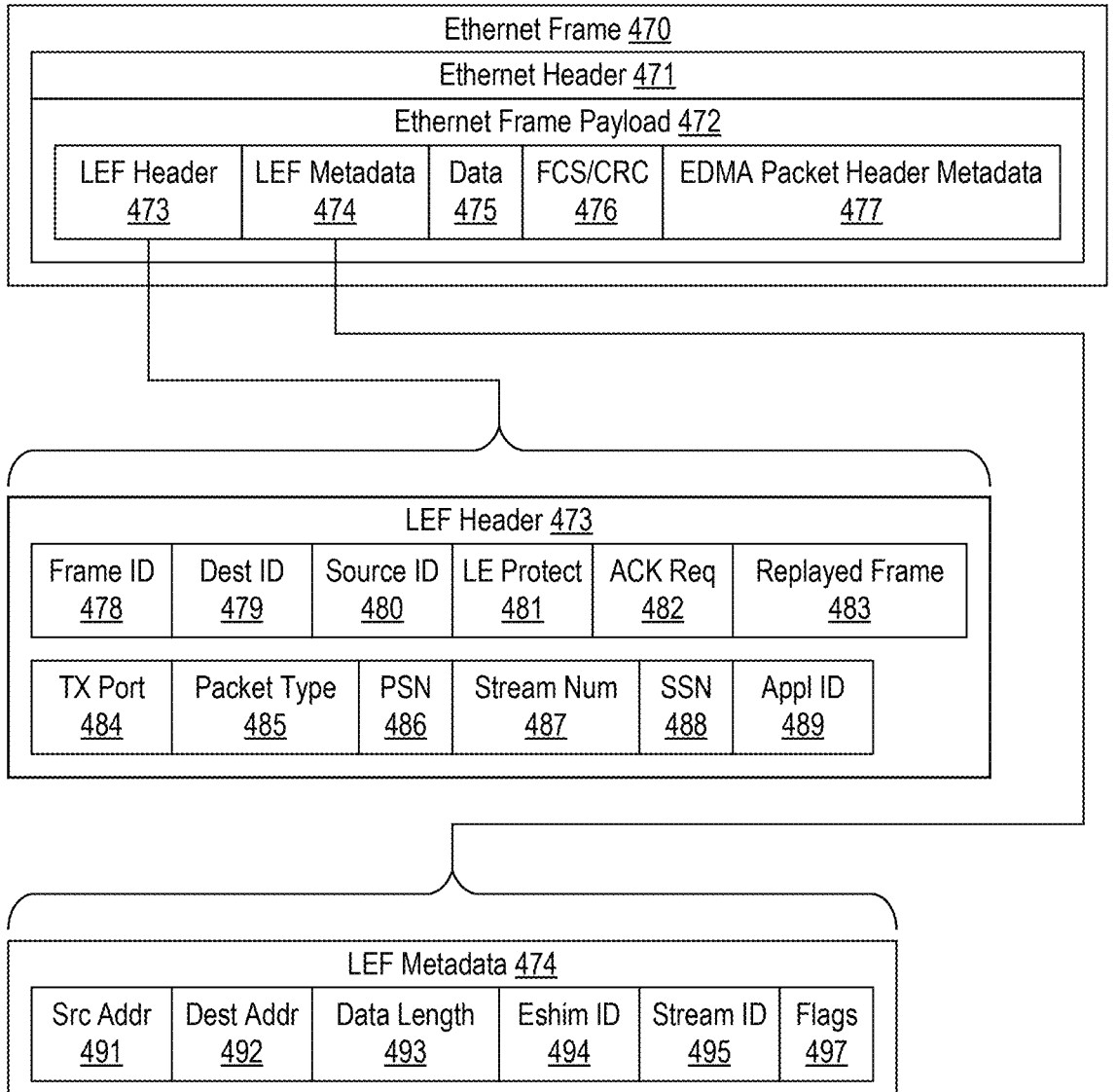
FIG. 4D illustrates an example of an Ethernet frame including an Ethernet header and Ethernet frame, according to an implementation of the present disclosure.

Referring to FIG. 4D, the illustrated example Ethernet frame 470 includes an Ethernet header 471 and a Ethernet frame payload 472 including a LEF header 473, LEF meta-data 474, data 475, and a frame check sequence (FCS) including a cyclic redundancy check (CRC), FSC/CRC 476. In this example, when the transfer is an EDMA type transfer, the Ethernet frame payload 472 further includes EDMA packet header metadata 477. The LEF header 473 may be used to detect any in-transit corruption of data. The Ethernet frame 470 including the Ethernet header 471 and the Eth-ernet frame payload 472 are illustrated according to an implementation. Other implementations may include some-what different information in the Ethernet frame 470, the Ethernet frame payload 472, the LEF header 473, the LEF metadata 474, the data 475, the FCS/CRC 476, and the EDMA packet header metadata 477 to implement a lossless protocol within the scope of this disclosure.

As illustrated in FIG. 4D, the EDMA packet header metadata 477 in the Ethernet frame payload 472 of the Ethernet frame 470 may include the EDMA write packet header 442, the EDMA write with remote graph notification packet header 443, the EDMA read packet header 444, or the EDMA ACK packet header 447 based on the EDMA packet type of the EDMA transfer.

As illustrated in FIG. 4D, the LEF header 473 may comprise an Ethernet frame ID 478, a destination ID 479 to identify the destination CGRP 402 and Eshim 416, a source ID 480 to identify the source CGRP 402 and Eshim 416, a lossless Ethernet (LE) protected indicator 481, an acknowledgement (ACK) request indicator 482, a replayed frame indicator 483, a transfer (TX) port 484, a packet type 485, a PSN 486, a stream number 487, a stream sequence number (SSN) 488, and an application ID 489.

A specific predetermined value for the Ethernet frame ID 478 indicates that the Ethernet frame 470 utilizes the lossless Ethernet protocol and includes the LEF header 473 described herein.

The LE protected indicator 481 may indicate that the specific Ethernet frame is within a stream that is protected by a lossless Ethernet protocol.

The ACK request indicator 482 may indicate that the current Ethernet frame 470 requires an ACK back from a CGRP 402. When a CGRP 402 sets the ACK request indicator 482 in the LEF header 473 to indicate that an ACK is requested, it directs the CGRP 402 to reply with an ACK. Regardless of receiving the ACK request indicator 482, the CGRP 402 may be configured to send periodic ACK frames to the CGRP 402.

The replayed frame indicator 483 may indicate that the current Ethernet frame 470 is a re-transmission Ethernet frame in response to a dropped Ethernet frame. When the CGRP 402 sets the replayed frame indicator 483 in the LEF header 473 to indicate that the current Ethernet frame 470 is a re-transmission Ethernet frame, it may indicate to the CGRP 402 that the Ethernet frame 470 is a re-transmission Ethernet frame triggered by a previous NACK event.

The packet type 485 may identify the type of packet, such as, a start stream packet, a P2P packet, an EDMA packet, an ACK packet, or a negative acknowledgement (NACK) packet.

The PSN 486 may be sequentially incremented for each Ethernet frame 470 of a protected stream. The PSN 486 may have a value of zero for each Ethernet frame 470 of a non-protected stream. The CGRP 402 may set the PSN 486 of every Ethernet frame 470 that is to be transmitted.

The stream number 487 may identify which of the active streams on the CGRP 402 sent this Ethernet frame 470.

The SSN 488 may be associated with a stream and may remain constant throughout the lifetime of the associated stream. An SSN 488 for each stream may be initialized to a value of zero and may be sequentially incremented when the associated stream ends and is deallocated. The SSN 488 may be used to differentiate packets belonging to different PSN sequences which may be using the same stream related hardware. The PSN 486 may not be used for each Ethernet frame 470 of a non-protected stream.

The application ID 489 may identify the application associated with the Ethernet frame 470. The application identified by the application ID 489 may be a dataflow graph that may be configured onto at least the CGRP 402-1 and the CGRP 402-2, and is to be executed on these CGRPs 402.

As shown in FIG. 4D, the LEF metadata 474 of the Ethernet frame 470 includes source and destination addresses 491 and 492 for the transaction, a data length 493 of the transaction, an Eshim ID 494, a stream ID 495, and flags 497. In some implementations, the LEF metadata 474 may include any other metadata that may be helpful in the implementations. In at least one implementation, the flags 497 provide the transaction type information.

Figure 4E:
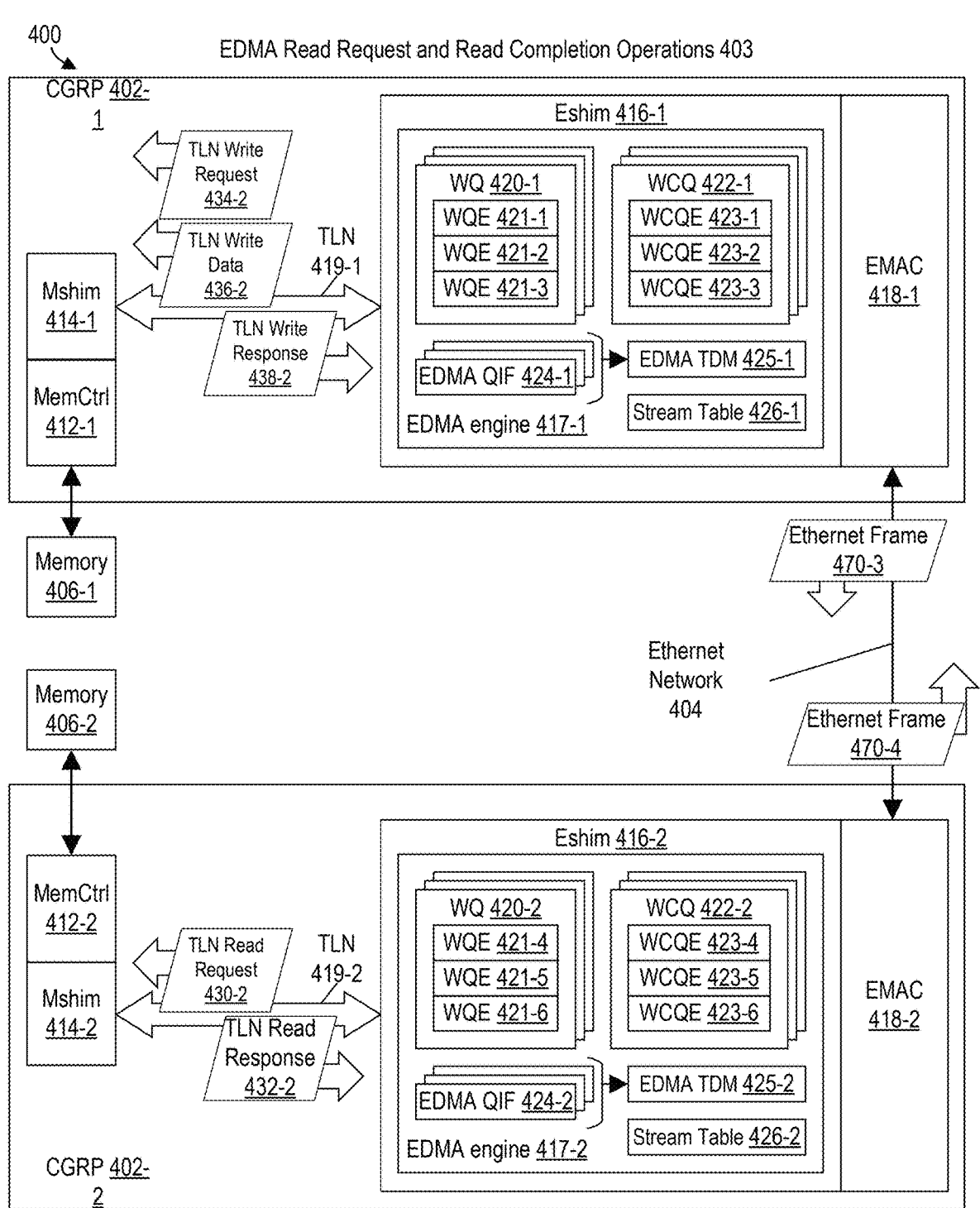
FIG. 4E illustrates the example CGRA system of FIG. 4A performing EDMA read request and read completion operations using the Eshim lossless protocol, according to an implementation of the present disclosure.

FIG. 4E illustrates the example CGRA system 400, previously described with reference to FIG. 4A, performing example EDMA read request and read completion operations 403, which together constitute a complex remote DMA read operation. In the example EDMA read request and read completion operations 403, the CGRP 402-2 and the memory 406-2 are the source CGRP and the source memory, respectively, and the CGRP 402-1 and the memory 406-1 are the destination CGRP and the destination memory, respectively. The EDMA read request and read completion operations 403 allow the destination CGRP 402-1 to request the source CGRP 402-2 to perform an EDMA data transfer from the source memory 406-2 to the destination memory 406-1 over the Ethernet network 404. The EDMA read request and read completion operations 403 function similarly to the EDMA write operation 401, previously described with reference to FIG. 4A.

During EDMA read request and read completion operations 403, the EDMA QIF 424-1 of the EDMA engine 417-1 associated with WQ 420-1 reads the current WQE 421-1, determines that the WQE 421-1 describes an EDMA read transfer, and converts the WQE 421-1 into a read TQE 428 in the TQ 427 in the EDMA TDM 425. The EDMA QIF 424-1 sets the TQE payload data length, the TQE write address, and the TQE remote read address of the read TQE 428 based on the length of the EDMA transfer, the write address, and the read address specified in the current WQE 421-1. The EDMA QIF 424-1 generates an EDMA read packet header 444 for the TQE 428 in a similar manner to the generation of the EDMA write packet header 442, previously described with reference to FIG. 4A. The additional read address 452 and the read data length 459 of the EDMA read packet header 444 are set to the remote (read) address and the TQE payload data length specified in the current TQE 428. The EDMA QIF 424-1 stores the EDMA read packet header 444 in the TX data buffer in the Eshim 416-1.

The Eshim 416-1 of the CGRP 402-1 generates an Ethernet frame 470-3 to perform a remote EDMA read operation to retrieve data in the memory 406-2 coupled to the CGRP 402-2. The Eshim 416-1 sets the contents of a LEF header 473-3 and LEF metadata 474-3 based on the corresponding content of the EDMA read packet header 444, the IDs of the CGRPs 402-1 and 402-2, and the ID of the Eshim 416-2. The Eshim 416-1 adds the EDMA read packet header 444 stored in the TX data buffer to the EDMA packet header metadata 477-3. The Eshim 416-1 transmits, using the EMAC 418-1, the Ethernet frame 470-3 over the Ethernet network 404 to the CGRP 402-2.

The EMAC 418-2 of the CGRP 402-2 receives the Ethernet frame 470-3 based on the MAC address in the Ethernet Header 471-3 matching the MAC address of the EMAC 418-2. The EMAC 418-2 provides the Ethernet frame 470-3 to the Eshim 416-2.

The Eshim 416-2 de-frames the Ethernet frame 470-3 and the EDMA engine 417-2 generates a TLN read request 430-2 including a read address and read data length based on the read address 452 and the read data length 459 of the EDMA read packet header 444 from the Ethernet packet header metadata 471-3. The EDMA engine 417-2 sends the generated TLN read request 430-2 to the Mshim 414-2 over the TLN 419-2 to retrieve data from the memory 406-2 at the read address 452 of the EDMA read packet header 444.

The Mshim 414-2 receives the TLN read request 430-2 and provides the memory read information, including the read address 452 and the read data length 459 of the TLN read request 430-2 to the memory controller 412-2 to initiate the memory read. The memory controller 412-2 performs the memory read to transfer the data from the memory 406-2 to the Mshim 414-2. Once the memory controller 412-2 completes the memory read, the Mshim 414-2 sends, over the TLN 419-2, a TLN read response 432-2, including the data transferred from the memory 406-2, to the EDMA engine 417-2. The EDMA engine 417-2 receives the TLN read response 432-2, generates an EDMA read response packet header 446, and provides the EDMA read response packet header 446 and the data from the TLN read response 432-2 to the Eshim 416-2.

The Eshim 416-2 generates an Ethernet frame 470-4 comprising an Ethernet header 471-4, and a Ethernet frame payload 472-4 including a LEF header 473-4, LEF metadata 474-4, data 475-4, an FSC/CRC 476-4, and EDMA packet header metadata 477-4 based on the EDMA read response packet header 446 and the data from the TLN read response 432-2. The Eshim 416-2 encapsulates the LEF header 473-4, the LEF metadata 474-4, the data 475-4, the FCS/CRC 476-4, and the EDMA packet header metadata 477-4 into the Ethernet frame payload 472-4 of the Ethernet frame 470-4. The Eshim 416-2 transmits, using the EMAC 418-2, the Ethernet frame 470-4 over the Ethernet network 404 to the CGRP 402-1.

The EMAC 418-1 of the CGRP 402-1 receives the Ethernet frame 470-4 and provides the Ethernet frame 470-4 to the Eshim 416-1. The Eshim 416-1 de-frames the Ethernet frame 470-4. The EDMA engine 417-1 generates a TLN write request 434-2 including a write address and write data length, and TLN write data 436-2 based on the EDMA read response packet header 446 from the EDMA packet header metadata 477-4 and the data 475-4 from the Ethernet frame 470-4. The EDMA engine 417-1 sends the TLN write request 434-2 and the TLN write data 436-2 to the Mshim 414-1 over the TLN 419-1 to perform a memory write of the TLN write data 436-2 at the write address of the TLN write request 434-2 into the memory 406-1.

The Mshim 414-1 provides the write address and the write data length of the TLN write request 434-2, and the TLN write data 436-2 to the memory controller 412-1 coupled to the Mshim 414-1 to initiate the memory write. The memory controller 412-1 performs the memory write to transfer the TLN write data 436-2 to the write address in the memory 406-1. Once the memory controller 412-1 completes the memory write, the Mshim 414-1 sends, over the TLN 419-1, a TLN write response 438-2 indicating that the TLN write request 434-2 has been completed.

Figure 5:
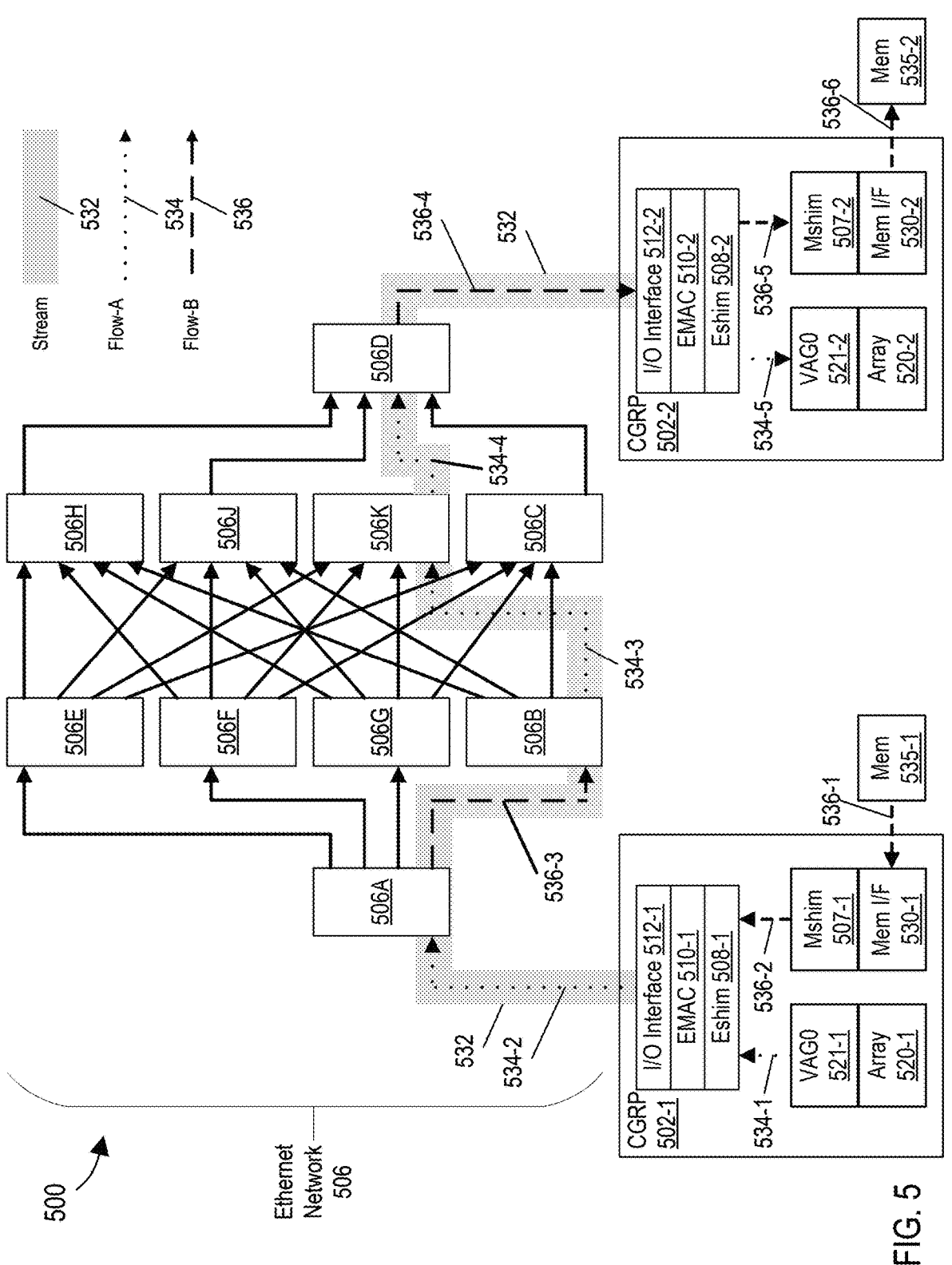
FIG. 5 is a block diagram illustrating an example CGRA system including a communication stream having flows from one CGRP to another CGRP over an Ethernet network, according to an implementation of the present disclosure.

FIG. 5 is a block diagram illustrating an example CGRA system 500 including a communication stream having two flows from one CGRP to another CGRP over an Ethernet network, according to an implementation of the present disclosure. The illustrated CGRA system 500 includes CGRPs 502-1 and 502-2, and an Ethernet network 506. The illustrated CGRP 502-1 includes Eshim 508-1, EMAC 510-1, I/O interface 512-1, VAGs including VAG0 521-1, array 520-1, Mshim 507-1, and memory interface 530-1 coupled to memory 535-1. Similarly, CGRP 502-2 includes Eshim 508-2, EMAC 510-2, I/O interface 512-2 VAGs including VAG0 521-2, array 520-2, Mshim 507-2, and memory interface 530-2 coupled to memory 535-2.

A flow, as the term is used herein, is a set of transactions between one particular source in the CGRP 502-1 to another particular destination on the CGRP 502-2. A stream, as the term is used herein, includes one or more flows having a common CGRP 502-1 and CGRP 502-2. In some implementations, all flows within a stream share the same source Eshim and destination Eshim and use the same Ethernet Traffic Class. In the illustrated CGRA system 500, flow 534 including flow portions 534-1 to 534-5 are unidirectional, P2P transactions, generated from one endpoint in CGRP 502-1 to another endpoint in CGRP 502-2. Flow 536 including flow portions 536-1 to 536-6 are unidirectional, EDMA transactions, generated from one endpoint in CGRP 502-1 to another endpoint in CGRP 502-2.

The order of the transactions within both flows 534 and 536 are preserved and are delivered in order. In the example shown, flow 534 includes P2P transactions including a sequence of streaming writes (SWRITEs) from VAG0 521-1 of CGRP 502-1 to VAG0 521-2 of CGRP 502-2. Flow 536 includes EDMA transactions comprising a sequence of EDMA write operations from memory 535-1 of CGRP 502-1 to memory 535-2 of CGRP 502-2. As another example, flow 536 may include EDMA transactions comprising a sequence of corresponding EDMA read requests from CGRP 502-1 to CGRP 502-2, and read completion operations from memory 535-2 of CGRP 502-2 to memory 535-1 of CGRP 502-1. The first flow 534 and the second flow 536 are different flows, not the same flow, within the same stream 532.

As shown, a stream 532 may be an aggregation and encapsulation of flows from I/O interface 512-1 of CGRP 502-1, to another I/O interface 512-2 of CGRP 502-2. The stream 532 may encapsulate several elements including a CGRP, a source MAC address, a CGRP ID, a destination MAC address, stream specific buffers, and hardware elements on the transmitting and receiving CGRPs 502-1 and 502-2, respectively. The order of transactions within stream 532 is preserved. However, there is no ordering of transactions maintained between different streams.

Example stream 532 may include multiple flows including flows 534 and 536 although in some cases a stream may include only a single flow. The transactions within stream 532 need to be delivered from the CGRP 502-1 over Ethernet network 506 to the CGRP 502-2 in order. This means that the Ethernet network 506 needs to preserve the order of the transactions within stream 532. This can be accomplished by using separate Ethernet links between each pair of I/O interfaces 512-1 and 512-2 of CGRPs 502-1 and 502-2 or by using switches and/or routers in the network 506 that are configured to route Ethernet frames in the same way as long as they have identical Ethernet headers. Further, this means that the engine implementing stream 532 and its mechanisms needs to satisfy various network requirements so that the Ethernet network 506 preserves the order of the transactions.

A stream, such as stream 532, may exist between two CGRPs, such as CGRPs 502-1 and 502-2. However, stream 532 may not exist within a CGRP, such as the two CGRPs 502-1 and 502-2. A flow, for example, flows 534 or 536, may exist between the two CGRPs 502-1 and 502-2 and within both CGRPs 502-1 and 502-2.

FIGS. 6A, 6B, 6C, and 6D are block diagrams illustrating an example CGRA system 600 for initiating direct memory access from a dataflow graph running across multiple CGRPs using message based triggers, according to an implementation of the present disclosure. As will become clear in the following detailed description, the DMA functionality initiated from a dataflow graph running across multiple CGRPs using message based triggers may be runtime configured by the host 101 but dataflow is orchestrated by the CGRA system 600 without runtime environment or host 101 involvement.

FIG. 6A is a simplified block diagram illustrating the example CGRA system 600 for initiating direct memory access from a dataflow graph running across multiple CGRPs using message based triggers, according to an implementation of the present disclosure. As illustrated, CGRA system 600 includes, but is not limited to, CGRPs 602-1 and 602-2, and an Ethernet network 606. The illustrated CGRP 602-1 comprises an Eshim 608, an Ethernet media access controller (EMAC) 610, an I/O interface 612, a TLN 618, an Mshim 614, a memory controller 613 coupled to external memory 615, and a CGR array 617 including configurable units 616 and an AGCU 619. The I/O interface 612 implements the physical layer of the Ethernet protocol. The illustrated Eshim 608 includes an EDMA engine 690, a LEF outbound engine 630, a LEF inbound engine 660, and a P2P engine 689. The Eshim 608, the EDMA engine 690, the TLN 618, the Mshim 614, the memory controller 613, and the CGR array 617 including the configurable units 616 and the AGCU 619 may be structurally and functionally similar to the Eshim 416, the EDMA engine 417, the TLN 419, the Mshim 414, the memory controller 412, and the CGR array 201 including the configurable units 300 and an AGCU 210, such as AGCU 211 to AGCU 214, previously described with reference to FIGS. 2, 3, 4A, and 4E.

The illustrated Eshim 608 may perform various functions, including acting as an interface between the Ethernet network 606 and the TLN 618 for P2P transactions, and serving as an EDMA engine 690 to transfer data between local memory, such as memory 615, and remote memory, such as host memory or memory attached to a remote CGRP, such as CGRP 602-2. Communication between one or more CGRPs using P2P protocol is described in related U.S. patent application Ser. No. 18/383,718, published as US 2024/0073129, entitled "Peer-To-Peer communication between Reconfigurable Dataflow Units," which has been incorporated by reference into this disclosure. In that application a P-Shim is described which acts as an interface between the TLN and a Peripheral Component Interconnect Express (PCIe) channel. The LEF Outbound Engine 630 and the LEF Inbound Engine 660 in Eshim 608 may include much of the same functionality to enable P2P transactions to flow between CGRPs except that the transactions are encapsulated in Ethernet frames instead of PCIe transaction level packets.

The illustrated Eshim 608 may use the I/O interface 612 to transmit and receive Ethernet frames between multiple CGRPs, including CGRPs 602-1 and 602-2, over an Ethernet network 606.

FIG. 6B is a block diagram showing more detail of EMAC 610 of the CGRA system 600 of FIG. 6A, according to an implementation of the present disclosure. The EMAC 610 may pass Ethernet frames between an Ethernet network and a dataflow graph configured onto at least CGRPs 602-1 and 602-2, through the I/O interface 612 and the Eshim 608. The EMAC 610 contains asynchronous FIFOs to buffer incoming Ethernet frames from the Ethernet network 606 to the Eshim 608, and outgoing Ethernet frames from the Eshim 608 to the Ethernet network 606. The illustrated I/O interface 612 (i.e. Ethernet physical layer interface, or Phy) may provide Ethernet connectivity to CGRP 602-1.

FIG. 6C is a block diagram showing more detail of the EDMA engine 690 of the CGRA system 600 of FIG. 6A, according to an implementation of the present disclosure. The illustrated EDMA engine 690 includes an EDMA QIF 692, one or more WQs 691 that can each hold one or more WQEs comprising WQE 693-1, WQE 693-2, and WQE 693-3, an EDMA TDM 694, one or more WCQs 695 that can each hold one or more WCQEs including WCQE 697-1, WCQE 697-2, and WCQE 697-3, and a stream table 698. The EDMA engine 690 may generate EDMA packet headers including EDMA write and read response packet headers 442, EDMA write with remote graph notification packet headers 444, EDMA read packet headers 444, and EDMA ACK packet headers 447 and store the generated EDMA packet headers in the EDMA TDM 694 based on the corresponding WQEs 421. Other implementations may have different organizations of circuitry within the Eshim 608.

Figure 6D:
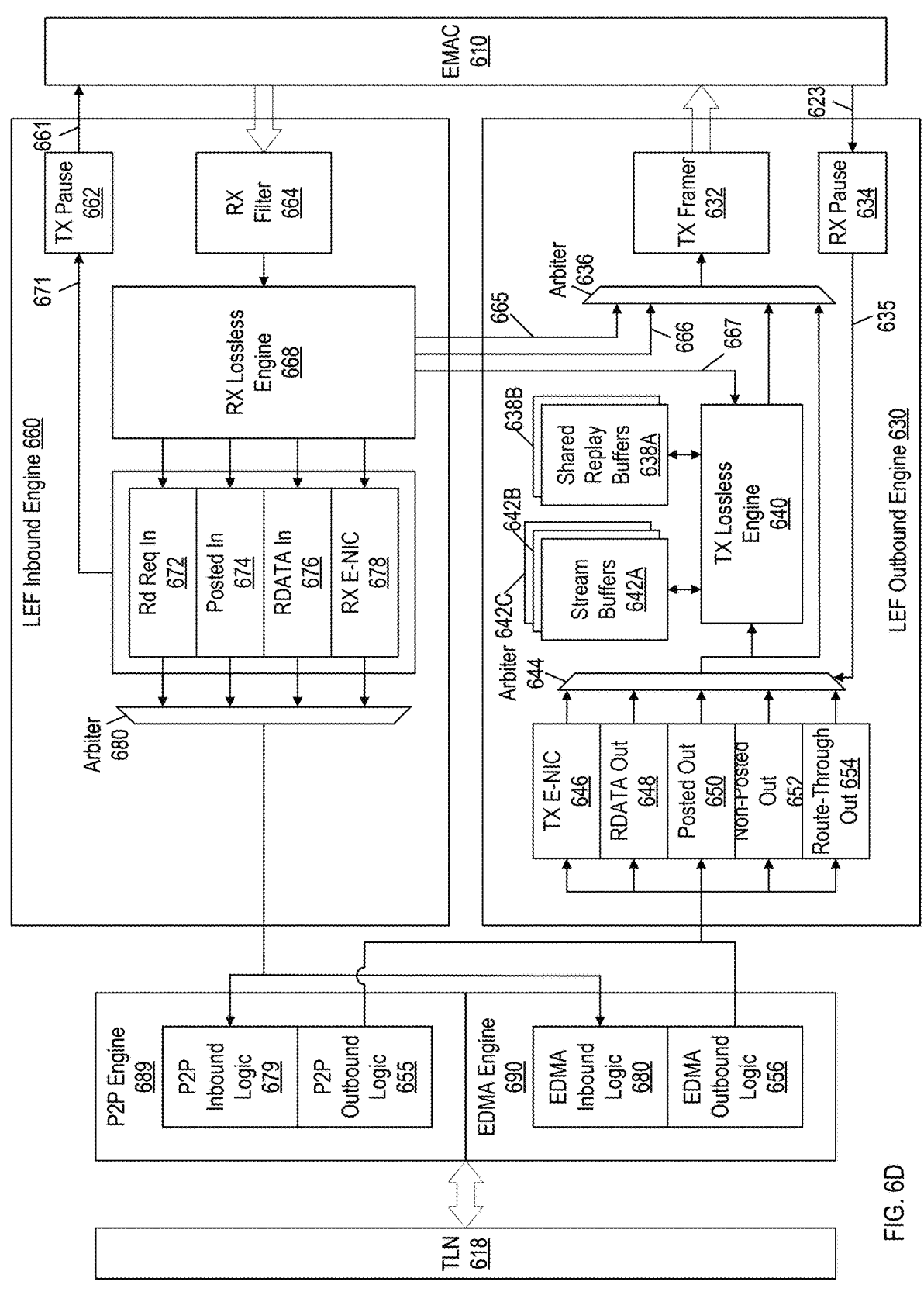
FIG. 6D is a block diagram showing more detail of the LEF outbound engine 630, the LEF inbound engine 660, the P2P engine 689, and the EDMA engine 690 of the CGRA system 600 of FIG. 6A, according to an implementation of the present disclosure.

FIG. 6D is a block diagram showing more detail of the LEF outbound engine 630, the LEF inbound engine 660, the P2P engine 689, and the EDMA engine 690 of the CGRA system 600 of FIG. 6A, and the P2P engine 689 according to an implementation of the present disclosure. The illustrated LEF outbound engine 630 includes a TX framer 632, an RX pause circuit 634, an arbiter 636, shared replay buffers 638, stream buffers 642, TX lossless engine 640, an arbiter 644, and outbound buffers 646-654. The illustrated EDMA engine 690 includes EDMA inbound logic 680 and EDMA outbound logic 656. The illustrated P2P engine 689 includes P2P inbound logic 679 and P2P outbound logic 655. In some implementations, the shared replay buffer 638 may be divided into multiple buffers, such as a first shared replay buffer 638A to hold header information, such as an Ethernet header 471, the LEF header 473, the LEF metadata 474, and/or the EDMA packet header metadata 477 of transmitted Ethernet frames 470, and a second shared reply buffer 638B to hold the data 475 of the transmitted Ethernet frames 470. Some implementations may include multiple stream buffers, such as a first stream buffer 642A for a first stream, a second stream buffer 642B used for a second stream, and a third stream buffer 642C for a third stream. Any number of stream buffers 642 may be included to support an equivalent number of streams, depending on the implementation. The P2P engine 689 acts as an interface for P2P transactions received over the TLN 618 and includes circuitry to properly interpret and handle such transactions. The EDMA engine 690 acts as an interface for the TLN 618 for EDMA transactions initiated by the EDMA engine 690.

The TX Ethernet network interface controller (E-NIC) buffer 646 holds E-NIC frames to transmit. The read data (RDATA) outbound buffer 648 holds data returned in response to both P2P and EDMA read requests, received from another CGRP, to local memory of CGRP 602-1, such as memory 615. The outbound non-posted request buffer 652 holds both P2P and EDMA read requests for remote memory. The remote memory may be associated with a host or a remote CGRP, such as CGRP 602-2. Route-through outbound buffer 654 holds P2P transactions that were received from one remote device (host or CGRP) by CGRP 602-1 and are to be sent to a different remote device through the Ethernet network. Outbound posted request buffer 650 holds all other requests, both P2P and EDMA requests targeting a host or a remote CGRP, such as CGRP 602-2. Non-limiting examples of requests that are put into the outbound posted request buffer 650 include a P2P streaming write from a configurable unit 616 in CGR Array 617 of CGRP 602-1 to a configurable unit in a CGR Array of CGRP 602-2, and an EDMA write operation moving data from local memory 615 to a memory coupled to CGRP 602-2.

The arbiter 644 selects a next transaction to send, which may be based on a round-robin algorithm, from one of the outbound buffers 646-654, and sends it to the TX lossless engine 640. The TX lossless engine 640 adds a LEF header 473, stores the transaction to the replay buffer 638, and presents it to the arbiter 636 to be passed to the TX framer 632. In some cases, such as for TX E-NIC transactions, the TX lossless engine 640 may be bypassed, and presented directly to the arbiter 636 to be passed to the TX framer 632. The arbiter 636 may use any arbitration algorithm, including but not limited to a round-robin arbitration, to select among possible packets, including ACK packets 665 and NACK packets 666, to send to the TX framer 632. The TX framer 632 encapsulates the LEF header 473, the LEF metadata 474, the data 475, FCS/CRC 476, and the EDMA packet header metadata 477 into an Ethernet frame 470. The TX framer 632 also uses information from the stream table 698 to generate an Ethernet header 471 and passes the Ethernet frame 470 to the EMAC 610, which sends it through the I/O interface 612 over the Ethernet network 606. Information about the Ethernet frames 470 may be stored in a stream buffer 642 associated with its stream. As an example, an Ethernet frame 470 is a part of stream 0, information about the stream, which may include pointers into the shared replay buffers for the frame header information and data, is stored in the stream buffer for stream 0, such as the first stream buffer 642A.

The illustrated LEF inbound engine 660 includes a TX pause circuit 662, an RX filter 664, an RX lossless engine 668, inbound buffers 672-678, and an arbiter 680. The read request inbound buffer 672 holds non-posted requests, such as P2P read requests and EDMA read requests received over the Ethernet network 606. Posted inbound buffer 674 holds other requests, such as P2P streaming writes from a configurable unit in a remote CGRP or EDMA writes from a remote CGRP. The read data inbound buffer 676 holds read data returned in response to P2P or EDMA read requests sent to a remote device over the Ethernet network 606. RX E-NIC inbound buffer 678 holds received E-NIC frames.

The LEF Inbound Engine 660 of Eshim 608 may further receive incoming Ethernet frames 470 from the EMAC 610, extract TLN write requests 434 and/or TLN read requests 430, and store them into the appropriate inbound buffer 672-678, based on the LEF metadata 474 and the EDMA packet header metadata 477. The LEF Inbound Engine 660 may then retrieve the TLN write requests 434 and/or the TLN read requests 430 from the inbound buffers 672-678 and present them to the arbiter 680. The arbiter 680 may use any arbitration algorithm, including but not limited to a round-robin arbitration, to select among possible TLN write requests 434 and TLN read requests 430 to send to the P2P inbound logic 679 of the P2P engine 689 or the EDMA inbound logic 680 based on the EDMA packet type 460 of the EDMA packet header metadata 477 in the Ethernet frame 470. The EDMA inbound logic 680 may transmit the TLN write requests 434 or TLN read requests 430 to a destination, such as an Mshim 614 over the TLN 618. The Eshim 608 may also transmit and receive TX E-NIC and RX E-NIC packets.

In one or more implementations, the Eshim 608 may also implement a lossless protocol that may provide lossless network connectivity for dataflow applications over an Ethernet network 606 when the Eshim 608 detects Ethernet frame drops over the Layer 2 Ethernet network. The lossless protocol may be implemented using the TX lossless engine 640-1 for outbound packets in conjunction and the RX lossless engine 668-1 for inbound Ethernet frames 470. At a high level, the lossless protocol works by the LEF outbound engine 630-1 in the CGRP 602-1 incrementing an SSN 488 in the LEF header 473 in the Ethernet frame payload 472 in each Ethernet frame 470 carrying an EDMA read request, an EDMA write request, a P2P read request, or a P2P streaming write for a given stream.

The RX lossless engine 668 in the CGRP checks the SSN 488 in the LEF header 473 of each incoming Ethernet frame 470 to ensure that the incoming Ethernet frame payloads 472 for a stream are received in order. An ACK message is sent periodically over the Ethernet network 606 from the CGRP 602-2 to the CGRP 602-1 with the SSN 488 in the last Ethernet frame payload 472 that was successfully received. When the TX lossless engine 640 is provided with this information through line 667, it removes all the Ethernet frame payloads 472 stored in the stream buffers 642 and the shared replay buffers 638 with an SSN 488 equal to or less than the SSN 488 provided in the ACK message.

If the RX lossless engine 668 receives an Ethernet frame payload 472 including an SSN 488 that is not the next expected SSN 488 (e.g. an Ethernet frame payload 472 was lost or received out of order), the CGRP 602 sends a NACK message that includes the expected next SSN 488 to the CGRP 602. The TX lossless engine 640 of the CGRP 602 then retrieves the Ethernet frame payload 472 that corresponds to the expected next SSN 488 and resends the Ethernet frame payload 472 from the shared replay buffers 638 starting with the expected next SSN 488. Once all the Ethernet frame payloads 472 in the shared replay buffers 638 that are equal to or greater than the expected next SSN 488 received in the NACK message have been resent, the TX lossless engine 640 can resume sending Ethernet frame payloads 472 based on transactions stored in the outbound buffers 646-654.

The Eshim 608 may support flow control of links using PAUSE or PFC frames by utilizing software-controlled static flow-control and adaptive flow-control. The EMAC 610 may send an RX Pause (RXP) signal 623 to the LEF outbound engine 630 of Eshim 608 which may form a RX Pause Request (RXPR—sometimes called PRQ) signal 635. The LEF inbound engine 660 of Eshim 608 may form a TX Pause Request (TXPR) signal 671 and send the TXRP signal 671 to the TX pause circuitry 662. The TX pause circuitry 662 may send a TX Pause (TXP—sometimes called TXOFF) signal 661 to EMAC 610 to have it send a pause command over the Ethernet 606.

The Eshim 608 may implement one or more receive filters. For example, the Eshim 608 may implement 16 RX filters, such as RX filter 664, which may be prioritized from RX filter 0 to RX filter 15, where RX filter 0 may be the highest priority and RX filter 15 is the lowest. Each RX filter, for example, RX filter 664, may include a software programable mask and match value, each comprising multiple bits. The mask and the match values may allow the software to match and filter on any bits in an Ethernet header 471 of the Ethernet frame 470. If an Ethernet frame 470 matches multiple filters, the highest priority filter may define the action for that Ethernet frame 470. The receive filters may be configured to pass matching Ethernet frames 470 to the EDMA E-NIC Buffer 678, pass matching Ethernet frames 470 to the RX Lossless Engine 668, drop matching Ethernet frames 470, or pass matching Ethernet frames 470 to both the RX Lossless Engine 668 and the EDMA E-NIC Buffer 678 to clone Ethernet frames 470 for debug. Each of the RX filters, for example, RX filter 664, may be disabled, enabled for one channel, enabled for two channels, or enabled for any number of channels from the EMAC 610.

The EDMA outbound logic 658 in Eshim 608 may initiate an EDMA transaction to transfer data from memory, such as memory 615, attached to CGRP 602-1 to memory attached to another device on the Ethernet network 606, such as CGRP 602-2. It may initiate a memory read over TLN 618 to Mshim 614 to access data in local memory 615. Once that data in local memory 615 is returned over the TLN 618, an outbound Ethernet frame 470 may be generated, including LEF header 473, LEF metadata 474, data 475, and EDMA packet header metadata 477, and transmitted, using EMAC 610 and I/O interface 612, over the Ethernet network 606 to CGRP 602-2.

The LEF outbound engine 630 in the Eshim 608 may initiate an EDMA transaction to transfer data in memory attached to another device on the Ethernet network 606, such as CGRP 602-2, to local memory of CGRP 602-1, such as memory 615. The LEF outbound engine 630 may generate an Ethernet frame payload 472 including a LEF header 473, LEF metadata 474, data 475, and an FCS/CRC 476, and EDMA packet header metadata 477. The TX framer 632 of the LEF outbound engine 630 may encapsulate the Ethernet frame payload 472 including the generated LEF header 473, the LEF metadata 474, the data 475, the FCS/CRC 476, and the generated EDMA packet header metadata 477 into an Ethernet frame 470 to send to the remote device, such as the CGRP 602-2.

The Ethernet frame 470 containing the LEF header 473, the LEF metadata 474, the requested data 475, the FCS/CRC 476, and the EDMA packet header metadata 477 may be received by the I/O interface 612-2 and passed to the EMAC 610-2 of the remote CGRP 602-2. The EMAC 610-2 may provide the Ethernet frame 470 to the LEF inbound engine 660-2 of the Eshim 608-2 in the remote CGRP 602-2.

The LEF inbound engine 660-2 may extract the LEF header 473, the LEF metadata 474, the data 475, and the EDMA packet header metadata 477 from the de-queued Ethernet frame 470. The LEF inbound engine 660-2 may generate a TLN write request 434 from the extracted LEF header 473, the LEF metadata 474, the data 475, and the EDMA packet header metadata 477. The LEF inbound engine 660-2 may transmit the TLN write request 434 over the TLN 618-2 to the Mshim 614-2. The Mshim 614-2 may use the memory controller 613-2 to perform the TLN write request 434 to transfer the TLN write data 436 associated with the TLN write request 434 to memory 615.

In some implementations, the EDMA engine 690 may include a read scoreboard to track the non-posted TLN read requests 430 that have been issued to the TLN 618. If the scorecard is full, then no new TLN read requests 430 can be processed. To avoid head of line blocking, the arbiter 680 may not select a transaction from the non-posted buffer if the read scoreboards are full.

The P2P outbound logic 655-1 of the Eshim 608-1 may also receive outbound P2P packets over the TLN 618-1 from a configurable unit of the configurable units 616-1 in the CGR array 617-1 of the CGRP 602-1. The LEF outbound engine 630-1 may generate outbound Ethernet frames 470 from the outbound P2P packets, and transmit the Ethernet frames 470 to a remote CGRP 602-2.

The Eshim 608-1 may further receive Ethernet frames 470 from the remote CGRP 602-2, generate inbound P2P packets from the Ethernet frames 470, and transmit the inbound P2P packets over TLN 618-1 to a configurable unit of the configuration units 616-1 in CGR array 617-1 or to the local memory 615-1.

As previously described with reference to FIG. 1, an example dataflow graph may be spread across multiple CGRPs with a first CGRP, for example, CGRP 602-1, configured to execute a first node of the dataflow graph, and another CGRP, for example, CGRP 602-2, configured to execute a second node of the same dataflow graph. The first node may comprise a first set of configurable units 616-1 of the CGR array 617-1 of the CGRP 602-1 and the second node may comprise a second set of configurable units 616-2 of the CGR array 617-2 of the CGRP 602-2.

The first node of the dataflow graph may transmit data to and receive data from the second node of the dataflow graph, and the second node of the dataflow graph may transmit data to and receive data from the first node of the dataflow graph, where the transmission and reception of data between the first and second nodes of the dataflow graph are achieved without passing through a host, such as host 101.

The first set of configurable units 616-1 of the CGR array 617-1 of CGRP 602-1 and the second set of configurable units 616-2 of the CGR array 617-2 of the CGRP 602-2 may each include one or more PMUs 311, one or more PCUs 312, and one or more AGCUs 619, previously described with reference to FIG. 3. The one or more AGCUs 619-1 of the CGRP 602-1 may include a first AGCU 619-1, and the one or more AGCUs 619-2 of CGRP 602-2 may include a second AGCU 619-2.

In one example of operation of the system 600, the first node may perform a first computation on the first set of configurable units 616-1, which may result in data being generated and stored into the memory 615-1 coupled to the CGRP 602-1. In response to the data being generated, the first AGCU 619-1 may send a message over the TLN 618-1 to the EDMA engine 690-1. The message may indicate that data has been generated and is ready to be transferred from local memory 615-1 coupled to the CGRP 602-1 to the remote memory 615-2 coupled to CGRP 602-2.

The message may trigger the EDMA engine 690-1 to access a work queue 691 to retrieve the WQE 693-1 at the top of the WQ 691 to determine source and destination addresses for the EDMA transfer operation. The EDMA engine 690-1 may use the stream table 698-1 to determine where the source address and the destination address are located as well as what stream the EDMA transfer operation is a part of. In this example, the source address may be in local memory 615-1 coupled to the CGRP 602-1 and the destination address may be in remote memory 615-2 coupled to the remote CGRP 602-2. This may be referred to as an EDMA write operation, because from the point-of-view of the EDMA engine 690-1, it is writing data to a remote memory 615-2 coupled to the CGRP 602-2.

In response to determining that the WQE 693-1 is an EDMA write operation and retrieving the address of the data in local memory 615-1, the EDMA engine 690-1 may then initiate a TLN read request 430 to retrieve the generated data from the local memory 615-1. In some cases, the EDMA transfer operation may be broken into chunks where each chunk is sized to fit into a Ethernet frame payload 472 of an Ethernet frame 470 including data 475, along with the LEF header 473, the LEF metadata 474, and the FCS/CRC 476. Each chunk may be represented by a TX EDMA descriptor, with its own source address, destination address, and data length.

The EDMA engine 690 may, for each EDMA TQE 428 of the EDMA TQ 427 in EDMA TDM 425, send a TLN read request 430 over the TLN 618-1 to the local Mshim 614-1 of the CGRP 602-1, where the TLN read request 430 includes at least a read address and a data length for the generated data in memory 615-1, where the read address and the data length of the TLN read request 430 are set to the source TQE read address and the TQE payload data length of the TQE 428 for the generated data in memory 615-1. The local Mshim 614-1 of CGRP 602-1 receives the TLN read request 430 and provides the read address and the data length of the TLN read request 430 to the memory controller 613-1 to initiate the memory read. The memory controller 613-1 performs the memory read to transfer the generated data in memory 615-1 from a contiguous read buffer at the read address in the TLN read request 430 in memory 615-1 and return the read data to the Eshim 602-1 over the TLN 618-1. The read data may be stored into the posted outbound buffer 650-1 of the CGRP 602-1.

The arbiter 644 selects a transaction from one of the outbound buffers 646-654. In this example, the arbiter 644 selects a transaction from the posted outbound buffer 650-1 that contains the read data in the TLN read response 432 associated with the TLN read request 430. The arbiter 644 passes the TLN read response 432 in the posted outbound buffer 650-1 to the TX lossless engine 640. The TX lossless engine 640 adds the LEF header 473, the LEF metadata 474, the data 475, and the FCS/CRC 476 provided by the posted outbound buffer 650-1 to generate the Ethernet frame payload 472. The Ethernet frame payload 472 and the EDMA packet header metadata 477 provided by the posted outbound buffer 650-1 are stored into one of the shared replay buffers 638. The arbiter 636 selects from requests to send an Ethernet frame, such as the request from the TX lossless engine 640, an ACK request 665, and a NACK request 666. When the TX lossless engine 640 is selected, it passes the Ethernet frame payload 472 including the EDMA packet header metadata 477 to the TX framer 632-1.

The TX framer 632-1 of the CGRP 602-1 may generate an Ethernet frame 470 from the LEF header 473, the EDMA packet header metadata 477, and information from the stream table 698 including a MAC address for the destination, such as the MAC address of the EMAC 610-2 of the CGRP 602-2. The Ethernet frame 470 may comprise at least an Ethernet header 471 and the Ethernet frame payload 472 including the EDMA packet header metadata 477. The Ethernet frame payload 472 includes at least a LEF header 473, LEF metadata 474, data 475, the FCS/CRC 476, and the EDMA packet header metadata 477. TX framer 632 may use the EMAC 610-1 of the CGRP 602-1 to transfer the Ethernet frame 470 over Ethernet network 606 to the remote CGRP 602-2.

The remote, or CGRP 602-2 continues the EDMA write operation upon receipt of the Ethernet frame 470. For the purposes of this description, the CGRP 602-2 is assumed to have the same internal structure as CGRP 602-1, and the next few paragraphs use the same reference numbers to refer to the internal structures of CGRP 602-2 as are shown for CGRP 602-1 in FIGS. 6A, 6B, 6C, and 6D. The EMAC 610-2 of CGRP 602-2 may receive the Ethernet frame 470 from the CGRP 602-1 through the Ethernet network 606. The LEF header 473 and the EDMA packet header metadata 477 may be extracted from the Ethernet frame 470 and passed through the RX filter 664-2 which determines whether to pass the Ethernet frame payload 472 to the RX lossless engine 668-2.

Once the RX lossless engine 668-2 has received the Ethernet frame payload 472, it determines whether it has been received in sequence for its stream based on the SSN 488 in the Ethernet frame payload 472. If it is in sequence, it updates the register of the most recently received in-sequence SSN 488. The RX lossless engine 668-2 periodically sends an ACK request 665 to the arbiter 636-2 in the LEF outbound engine 630-2 to have an Ethernet frame 470 signifying a positive acknowledgement (an ACK frame) sent back to the sender for a stream that includes the most recently received in-sequence SSN 488. If the Ethernet frame payload 472 is out of sequence, the RX lossless engine 668-2 discards the Ethernet frame payload 472, and sends a NACK request 666 to the arbiter 636-2 in the LEF outbound engine 630-2 to have an Ethernet frame 470 signifying a negative acknowledgement (a NACK frame) sent back to the sender for a stream that includes a SSN 488 one greater than the most recently received in-sequence SSN 488.

If the Ethernet frame payload 472 is in sequence, the RX lossless engine 668-2 stores the LEF metadata 474 and the data 475 of the Ethernet frame payload 472, and the EDMA packet header metadata 477 into the appropriate inbound buffer 672-678, depending on the type of transaction received. In this example, the LEF metadata 474, the data 475, and the EDMA packet header metadata 477 are part of an EDMA write operation, so they are stored into the posted inbound buffer 674. The arbiter 680 selects between transactions stored in the various inbound buffers 672-678, and in this example selects the transaction from the posted inbound buffer 674. The EDMA engine 690-2 of CGRP 602-2 uses the EDMA packet header metadata 477 stored in the posted inbound buffer 674 to generate a TLN write request 434 and uses the data 475 of the corresponding Ethernet frame payload 472 to generate the TLN write data 436. The EDMA engine 690-2 sends the generated TLN write request 434 over the request network of TLN 618-2 to the Mshim 614-2 and sends the generated TLN write data 436 over the data network of the TLN 618-2 to the Mshim 614-2. The TLN write data 436 is to be written by the memory controller 613-2 into memory 615-2 attached to the CGRP 602-2. When the memory write has been completed, the Mshim 614-2 can send a write completion message over the response network of TLN 618-2 to the EDMA engine 690-2 of the CGRP 602-2.

Once the WQE 693-1 has been completed, that is all of the data identified for movement by the WQE 693-1 has been moved, the EDMA engine 690-1 of CGRP 602-1 may send a completion message to another device in the CGRP 602-1 and/or another device in CGRP 602-2 to indicate that the WQE 693-1 has been completed. The device(s) to which a message is to be sent may be indicated in the WQE 693-1. A message to a device in the CGRP 602-1 may be sent from the EDMA engine 690-1 over TLN 618-1. A message to a device in the CGRP 602-2 may be sent as a separate Ethernet frame 470 or included as a flag of the flags 497 in the final Ethernet frame 470 of data for the WQE 693-1. The Eshim 608-2 in the CGRP-602-2 can then send a message over its TLN 618-2 to the identified device.

If a completion message is sent to a VAG in an AGCU 619, the AGCU 619 can send a token to a configurable unit 616 in its associated CGR array 617 indicating that WQE has been completed and the configurable unit 616 can continue with further computation. So, for example if the message is sent to a configurable unit 616 in the CGRP 602-1, it may then begin to overwrite the data that was stored in local memory. As another example, if the message is sent to a configurable unit 616 in the CGRP 602-2, the configurable unit 616 may begin to utilize the data that has been written to its local memory. This may allow the second node to perform a second computation on the second set of configurable units 616 of CGRP 602-2 based on the availability of the EDMA data in local memory 615.

If a completion message is sent to another Eshim, the message may indicate another WQ to activate, causing a new WQE to be read and initiated. In some cases, the same Eshim may both send and receive the message to allow another WQ in the same Eshim to be activated.

Runtime software (not shown in FIGS. 6A, 6B, 6C, and 6D) may populate a stream table, such as stream table 698, with stream table entries. The stream table 698 may be stored in local memory in a CGRP, such as CGRP 602-1 or 602-2, or in a memory in the host 101 that is accessible by the CGRPs 602-1 and 602-2. Each stream table entry in the stream table 698 may be associated with a single lossless stream. The single lossless stream may have an associated stream identifier (ID), for example 495 of a corresponding Ethernet frame 470, which may be used as an index into the stream table 698 to access the stream table entry for this lossless stream. In some implementations, an upper section of the physical address is used as the stream ID.

As the LEF outbound engine 630 of CGRP 602-1 processes and frames packets from the outbound engine, such as EDMA engine 690, it may need to determine these packets Ethernet destination. For requests that may originate on this CGRP 602-1, from an AGCU, such as 619-1 of CGRP 602-1, the Eshim 608 may also need to evaluate the virtualization controls. For route-through requests that may originate from outside of CGRP 602-1 and passed from another Eshim of CGRP 602-1 to Eshim 608, the Eshim 608 may need to ignore the virtualization controls, which may apply exclusively to transactions that may originate on this CGRP 602-1. For such transactions, the CGRP 602 may have already evaluated the virtualization controls before a P2P transaction was transmitted over the Ethernet network 606.

The stream ID may be determined differently depending on the type of transaction. For EDMA and P2P requests (read or write), the stream ID may be based on an upper portion of the physical destination address. For completion and route-through transactions, the stream ID may be provided by a look-up table in the CGRP 602 using the physical ID of the CGRP 602 as the index into the table. The table may be pre-programmed for each CGRP 602 by the host.

When a packet is being processed by the LEF outbound engine 630, the LEF outbound engine 630 may access the stream table 698 using the destination stream ID 495 of the Ethernet frame 470 as the index into stream table 698. Each stream table entry in the stream table 698 may have information that the Eshim 608 may need to use to construct an Ethernet frame 470 for this stream. The information in each stream table entry may include one or more of a CGRP ID, a destination MAC address, a source MAC address, Ethernet controls, specific frame type information, and a stream protection bit. The specific frame type information may include for IP/UDP and VxLAN frames a destination IPv4 address, a destination UDP port number, a source IPv4 address, and a source UDP port number, for VxLAN frames a VxLAN identifier (VNI), and for MPLS frames a label and a traffic class (TC). The Eshim 608 may provide additional information that may be needed to construct the frame.

Figure 7A:
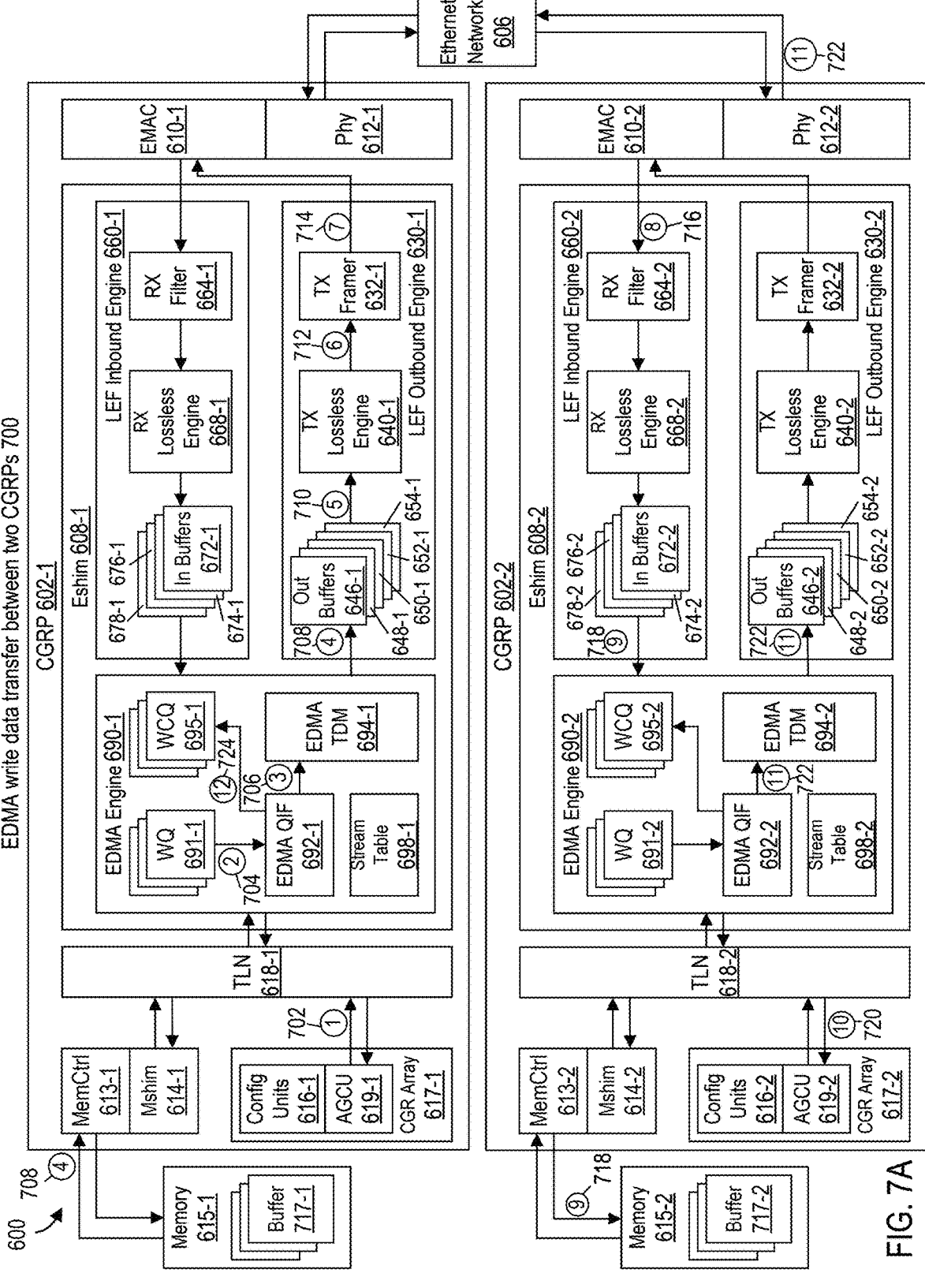
FIG. 7A is a sequence diagram illustrating an example method for EDMA write data transfers between two CGRPs, according to an implementation of the present disclosure.

FIG. 7A is an example sequence diagram 700 illustrating an example EDMA write data transfer between two CGRPs 602-1 and 602-2. For clarity of presentation, the description that follows generally describes the example sequence diagram 700 in the context of FIGS. 1, 2, 3, 4A, 4B, 4C, 4D, 4E, 5, 6A, 6B, 6C, and 6D. However, it will be understood that the example sequence diagram 700 may be performed, for example, by any other suitable system, environment, software, and hardware, or a combination of systems, environments, software, and hardware as appropriate. In some implementations, various steps of the example sequence diagram 700 can be run in parallel, in combination, in loops, or in any order.

As illustrated, FIG. 7A includes, but is not limited to, an example CGRA system 600, previously described with reference to FIGS. 6A, 6B, 6C, and 6D, which will not be repeated in the description of FIG. 7B. In the example EDMA write data transfer between two CGRPs 602-1 and 602-2, the CGRP 602-1 and the memory 615-1 are the source CGRP and source memory, respectively, and the CGRP 602-2 and the memory 615-2 are the destination CGRP and destination memory, respectively. Buffers 717-1 and 717-2 are allocated in memories 615-1 and 615-2, respectively.

A dataflow graph may comprise a first set of nodes including a first node and a second set of nodes including a second node. The first node may be configured, by runtime, onto the first set of configurable units 616-1 including a first configurable unit 616-1 of CGR array 617-1 of CGRP 602-1. Similarly, the second node may be configured, by runtime, onto the second set of configurable units 616-2 including a second configurable unit 616-2 of CGR array 617-2 of CGRP 602-2. As previously described with reference to FIGS. 6A, 6B, 6C, and 6D, the first set and the second set of configurable units 616-1 and 616-2 may include one or more PMUs 311, one or more PCUs 312, and one or more AGCUs 619 including first and second AGCUs 619-1 and 619-2 of the configurable units 616-1 and 616-2, respectively.

At 702 (step 1), the first node may perform a first computation on the first set of configurable units 616-1, which may result in data being generated and stored into the buffer 717-1. In response, the first configurable unit 616-1 may send a token to the first AGCU 619-1, which may then send a message based trigger over TLN 618-1 to the EDMA engine 690-1 to initiate an EDMA operation. This may be done after the data has been generated and stored into the buffer 717-1. From 702, sequence diagram 700 proceeds to 704.

At 704 (step 2), the EDMA engine 690-1 may receive a message based trigger over TLN 618-1 from the first AGCU 619-1, which may comprise at least a physical WQ identifier (ID) and a WQ start operation. The message based trigger triggers the EDMA engine 690-1 to provide the physical WQ ID of the message to the EDMA QIF 692-1. The EDMA QIF 692-1 may identify a WQ 691-1 of the set of WQs 691-1 accessible by CGRP 602-1 based on the physical WQ ID. The EDMA QIF 692-1 may start processing the WQ 691-1 based on the WQ start operation of the received message. The EDMA QIF 692-1 may read a current WQE 693, such as WQE 693-1, from the identified WQ 691-1 and identify a particular lossless stream, such as stream 532, for the WQE 693-1.

The WQE 693-1 includes enough information to perform an EDMA operation, either directly or indirectly. In one implementation, the WQE 693-1 describes an EDMA operation including an EDMA transfer type, a source read address, a destination write address, and a length of the EDMA transfer specified in the WQE 693-1. Other information may be included in the WQE 693-1 in some implementations, such as flags for various optional functions. In some implementations, the WQE 693-1 may provide a stream ID for the stream to be used by the WQE 693-1, which may be provided as an independent field in the current WQE 693-1 or included as a bit-field within the source read address or the destination write address. The stream ID may then be used to look up additional information to be used for the EDMA operation from the stream table 698-1. The stream table 698-1 may provide information related to a stream such as an ID of the remote CGRP, a MAC address of the remote CGRP, and at least a portion of a MAC address to be used by the initiating CGRP (i.e. the CGRP that is initiating operations for the current WQE). Other information such as IP addresses and port numbers for both the source and destination may also be provided. In other implementations, all of the information for the EDMA operation may be included directly in the WQE 693-1.

The WQE 693-1 may, for this example, describe an EDMA write transfer from CGRP 602-1 to CGRP 602-2. From 704, sequence diagram 700 proceeds to 706.

At 706 (step 3), the EDMA engine 690-1 may convert the WQE 693-1 into a set of one or more TQEs in a TQ such as TQEs 428 in the TQ 427, as previously described with reference to FIGS. 4A-4E, based on the WQE 693-1. The EDMA engine 690-1 may store the converted TQEs in an EDMA TDM such as EDMA TDM 694-1, previously described with reference to FIGS. 6A-6D. From 706, sequence diagram 700 proceeds to 708.

At 708 (step 4), the EDMA engine 690-1 may send a TLN read request 430-1 to the local Mshim 614-1 over the TLN 618-1 to retrieve data at the TQE read address in the buffer 717-1 for the TQE payload data length specified in the corresponding TQE such as TQE 428-1 in the EDMA TDM 694-1. The Mshim 614-1 receives the TLN read request 430-1 and provides the memory read information including the TQE read address and the TQE payload data length to the memory controller 613-1 to initiate the memory read. The memory controller 613-1 performs the memory read to transfer the data from the buffer 717-1 in memory 615-1 to the Mshim 614-1. Once the memory controller 613-1 completes the memory read, the Mshim 614-1 may send a TLN read response 432-1 over the TLN 618-1 to the EDMA engine 690-1.

The EDMA engine 690-1 receives the TLN read response 432-1 including the TQE read address, the TQE payload data length, and the data read from the memory 615-1. The EDMA engine 690-1 generates an EDMA write packet header 442 for the current TQE 428 based on the current TQE. The EDMA engine 690-1 stores the data read from the memory 615-1 of the TLN read response 432-1 and the EDMA write packet header 442 in the corresponding outbound posted request buffer 650-1. From 708, sequence diagram 700 proceeds to 710.

At 710 (step 5), the LEF outbound engine 630-1 generates an Ethernet frame payload 472-1 comprising at least a LEF header 473-1, LEF metadata 474-1, and EDMA packet header metadata 477-1. The LEF outbound engine 630-1 sets the contents of the LEF metadata 474-1 based on the corresponding content of the EDMA write packet header 442, the IDs of the CGRPs 602-1 and 602-2, and the ID of the destination Eshim 608-2. The LEF outbound engine 630-1 adds the data and the EDMA write packet header 442 stored in the outbound posted request buffer 650-1, to data 475-1 and the EDMA packet header metadata 477-1 of the Ethernet frame payload 472-1, respectively. The LEF outbound engine 630-1 provides the Ethernet frame payload 472-1 to the TX lossless engine 640-1. From 710, sequence diagram 700 proceeds to 712.

At 712 (step 6) the TX lossless engine 640-1 reads the Ethernet frame payload 472-1 including the LEF metadata 474-1 and the EDMA packet header metadata 477-1 provided by the EDMA engine 690-1, and generates the LEF header 473-1 that includes a sequentially incrementing packet sequence number (PSN) for the particular lossless stream. The TX lossless engine 640-1 may add the LEF header 473-1 to the Ethernet frame payload 472-1. From 712, sequence diagram 700 proceeds to 714.

At 714 (step 7), the TX framer 632-1 may generate an Ethernet frame 470-1 comprising at least an Ethernet header 471-1 and a Ethernet frame payload 472-1 including LEF metadata 473-1 and EDMA packet header metadata 477-1. The Ethernet frame payload 472-1, and the EDMA packet header metadata 477-1 of the generated Ethernet frame 470-1 may be based on the Ethernet frame payload 472-1 and the EDMA packet header metadata 477-1, respectively stored into the TX lossless engine 640-1 and a protocol of the Ethernet network 606. The LEF outbound engine 630-1 may transmit the Ethernet frame 470-1 over the Ethernet network 606 using the EMAC 610-1 and the I/O interface 612-1 to CGRP 602-2, and may re-send the Ethernet frame 470-1 if needed. From 714, sequence diagram 700 proceeds to 716.

At 716 (step 8), EMAC 610-2 of CGRP 602-2 may receive the Ethernet frame 470-1. RX filter 664-2 may de-frame the Ethernet frame 470-1 and retrieve the LEF header 473-1, LEF metadata 474-1, the data 475-1, the FCS/CRC 476-1, and the EDMA packet header metadata 477-1 from the de-framed Ethernet frame 470-1. RX filter 664-2 may provide the LEF header 473-1, the LEF metadata 474-1, the data 475-1, and the EDMA packet header metadata 477-1 to RX lossless engine 668-2.

The RX lossless engine 668-2 may store the LEF header 473-1, the LEF metadata 474-1, the data 475-1, and the EDMA packet header metadata 477-1 into the corresponding inbound buffer of inbound buffers 672-2, 674-2, 676-2, or 678-2, where the corresponding inbound buffer is the posted inbound buffer 674 in this example, based on the information in the EDMA packet header metadata 477-1. From 716, sequence diagram 700 proceeds to 718.

At 718 (step 9), the EDMA engine 690-2 may perform, based on the stored EDMA packet header metadata 477-1, a memory write of the stored data 475-1 to the buffer 717-2 in the memory 615-2, over the TLN 618-2. To accomplish this, the EDMA engine 690-2 may use the stored EDMA packet header metadata 477-1 and data 475-1 to generate a TLN write request 434-1 including a write address and write data length based on the write address 451-1 and the write data length 458-1 in the stored EDMA packet header metadata 477-1. The EDMA engine 690-2 may use the stored data 475-1 to generate corresponding TLN write data 436-1. The EDMA engine 690-2 may send the TLN write request 434-1 and the corresponding TLN write data 436-1 to the Mshim 614-2 over TLN 618-2. The Mshim 614-2 receives the TLN write request 434-1 including the write address and the write data length, and the corresponding TLN write data 436-1 and provides memory write information including the write address, the write data length, and the TLN write data 436-1 to the memory controller 613-2 to initiate the memory write. The memory controller 613-2 performs the memory write to transfer the TLN write data 436-1 to the write address in the buffer 717-2 in the memory 615-2. Once the memory controller 613-2 completes the memory write, the Mshim 614-2 sends a TLN write response 438-1 over the TLN 618-2 to the Eshim 608-2 indicating that the memory write has been completed. From 718, sequence diagram 700 proceeds to 720.

At 720 (step 10), the EDMA engine 690-2 of the Eshim 608-2 receives the TLN write response 438-1 from the Mshim 614-2. If the TLN write response 438-1 indicates that the memory write has been completed, the last Ethernet frame attribute of the associated TQE 428 indicates that the just completed memory write of the TLN write request 434-1 was for the last Ethernet frame of the WQE 693-1, and the remote notification attribute indicates that the remote VAG target is to be notified, the EDMA engine 690-2 may generate a hardware completion notification as a message based TLN transaction to a remote VAG target that is specified in the address generation information (AG info) 450-1 in the stored EDMA packet header metadata 477-1 associated with this TLN write response 434-1. The AG info 450-1 includes the address of the VAG target comprising the CGR array 617-2 of CGRP 602-2, the AGCU 619-2 within the CGR array 617-2, and the VAG ID of the VAG target in the AGCU 619-2.

The EDMA engine 690-2 can send the generated hardware completion notification as the message based TLN transaction to the remote VAG target specified in the AG info 450-1 over TLN 618-2. When the AGCU 619-2 receives the message based TLN transaction, the AGCU 619-2 can send a token to a particular configurable unit of the configurable units 616-2 in the CGR array 617-2 indicating that the WQE has been completed and the particular configurable unit of the configurable units 616-2 can continue with further computation. From 720, sequence diagram 700 proceeds to 722.

At 722 (step 11), in response to the TLN write response 438-1 being received from the Mshim 614-2 and the EDMA engine 690-2 determining that an EDMA ACK was requested based on the EDMA ACK is requested attribute being set to indicate that an EDMA ACK is requested specified in the write attributes 454 in the stored EDMA packet header metadata 477-1 associated with this TLN write response 434-1, the EDMA QIF 692-2 queues a TQE such as TQE 428-1 in the TQ 427-1 in the EDMA TDM 694-2 that corresponds to an Ethernet ACK frame 470-2. The queued TQE 428-1 corresponds to an Ethernet ACK frame 470-2.

The queued TQE 428-1 may include an inline Ethernet frame payload attribute that indicates that the Ethernet frame payload associated with this TQE 428-1 is inline, an EDMA WQE ID 456-2 and EDMA channel ID 456-2 that are set to the EDMA WQE ID 456-1 and the EDMA channel 457-1 in the stored EDMA packet header metadata 477-1 associated with this TLN write response 434-1, an EDMA packet type 460-2 that is set to indicate that the EDMA the packet type is an EDMA ACK packet, and a write data length 458-2 that is set to length of the Ethernet ACK frame 470-2.

The EDMA engine 690-2 may generate an EDMA ACK packet header 447-2 for the queued TQE 428-1 that may include the WQE ID 456-2, the EDMA channel ID 457-2, the write data length 458-2, and the EDMA packet type 460-2 of the queued TQE 428-1 in the TQ 427-1 in the EDMA TDM 694-2. The EDMA engine 690-2 stores the generated EDMA ACK packet header 447-2 in the corresponding outbound buffer 646-2, 648-2, 650-2, 652-2, or 654-2, where the corresponding outbound buffer is the outbound posted request buffer 650-2 for the generated EDMA ACK packet header 447-2.

The destination Eshim 608-2 generates an ACK Ethernet frame 470-2 based on the TQE 428-1 in the EDMA TDM 694-2 and EDMA ACK packet header 447-2, and sends the ACK Ethernet frame 470-2 using line 665 back to the source Eshim 608-1 of CGRP 602-1. Note that some implementations may not send an ACK for every frame received, but may periodically send an ACK frame with the ID of the last successfully received EDMA write frame. From 722, sequence diagram 700 proceeds to 724.

At 724 (step 12), Eshim 608-1 receives the ACK and provides the notification to LEF outbound engine 630-1 which can then remove the data that was successfully received by the CGRP 602-2 from buffers in the LEF outbound engine 630-1.

Once an ACK has been received for the last transfer for WQE 693-1 (or if no ACK is requested, once the last Ethernet frame payload 472-1 of a WQE has been sent), the EDMA QIF 692-1 may move the corresponding WQE of WQ 691-1 to the WCQE of WCQ 695-1. In addition, the EDMA engine 690-1 may send a completion message to a device in the CGRP 602-1 and/or a device in the CGRP 602-2. The device(s) to be sent a completion message may be identified in the WQE. A message to a device in the CGRP 602-1 may be sent from the EDMA engine 690-1 over TLN 618-1. A message to a device in the CGRP 602-2 may be sent as a separate Ethernet frame over the Ethernet network 606 to the Eshim 608-2 in the CGRP 602-2 or included as a tag in the final frame of data for the WQE of WQ 691-1. The Eshim 608-2 in the CGRP-602-2 can then send a message over its TLN 618-2 to the identified device.

If a completion message is sent to a VAG in an AGCU 619, the AGCU 619 can send a token to a configurable unit 616 in its associated CGR array 617 indicating that the WQE has been completed and the configurable unit 616 can continue with further computation. If a completion message is sent to another Eshim, the message may indicate another WQ 691 to activate, causing a new WQE to be read and initiated. In some cases, the same Eshim 608 may both send and receive the message to allow another WQ 691 in the same Eshim 608 to be activated. After 724, sequence diagram 700 can stop.

Figure 7B:
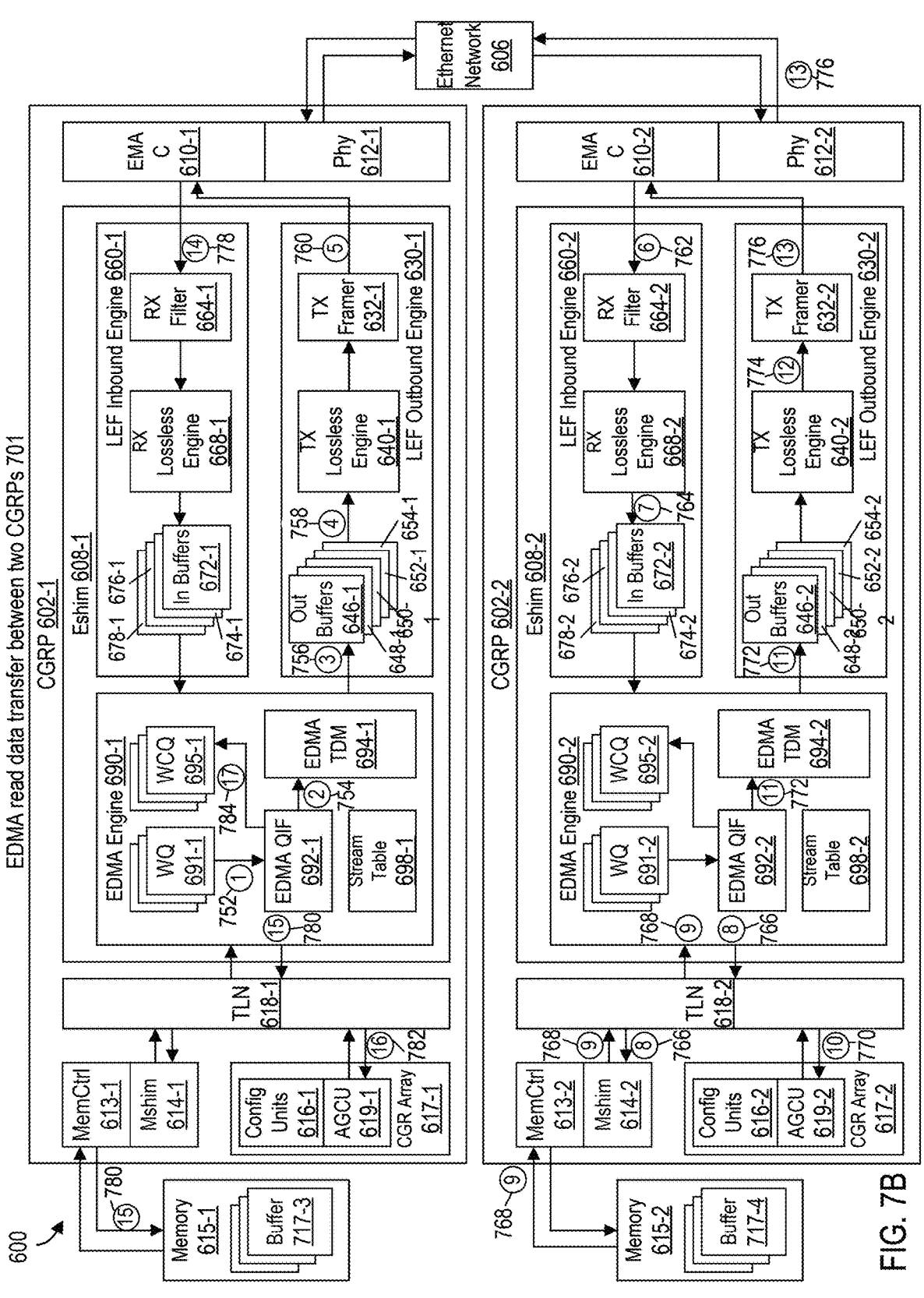
FIG. 7B is a sequence diagram illustrating an example method for EDMA read transfers between two CGRPs, according to an implementation of the present disclosure.

FIG. 7B is an example sequence diagram 701 illustrating an example EDMA read data transfer between two CGRPs 602-1 and 602-2. For clarity of presentation, the description that follows generally describes the example sequence diagram 701 in the context of FIGS. 1-3, 4A-4E, 5, 6A-6D, and 7A. However, it will be understood that the example sequence diagram 701 may be performed, for example, by any other suitable system, environment, software, and hardware, or a combination of systems, environments, software, and hardware as appropriate. In some implementations, various steps of the example sequence diagram 701 can be run in parallel, in combination, in loops, or in any order.

As illustrated, FIG. 7B includes, but is not limited to, an example CGRA system 600, previously described with reference to FIGS. 6A-6D, which will not be repeated in the description of FIG. 7B. In the example EDMA read data transfer between two CGRPs 602-1 and 602-2, the CGRP 602-2 and the memory 615-2 are the source CGRP and source memory, respectively, and the CGRP 602-1 and the memory 615-1 are the destination CGRP and destination memory, respectively. Buffers 717-3 and 717-4 are allocated in memories 615-1 and 615-2, respectively.

A dataflow graph may comprise a first set of nodes including a first node and a second set of nodes including a second node. The first node may be configured, by runtime, onto the first set of configurable units 616 including a first configurable unit 616-1 of CGR array 617-1 of CGRP 602-1. Similarly, the second node may be configured, by runtime, onto the second set of configurable units 616 including a second configurable unit 616-2 of CGR array 617-2 of CGRP 602-2.

At 752 (step 1), in this example, the EDMA QIF 692-1 reads a current WQE 693-2 from the WQ 691-1. The WQE 693-2 describes an EDMA read transfer from the CGRP 602-2 to the CGRP 602-1. The WQE 693-2 comprises at least a source read address of data stored in the buffer 717-4 in the memory 615-2 to be read from the CGRP 602-2, a destination write address in the buffer 717-3 in the memory 615-1, where the data read from the CGRP 602-2 is to be written to the buffer 717-3 in the memory 615-1 coupled to the CGRP 602-1, and a length of the EDMA read transfer. As was previously described with reference to FIG. 7A, the WQE 693-2 may comprise other information including flags for various functions, a stream ID for the stream to be used by the WQE 693-2, and IP addresses and port numbers for both CGRPs 602-1 and 602-2. From 752, sequence diagram 701 proceeds to 754.

At 754 (step 2), the EDMA QIF 692-1 converts the WQE 693-2 into a read TQE 428, and stores the read TQE 428 in the TQ 427 in the EDMA TDM 694-1, previously described with reference to FIGS. 4A-4E. A source address in the read TQE 428 corresponds to the source address of the data stored in buffer 717-4 in remote memory 615-2, and a destination address in the read TQE 428 corresponds to the destination address in buffer 717-3 in local memory 615-1, where data read from the remote memory 615-2 is to be stored. From 754, sequence diagram 701 proceeds to 756.

At 756 (step 3), the EDMA engine 690-1 generates an EDMA read with remote graph notification packet header 445 based on the TQE 428. The EDMA engine 690-1 stores the EDMA read with remote graph notification packet header 445 in the corresponding outbound non-posted request buffer 652-1. From 756, sequence diagram 701 proceeds to 758.

At 758 (step 4), the LEF outbound engine 630-1 generates an Ethernet frame payload 472-3 comprising at least a LEF header 473-3, LEF metadata 474-3, and EDMA packet header metadata 477-3. The LEF outbound engine 630-1 sets the contents of the LEF header 473-3 and the LEF metadata 474-3 based on the corresponding content of the EDMA read with remote graph notification packet header 445 in the outbound non-posted request buffer 652-1, the IDs of the CGRPs 602-1 and 602-2, and the ID of the destination Eshim 608-1. The LEF outbound engine 630-1 adds the EDMA read with remote graph notification packet header 445 to the EDMA packet header metadata 477-3 of the Ethernet frame payload 472-3. From 758, sequence diagram 701 proceeds to 760.

At 760 (step 5), the TX framer 632-1 generates an Ethernet frame 470-3 comprising an Ethernet header 471-3 and the Ethernet frame payload 472-3 based on the LEF header 473-3, the LEF metadata 474-3, the EDMA packet header metadata 477-3, and a protocol of the Ethernet network 606. The LEF outbound engine 630-1 transmits the Ethernet frame 470-3 over the Ethernet network 606 to the CGRP 602-2. From 760, sequence diagram 701 proceeds to 762.

At 762 (step 6), the LEF inbound engine 660-2 receives, over the Ethernet network 606 from the CGRP 602-1, the Ethernet frame 470-3. The LEF inbound engine 660-2 de-frames the Ethernet frame 470-3 and retrieves the LEF header 473-3, the LEF metadata 474-3, and the EDMA packet header metadata 477-3 including the EDMA read with remote graph notification packet header 445 from the Ethernet frame 470-3. From 762, sequence diagram 701 proceeds to 764.

At 764 (step 7), the LEF inbound engine 660-2 stores the EDMA read with remote graph notification packet header 445 into the read request inbound buffer 672-2. The LEF inbound engine 660-2 provides the EDMA read with remote graph notification packet header 445 to the EDMA engine 690-2. From 764, sequence diagram 701 proceeds to 766.

At 766 (step 8), the EDMA engine 690-2 generates a TLN read request 430-2 including the read address 452 and the read data length 459 from the EDMA read with remote graph notification packet header 445. The EDMA engine 690-2 sends the TLN read request 430-2 to the Mshim 614-2 over the TLN 618-2. From 766, sequence diagram 701 proceeds to 768.

At 768 (step 9), the Mshim 614-2 receives the TLN read request 430-2 and provides the read address 452 and the read data length 459 to the memory controller 613-2 to initiate a memory read. The memory controller 613-2 performs the memory read to transfer data at the read address 452 in the buffer 717-4 for the read data length to the Mshim 614-2. Once the memory controller 613-2 completes the memory read, the Mshim 614-2 sends a TLN read response 432-2 including the read address 452, the read data length 459, and the data read from the buffer 717-4 over the TLN 618-2 to the EDMA engine 690-2. The EDMA engine 690-2 receives the TLN read response 432-2 from the Mshim 614-2. From 768, sequence diagram 701 proceeds to 770.

At 770 (step 10), the EDMA engine 690-2 generates a message based trigger indicating that the data in the in the space in the buffer 717-4 at the read address 452 for the read data length 459 has been read and the second node on the second set of configurable units 616-2 may reuse this space in the buffer 717-4. For example, the second node may perform a second computation on the second set of configurable units 616-2, which may result in data being generated and stored into this space in the buffer 717-4. The EDMA engine 690-2 sends the message based trigger over TLN 618-2 to the AGCU 619-2. The AGCU 619-2 receives the message based trigger and sends a token to the second node on the second set of configurable units 616-2 based on the message based trigger. From 770, sequence diagram 701 proceeds to 772.

At 772 (step 11), the EDMA engine 690-2 generates an EDMA read response packet header 442 based on the TLN read response 432-2 and the EDMA read with remote graph notification packet header 445, generates a TQE 428 based on the EDMA read response packet header 442, and queues the TQE 428 in the TQ 427 in the EDMA TDM 694-2. The EDMA engine 690-2 stores the data of the TLN read response 432-2 and the EDMA read response packet header 442 in the outbound posted request buffer 650-2. From 772, sequence diagram 701 proceeds to 774.

At 774 (step 12), the LEF outbound engine 630-2 generates an Ethernet frame payload 472-4 comprising a LEF header 473-4, LEF metadata 474-4, and EDMA packet header metadata 477-4 based on the corresponding content of the EDMA read response packet header 442 in the outbound posted request buffer 650-2, the ID for each of the CGRPs 602-2 and 602-1, and the ID of the Eshim 608-1. The LEF outbound engine 630-2 adds the data and the EDMA read response packet header 442 in the outbound posted request buffer 650-2 to data 475-4 and the EDMA packet header metadata 477-4 of the Ethernet frame payload 472-4, respectively. The LEF outbound engine 630-2 provides the Ethernet frame payload 472-4 to the TX framer 632-2. From 774, sequence diagram 701 proceeds to 776.

At 776 (step 13), the TX framer 632-2 generates an Ethernet frame 470-4 including an Ethernet header 471-4 and the Ethernet frame payload 472-4. The LEF outbound engine 630-2 transfers the Ethernet frame 470-4 over the Ethernet network 606 to the CGRP 602-1. From 776, sequence diagram 701 proceeds to 778.

At 778 (step 14), the LEF inbound engine 660-1 receives the Ethernet frame 470-4 and de-frames the Ethernet frame 470-4. The LEF inbound engine 660-1 retrieves the LEF header 473-4, the LEF metadata 474-4, the data 475-4, and the EDMA read response packet header 446 in the EDMA packet header metadata 477-4 from the de-framed Ethernet frame 470-4. The LEF inbound engine 660-1 stores the data 475-4 and the EDMA read response packet header 446 into the posted inbound buffer 674-1. From 778, sequence diagram 701 proceeds to 780.

At 780 (step 15), the EDMA engine 690-1 retrieves the data 475-4 and the EDMA read response packet header 446 from the posted inbound buffer 674-1. The EDMA engine 690-1 generates a TLN write request 434-2 including a write address and write data length based on the write address 451 and the write data length 458 in the EDMA read response packet header 446. The EDMA engine 690-1 generates the corresponding TLN write data 436-2 from the data 475-4.

The EDMA engine 690-1 sends the TLN write request 434-2 and the TLN write data 436-2 to the Mshim 614-1 over the TLN 618-1. The Mshim 614-1 receives the TLN write request 434-2 and the TLN write data 436-2 and provides memory write information including the write address and the write data length in the TLN write request 434-2, and the TLN write data 436-2 to the memory controller 613-1 to initiate the memory write. The memory controller 613-1 performs the memory write to transfer the TLN write data 436-2 to the buffer 717-3 at the write address for the write data length. Once the memory controller 613-1 completes the memory write, the Mshim 614-1 sends a TLN write response 438-2 over the TLN 618-1 to the EDMA engine 690-1 indicating that the memory write has been completed. From 780, sequence diagram 700 proceeds to 782.

At 782 (step 16), the EDMA engine 690-2 generates a hardware completion notification as a message based TLN transaction and sends the hardware completion notification, over the TLN 618-1 and through the AGCU 619-1, to the first configurable unit 616-1. The hardware completion notification indicates that the EDMA read completion operation has completed, and the data stored at the write address in the buffer 717-1 is available in the memory 615-1. The availability of the data enables the first node of the first set of nodes of the dataflow graph to perform a computation on the configurable units 616-1 of the CGRP 602-1. From 782, sequence diagram 701 proceeds to 784.

At 784 (step 17), in response to the completion of the EDMA read transfer between the CGRPs 602-2 and 602-1, the EDMA QIF 692-1 writes a WCQE to the WCQ 695-1 to notify the runtime that the EDMA read transfer has completed. After 782, sequence diagram 701 can stop.

Figure 8:
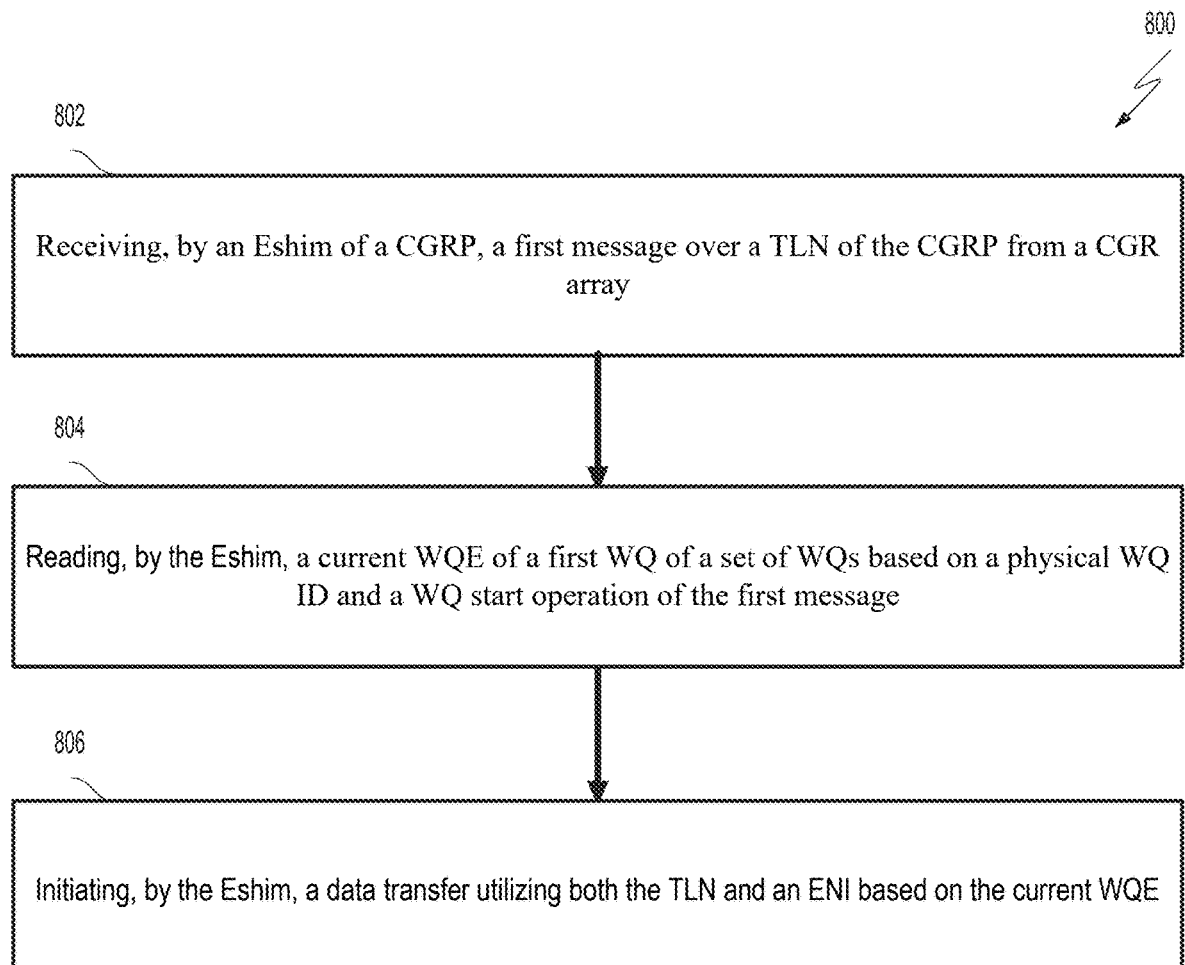
FIG. 8 is a flowchart illustrating an example of a computer-implemented method for initiating direct memory access from a dataflow graph running across multiple CGRPs using message based triggers, according to an implementation of the present disclosure.

FIG. 8 is a flowchart illustrating an example of a computer-implemented method 800 for initiating DMA from a dataflow graph running across multiple CGRPs using message based triggers, according to an implementation of the present disclosure. For clarity of presentation, the description that follows generally describes method 800 in the context of the other figures in this description. In various embodiments, method 800 may be performed using CGRA systems in an external network, for example, corresponding to CGRA system examples 100, 200, 400, 500, and 600. It is noted that certain operations described in method 800 may be optional or may be rearranged in different embodiments.

At step 802, a first message is received, by an Eshim 608 of a CGRP 602-1, over a TLN 618 of the CGRP 602-1 from a CGR array 617. From 802, method 800 proceeds to 804.

At step 804, a current WQE 693-1 of a first WQ 691 of a set of WQs 691 is read, by the Eshim 608, based on a physical WQ ID and a WQ start operation of the first message. From 804, method 800 proceeds to 806.

At step 806, a data transfer is initiated, by the Eshim 608, utilizing both the TLN 618 and an ENI based on the current WQE 693-1. After 608, method 800 stops.

Figure 9:
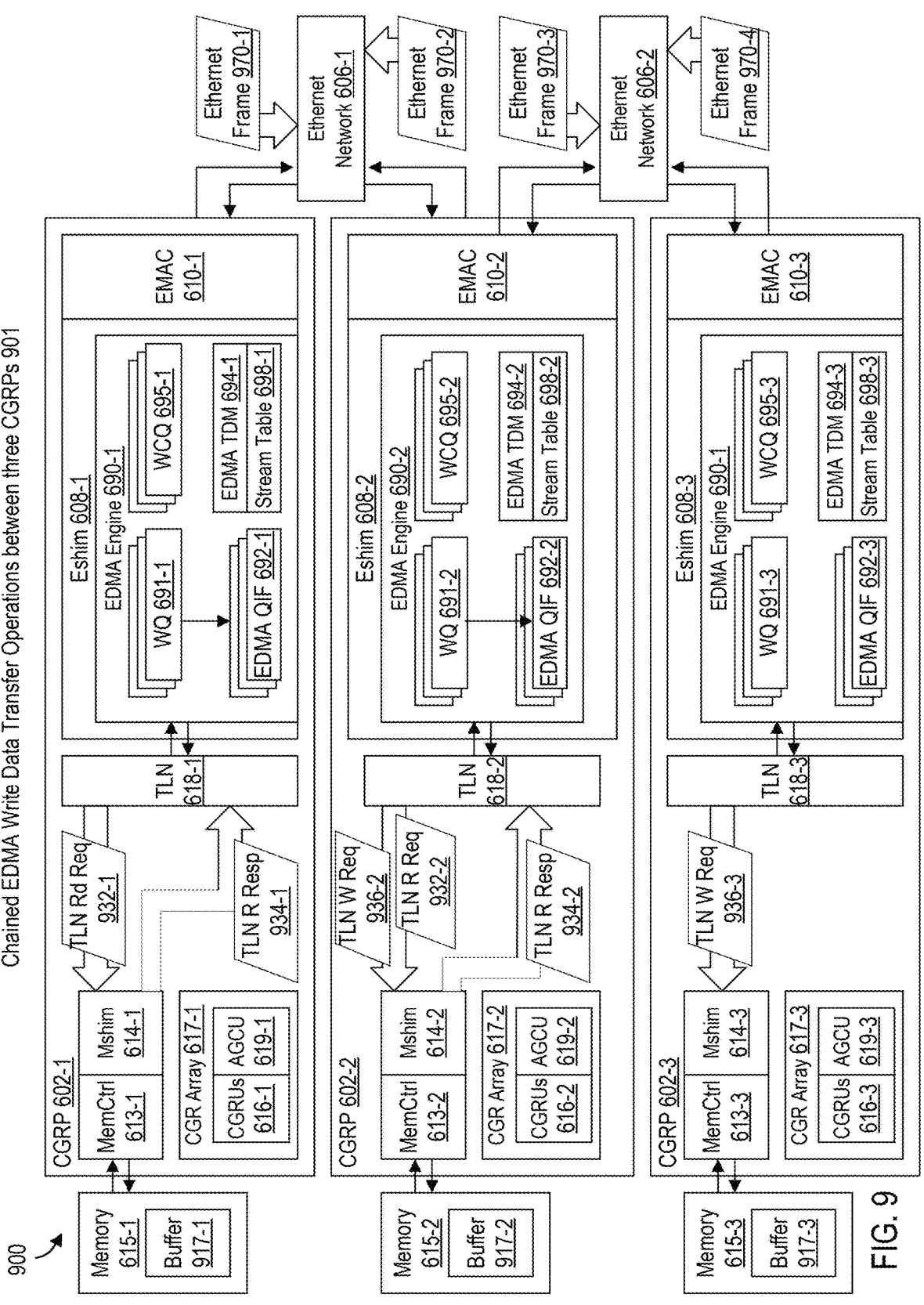
FIG. 9 is a block diagram illustrating an example CGRP system for chaining DMA transfers from a dataflow graph running across multiple CGRPs, according to an implementation of the present disclosure.

Chained Direct Memory Accesses from a Dataflow Graph Running Across Multiple Coarse-Grained Reconfigurable Processors FIG. 9 is a block diagram illustrating an example CGRP system 900 for chaining DMA transfers from a dataflow graph running across multiple CGRPs 602-1, 602-2, and 602-3. In FIG. 9, CGRA system 900 is shown in a schematic representation and is not drawn to scale or perspective. For clarity of presentation, the description that follows generally describes the CGRA system 900 in the context of FIGS. 1, 2, 3, 4A, 4B, 4C, 4D, 4E, 5, 6A, 6B, 6C, 6D, 7A, and 7B, which will not be repeated in the description of FIG. 9. However, it will be understood that the example chained DMA transfers from a dataflow graph may be performed, for example, by any other suitable system, environment, software, and hardware, or a combination of systems, environments, software, and hardware as appropriate. It is noted that, in different embodiments, CGRA system 900 may be operated with additional or fewer elements. As will become clear in the following detailed description, the chained DMA functionality initiated from a dataflow graph running across multiple CGRPs may be runtime configured by the host 101 but dataflow is orchestrated by the CGRA system 900 without runtime environment or host 101 involvement.

As shown in FIG. 9, there are cases where a first CGRP may want to perform a first DMA operation to transfer source data from a first memory coupled to the first CGRP to a second memory coupled to a second CGRP, and have the second CGRP perform a second DMA operation to transfer at least a portion of the source data from the second memory to a third memory coupled to a third CGRP. Chained DMA functionality provides a way to accomplish these transfers.

The chained DMA functionality utilizes the functionality to initiate direct memory accesses from a dataflow graph running across multiple CGRPs using message based triggers. Chained DMAs also utilize message based TLN transactions on the TLN, which can be sent between an Eshim and an agent on the TLN such as a Mshim, an AGCU, and CGRUs through the AGCU, or between Eshims. A TLN transaction may be a TLN read request, a TLN read response, a TLN write request, a TLN write data, a start request from an AGCU to an Eshim to start a data transfer, or a completion message from an Eshim to an AGCU to signify completion of a data transfer. This functionality has been previously described, which will not be repeated in the description of FIG. 9.

For chained DMAs, when the transaction on the TLN is Eshim to Eshim, the TLN transaction is a completion message for the initiating Eshim and a start message or a trigger message for the receiving Eshim. The address in either the completion message, the start message, or the trigger message includes the WQ ID. A completion message can trigger a WQ when sent to an Eshim including itself. When one DMA transfer completes, the initiating Eshim can sent a start or trigger message to another Eshim or the same Eshim, which can trigger another DMA transfer. These Eshim to Eshim TLN transactions can be utilized to chain DMA transfers. In network topologies of many CGRUs of many CGRPs, hierarchical DMA transfers can be accomplished with chained DMA transfers.

For example, chained DMA transfers can be used to move 1 GB of data from one CGRP and spray the data along and/or over 10 other CGRPs that are not directly connected to each other, which means that the CGRPs are not connection by the same network, such as the same Ethernet network.

The CGRUs of 10 CGRPs may be connected in a data flow network so that they form a tree. The 1 GB of data can be moved down the tree up to the CGRU of the CGRP at the root of the tree. The completion message indicating that the 1 GB DMA transfer to the CGRU of the CGRP has completed can trigger smaller DMA transfers that then distributes subsets of the 1 GB of data down the tree. This can be useful in certain kinds of reduction trees such as binary tree reduction. In contrast to standard ways to implement a tree reduction, the chained DMA transfers described herein utilize a completion message of a DMA data transfer to trigger additional DMAs down the tree.

In some implementations, CGRUs of CGRPs that are not directly connected utilize chained DMA transfers to move data to the CGRU of the CGRP at the root of the tree and distribute the transferred data to as many CGRUs of CGRPs in the tree. In addition to a tree, the transferred data may be distributed around other network topologies.

A dataflow graph may comprise a first set of nodes including a first node, a second set of nodes including a second node, and a third set of nodes including a third node. The first node, the second node, and the third node may be configured, by runtime, onto the first set of configurable units 616-1 including a first configurable unit 616-1 of CGR array 617-1 of CGRP 602-1, the second set of configurable units 616-2 including a second configurable unit 616-2 of CGR array 617-2 of CGRP 602-2, and the third set of configurable units 616-3 including a third configurable unit 616-3 of CGR array 617-3 of CGRP 602-3, respectively. As previously described, the first set, the second set, and the third set of configurable units 616-1, 616-2, and 616-3 may include one or more AGCUs 619 including the first, second, and third AGCUs 619-1 and 619-2, and 619-3, of the configurable units 616-1, 616-2, and 616-3, respectively.

As illustrated, Each CGRP 602 includes an Mshim 614, a memctrl 613, a CGR array 617, a TLN 618, an Eshim 608, an EMAC 610, a first set of external interfaces including a first external network interface (ENI) for communication over a first external network, a second ENI for communication over a second external network, and a first external memory interface (EMI) for memory accesses between a memory 615 and a memory controller such as a memctrl 613.

Each memctrl 613 is coupled to a memory 615 having a buffer 917. Each CGR array 617 includes CGRUs 616 and an AGCU 619. Each Eshim 608 includes an EDMA engine 690, where each EDMA engine 690 includes WQs 691, EDMA QIFs 692, WCQs 695, an EDMA TDM 694, and a stream table 698. The CGRP 602-1 is coupled to CGRP 602-2 by an Ethernet network 606-1 and the CGRP 602-2 is coupled to CGRP 602-3 by an Ethernet network 606-2.

During an example chained EDMA write data transfer operation 901 from a data flow graph running across multiple CGRPs including CGRPs 602-1, 602-2, and 602-3, the Eshim 608-1 may initiate a memory read of first data over the TLN 618-1 using a TLN read request 932-1 from the memory 615-1. The Eshim 608-2 receives the first data from a TLN read response 934-1 over the TLN 618-1. The Eshim 608-1 may generate a first TX frame of a first DMA transfer including the first data and an EDMA write packet header 942-1 (not shown in FIG. 9) based on information in a current WQE 693-1 of WQ 691-1 of the EDMA engine

690-1. The Eshim 608-1 may transmit the first TX frame over a first external network to the CGRP 602-2.

The Eshim 608-2 receives the first TX frame of the first DMA transfer over the first external network from the CGRP 602-1. The first TX frame includes the EDMA write packet header 942-1 and the first data. The Eshim 608-2 initiates a memory write of the first data over the TLN 618-2 using a TLN write request 936-2 to the memory 615-2. The Eshim 608-2 receives a first completion message over the TLN 618-2 that indicates the memory write has completed. The Eshim 608-2 initiates a memory read of a first subset of the first data over the TLN 618-2 using a TLN read request 932-2 and receives a TLN read response including the first subset of the first data from the memory 615-2. The Eshim 608-2 triggers a second DMA transfer of a second TX frame to the CGRP 602-3 utilizing an Eshim 608-4 (not shown in FIG. 9) of the CGRP 602-2, and the second external network. The second TX frame includes the first subset of the first data and an EDMA write packet header 942-3.

In some implementations, an Eshim 608-4 of the CGRP 602-2 includes an EDMA engine 690-4 (not shown in FIG. 9). The Eshim 608-4 reads, by the EDMA engine 690-4, a current WQE 693-4 of a WQ 691-4 of the EDMA engine 690-4 based on a physical WQ ID of the first completion message. The Eshim 608-4 generates a second TX frame including a EDMA write packet header 942-3 and the first subset of the first data based on the current WQE 693-4 of the EDMA engine 690-4. The Eshim 608-4 initiates the second DMA transfer of the second TX frame to the CGRP 602-3 utilizing the second external network.

The CGRP 602-3 includes a fourth set of CGRUs 616 including a fourth CGRU 616-4, a forth TLN 618-4 coupled to each CGRU 616 of the fourth set of CGRUs 616, a fourth set of external interfaces including a fourth external network interface (ENI) for communication over the second external network and a fourth external memory interface (EMI), and a fifth Eshim 608-5 including a fifth EDMA engine 690-5. The fifth Eshim 608-5 receives over the fourth ENI the second TX frame from the CGRP 602-2. The fifth Eshim 608-5 initiates a memory write of the first subset of the first frame data over the TLN 618-4 to a fourth memory 615-4.

In some implementations, the first and second external networks are different external networks and the Eshims 608-2 and 608-4 are different Eshims 608.

In some implementations, the first and second external networks are the same external network and the Eshims 608-2 and 608-4 are the same Eshim 608.

In some implementations, the second DMA transfer is a chained DMA transfer of the first DMA transfer.

In some implementations, the first and second external networks each comprise an Ethernet network 606.

In some implementations, the first and second TX frames each comprise an Ethernet frame 970.

In some implementations, the first completion message is an Eshim to Eshim transaction on the TLN 618-2.

In some implementations, the first completion message is a completion message for the Eshim 608-2 and a trigger message for the Eshim 608-4.

In some implementations, chained DMAs utilize triggers across multiple CGRPs 602 in a cluster, the chained DMAs include hierarchical schemes of scatter and all-to-all transfers.

FIG. 10 is a flowchart illustrating an example of a computer-implemented method 1000 for chaining DMA transfers from a dataflow graph running across multiple CGRPs. For clarity of presentation, the description that follows generally describes method 1000 in the context of the other figures in this description. In various embodiments, method 1000 may be performed using CGRA systems in an external network, for example, corresponding to CGRA system examples 100, 200, 400, 500, and 600. It is noted that certain operations described in method 1000 may be optional or may be rearranged in different embodiments.

At step 1002, a first TX frame of a first DMA transfer is received, by a first Eshim 608-2 of a CGRP 602-2, over a first external network 606-1 from a second CGRP 602-1, the first TX frame includes a first EDMA header and first frame data. From 1002, method 1000 proceeds to 1004.

At step 1004, a memory write of the first frame data is initiated, by the first Eshim 608-2, over the first TLN 618-2 to a first memory 615-2. From 1004, method 1000 proceeds to 1006.

At step 1006, a first completion message is received, by the first Eshim 608-2, over the first TLN 618-2 that indicates the memory write has completed. From 1006, method 1000 proceeds to 1008.

At step 1008, a second DMA transfer of a second TX frame is triggered, by the first Eshim 608-2, to a third CGRP 602-3 utilizing the first TLN 618-2, a fourth Eshim 602-4 of the first CGRP 602-2, and the second external network 602-2, the second TX frame includes a second EDMA header and a first subset of the first frame data. After 1008, method 1000 stops.

Figure 11:
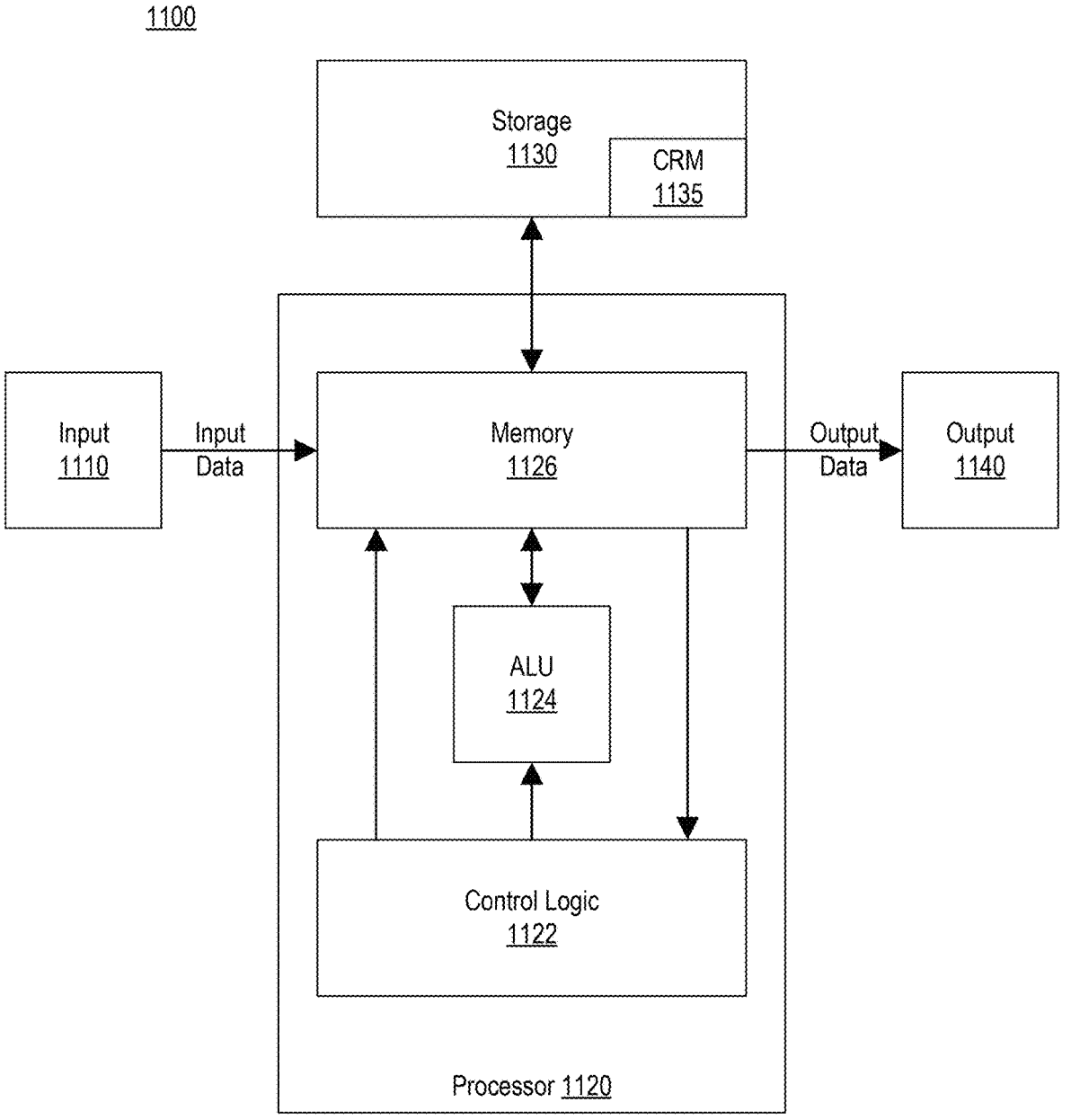
FIG. 11 illustrates an example of a computer, including an input device, a processor, a storage device, and an output device, according to an implementation of the present disclosure.

FIG. 11 illustrates an example of a computer 1100, including an input device 1110, a processor 1120, a storage device 1130, and an output device 1140, according to an implementation of the present disclosure. Although the example computer 1100 is drawn with a single processor, other implementations may have multiple processors. Input device 1110 may comprise a mouse, a keyboard, a sensor, an input port (for example, a universal serial bus (USB) port), and any other input device known in the art. Output device 1140 may comprise a monitor, printer, and any other output device known in the art. Furthermore, part or all of input device 1110 and output device 1140 may be combined in a network interface. Input device 1110 is coupled with processor 1120 to provide input data, which an implementation may store in memory 1126. Processor 1120 is coupled with output device 1140 to provide output data from memory 1126 to output device 1140. Processor 1120 further includes control logic 1122, operable to control memory 1126 and arithmetic and logic unit (ALU) 1124, and to receive program and configuration data from memory 1126. Control logic 1122 further controls exchange of data between memory 1126 and storage device 1130. Memory 1126 typically comprises memory with fast access, such as static random-access memory (SRAM), whereas storage device 1130 typically comprises memory with slow access, such as dynamic random-access memory (DRAM), flash memory, magnetic disks, optical disks, and any other memory type known in the art. At least a part of the memory in storage device 1130 includes a non-transitory computer-readable medium (CRM 1135), such as used for storing computer programs.

Described implementations of the subject matter can include one or more features, alone or in combination.

For example, in a first implementation, a first coarse-grained reconfigurable processor (CGRP) comprising: a first set of coarse-grained reconfigurable units (CGRUs) including a first CGRU; a first top-level network (TLN) coupled to each CGRU of the first set of CGRUs; a first set of external interfaces including a first external network interface (ENI) for communication over a first external network, a second ENI for communication over a second external network, and a first external memory interface (EMI); and a first external network shim (Eshim) including a first external direct memory access (EDMA) engine, the first Eshim to: receive over the first external network a first transfer (TX) frame of a first direct memory access (DMA) transfer from a second CGRP, the first TX frame comprises a first EDMA header and first frame data; initiate a memory write of the first frame data over the first TLN to a first memory; receive a first completion message over the first TLN that indicates the memory write has completed; and trigger a second DMA transfer of a second TX frame to a third CGRP utilizing the first TLN, a fourth Eshim of the first CGRP, and the second external network, the second TX frame comprises a second EDMA header and a first subset of the first frame data.

The foregoing and other described implementations can each, optionally, include one or more of the following features:

A first feature, combinable with any of the following features, wherein the fourth Eshim comprises a fourth EDMA engine, the fourth Eshim to: read, by the second EDMA engine, a current work queue entry (WQE) of a work queue (WQ) of the fourth EDMA engine based on a physical WQ identification (ID) of the first completion message; generate the second TX frame including the first subset of the first frame data and a second EDMA header based on the current WQE of the fourth EDMA engine; and initiate the second DMA transfer of the second TX frame to the third CGRP utilizing the second external network.

A second feature, combinable with any of the previous or following features, wherein the first and second external networks are different external networks and the first and second Eshims are different Eshims.

A third feature, combinable with any of the previous or following features, wherein the first and second external networks are the same external network and the first and second Eshims are the same Eshim.

A fourth feature, combinable with any of the previous or following features, wherein the second DMA transfer is a chained DMA transfer of the first DMA transfer.

A fifth feature, combinable with any of the previous or following features, wherein the first and second external networks each comprise an Ethernet network.

A sixth feature, combinable with any of the previous or following features, wherein the second CGRP comprises: a second set of CGRUs including a second CGRU; a second TLN coupled to each CGRU of the second set of CGRUs; a second set of external interfaces including a third ENI for communication over the first external network and a second EMI; and a third Eshim including a second EDMA engine, the third Eshim to: initiate a memory read of first data over the second TLN from a second memory; generate the first TX frame including the first data and the first EDMA header based on information in a current WQE of the second EDMA engine; and transmit the first TX frame over the first external network to the first CGRP.

A seventh feature, combinable with any of the previous or following features, wherein the first completion message is an Eshim to Eshim transaction on the first TLN.

An eighth feature, combinable with any of the previous or following features, wherein the first completion message is a completion message for the first Eshim and a trigger message for the second Eshim.

A ninth feature, combinable with any of the previous or following features, wherein the third CGRP comprises: a fourth set of CGRUs including a fourth CGRU; a fourth TLN coupled to each CGRU of the fourth set of CGRUs; a fourth set of external interfaces including a fourth ENI for communication over the second external network and a fourth EMI; and a fifth Eshim including a fifth EDMA engine, the fifth Eshim to: receive over the fourth ENI the second TX frame from the first CGRP; and initiate, by the fifth EDMA engine, a memory write of the first subset of the first frame data over the fourth TLN to a fourth memory.

A tenth feature, combinable with any of the previous or following features, wherein chained DMAs utilize triggers across multiple CGRPs in a cluster, the chained DMAs include hierarchical schemes of scatter and all-to-all transfers.

In a second implementation, a computing system comprising: a first CGRP comprising: a first set of coarse-grained reconfigurable units (CGRUs) including a first CGRU; a first top-level network (TLN) coupled to each CGRU of the first set of CGRUs; a first set of external interfaces including a first external network interface (ENI) for communication over a first external network, a second ENI for communication over a second external network, and a first external memory interface (EMI); and a first external network shim (Eshim) including a first external direct memory access (EDMA) engine, the first Eshim to: receive over the first external network a first transfer (TX) frame of a first direct memory access (DMA) transfer from a second CGRP, the first TX frame comprises a first EDMA header and first frame data; initiate a memory write of the first frame data over the first TLN to the first memory; receive a first completion message over the first TLN that indicates the memory write has completed; and trigger a second DMA transfer of a second TX frame to a third CGRP utilizing the first TLN, a fourth Eshim of the first CGRP, and the second external network, the second TX frame comprises a second EDMA header and a first subset of the first frame data.

The foregoing and other described implementations can each, optionally, include one or more of the following features:

A first feature, combinable with any of the following features, wherein the fourth Eshim comprises a fourth EDMA engine, the fourth Eshim to: read, by the fourth EDMA engine, a current work queue entry (WQE) of a work queue (WQ) of the fourth EDMA engine based on a physical WQ identification (ID) of the first completion message; generate the second TX frame including the first subset of the first frame data and a second EDMA header based on the current WQE of the fourth EDMA engine; and initiate the second DMA transfer of the second TX frame to the third CGRP utilizing the second external network.

A second feature, combinable with any of the previous or following features, wherein the first and second external networks are different external networks and the first and second Eshims are different Eshims.

A third feature, combinable with any of the previous or following features, wherein the first and second external networks are the same external network and the first and second Eshims are the same Eshim.

A fourth feature, combinable with any of the previous or following features, wherein the second DMA transfer is a chained DMA transfer of the first DMA transfer.

A fifth feature, combinable with any of the previous or following features, wherein the first and second external networks each comprise an Ethernet network.

A sixth feature, combinable with any of the previous or following features, wherein the second CGRP comprises: a second set of CGRUs including a second CGRU; a second TLN coupled to each CGRU of the second set of CGRUs; a second set of external interfaces including a third ENI for communication over the first external network and a second EMI; and a third Eshim including a second EDMA engine, the third Eshim to: initiate a memory read of first data over the second TLN from a second memory; generate the first TX frame including the first data and the first EDMA header based on information in a current WQE of the second EDMA engine; and transmit the first TX frame over the first external network to the first CGRP.

A seventh feature, combinable with any of the previous or following features, wherein the first completion message is an Eshim to Eshim transaction on the first TLN.

An eighth feature, combinable with any of the previous or following features, wherein the first completion message is a completion message for the first Eshim and a trigger message for the second Eshim.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer readable media for storing computer program instructions and data can include all forms of permanent/non-permanent or volatile CGR array/nonvolatile CGR array memory, media and memory devices, including by way of example semiconductor memory devices, for example, random access memory (RAM), readonly memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magnetooptical disks; and optical memory devices, for example, digital versaCGR array/video disc (DVD), compact disc (CD)ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback such as visual, auditory, or a combination of feedback types. Input from the user can be received in any form, including acoustic, speech, or other types of input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship with each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A first coarse-grained reconfigurable processor (CGRP) comprising:

a first set of coarse-grained reconfigurable units (CGRUs) including a first CGRU;

a first top-level network (TLN) coupled to each CGRU of the first set of CGRUs;

a first set of external interfaces including a first external network interface (ENI) for communication over a first external network, a second ENI for communication over a second external network, and a first external memory interface (EMI); and a first external network shim (Eshim) including a first external direct memory access (EDMA) engine, the first Eshim to:

receive over the first external network a first transfer (TX) frame of a first direct memory access (DMA) transfer from a second CGRP, the first TX frame comprises a first EDMA header and first frame data;

initiate a memory write of the first frame data over the first TLN to a first memory;

receive a first completion message over the first TLN that indicates the memory write has completed; and trigger a second DMA transfer of a second TX frame to a third CGRP utilizing the first TLN, a fourth Eshim of the first CGRP, and the second external network, the second TX frame comprises a second EDMA header and a first subset of the first frame data.

2. The first CGRP of claim 1, wherein the fourth Eshim of the first CGRP comprises a fourth EDMA engine, the fourth Eshim to:

read, by the fourth EDMA engine, a current work queue entry (WQE) of a work queue (WQ) of the fourth EDMA engine based on a physical WQ identification (ID) of the first completion message;

generate the second TX frame including the first subset of the first frame data and a second EDMA header based on the current WQE of the fourth EDMA engine; and initiate the second DMA transfer of the second TX frame to the third CGRP utilizing the second external network.

3. The first CGRP of claim 1, wherein the first and second external networks are different external networks and the first and second Eshims are different Eshims.

4. The first CGRP of claim 1, wherein the first and second external networks are the same external network and the first and second Eshims are the same Eshim.

5. The first CGRP of claim 1, wherein the second DMA transfer is a chained DMA transfer of the first DMA transfer.

6. The first CGRP of claim 1, wherein the first and second external networks each comprise an Ethernet network.

7. The first CGRP of claim 1, wherein the second CGRP comprises:

a second set of CGRUs including a second CGRU;

a second TLN coupled to each CGRU of the second set of CGRUs;

a second set of external interfaces including a third ENI for communication over the first external network and a second EMI; and a third Eshim including a second EDMA engine, the third Eshim to:

initiate a memory read of first data over the second TLN from a second memory;

generate the first TX frame including the first data and the first EDMA header based on information in a current WQE of the second EDMA engine; and transmit the first TX frame over the first external network to the first CGRP.

8. The first CGRP of claim 1, wherein the first completion message is an Eshim to Eshim transaction on the first TLN.

9. The first CGRP of claim 1, wherein the first completion message is a completion message for the first Eshim and a trigger message for the second Eshim.

10. The first CGRP of claim 1, wherein the third CGRP comprises:

a fourth set of CGRUs including a fourth CGRU;

a fourth TLN coupled to each CGRU of the fourth set of CGRUs;

a fourth set of external interfaces including a fourth ENI for communication over the second external network and a fourth EMI; and a fifth Eshim including a fifth EDMA engine, the fifth Eshim to:

receive over the fourth ENI the second TX frame from the first CGRP; and initiate, by the fifth EDMA engine, a memory write of the first subset of the first frame data over the fourth TLN to a fourth memory.

11. The first CGRP of claim 1, wherein chained DMAs utilize triggers across multiple CGRPs in a cluster, the chained DMAs include hierarchical schemes of scatter and all-to-all transfers.

12. A computing system comprising:

a first CGRP comprising:

a first set of coarse-grained reconfigurable units (CGRUs) including a first CGRU;

a first top-level network (TLN) coupled to each CGRU of the first set of CGRUs;

a first set of external interfaces including a first external network interface (ENI) for communication over a first external network, a second ENI for communication over a second external network, and a first external memory interface (EMI); and a first external network shim (Eshim) including a first external direct memory access (EDMA) engine, the first Eshim to:

receive over the first external network a first transfer (TX) frame of a first direct memory access (DMA) transfer from a second CGRP, the first TX frame comprises a first EDMA header and first frame data;

initiate a memory write of the first frame data over the first TLN to the first memory;

receive a first completion message over the first TLN that indicates the memory write has completed; and trigger a second DMA transfer of a second TX frame to a third CGRP utilizing the first TLN, a fourth Eshim of the first CGRP, and the second external network, the second TX frame comprises a second EDMA header and a first subset of the first frame data.

13. The first CGRP of claim 12, wherein the fourth Eshim of the first CGRP comprises a fourth EDMA engine, the fourth Eshim to:

read, by the fourth EDMA engine, a current work queue entry (WQE) of a work queue (WQ) of the fourth EDMA engine based on a physical WQ identification (ID) of the first completion message;

generate the second TX frame including the first subset of the first frame data and a second EDMA header based on the current WQE of the fourth EDMA engine; and initiate the second DMA transfer of the second TX frame to the third CGRP utilizing the second external network.

14. The first CGRP of claim 12, wherein the first and second external networks are different external networks and the first and second Eshims are different Eshims.

15. The first CGRP of claim 12, wherein the first and second external networks are the same external network and the first and second Eshims are the same Eshim.

16. The first CGRP of claim 12, wherein the second DMA transfer is a chained DMA transfer of the first DMA transfer.

17. The first CGRP of claim 12, wherein the first and second external networks each comprise an Ethernet network.

18. The first CGRP of claim 12, wherein the second CGRP comprises:

a second set of CGRUs including a second CGRU;

a second TLN coupled to each CGRU of the second set of CGRUs;

a second set of external interfaces including a third ENI for communication over the first external network and a second EMI; and a third Eshim including a second EDMA engine, the third Eshim to:

initiate a memory read of first data over the second TLN from a second memory;

generate the first TX frame including the first data and the first EDMA header based on information in a current WQE of the second EDMA engine; and transmit the first TX frame over the first external network to the first CGRP.

19. The first CGRP of claim 12, wherein the first completion message is an Eshim to Eshim transaction on the first TLN.

20. The first CGRP of claim 12, wherein the first completion message is a completion message for the first Eshim and a trigger message for the second Eshim.

* * * * *